US012578227B2

(12) United States Patent
Rieker et al.

(10) Patent No.: US 12,578,227 B2
(45) Date of Patent: Mar. 17, 2026

(54) DUAL COMB SPECTROSCOPY UNDER NO-WALKING CONDITION

(71) Applicant: The Regents of the University of Colorado, a body corporate, Denver, CO (US)

(72) Inventors: Gregory B. Rieker, Boulder, CO (US); Caroline B. Alden, Boulder, CO (US); Robert J. Wright, Boulder, CO (US); Sean C. Coburn, Longmont, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 18/214,376

(22) Filed: Jun. 26, 2023

(65) Prior Publication Data

US 2023/0349764 A1 Nov. 2, 2023

Related U.S. Application Data

(63) Continuation of application No. 17/023,080, filed on Sep. 16, 2020, now Pat. No. 11,686,622.

(Continued)

(51) Int. Cl.
*G01J 3/453* (2006.01)
*G01N 21/27* (2006.01)
*G01J 3/28* (2006.01)

(52) U.S. Cl.
CPC .......... *G01J 3/4531* (2013.01); *G01N 21/274* (2013.01); *G01J 2003/2866* (2013.01); *G01J 2003/4538* (2013.01)

(58) Field of Classification Search
CPC ............. G01J 3/4531; G01J 2003/2866; G01J 2003/4538; G01J 3/45; G01J 2003/104;
(Continued)

(56) References Cited

U.S. PATENT DOCUMENTS 8,502,152 B1 * 8/2013 Hashmonay ....... G01N 21/3504
250/339.12
2011/0069309 A1 3/2011 Newbury et al.
(Continued)

OTHER PUBLICATIONS

Bernhardt et al., "Cavity-enhanced dual-comb spectroscopy", Nature Photonics vol. 4, Nov. 29, 2009, 3 pages.
(Continued)

*Primary Examiner* — Hwa Andrew Lee
(74) *Attorney, Agent, or Firm* — Cozen O'Connor

(57) ABSTRACT

A method for adaptive dual frequency-comb spectroscopy includes repeatedly (i) recording a single interferogram with a dual frequency-comb spectrometer, (ii) averaging the single interferogram into an averaged interferogram, and (iii) determining a signal-to-noise ratio (SNR) of the averaged interferogram, until the SNR of the averaged interferogram exceeds a SNR threshold. In certain embodiments, determining the SNR includes determining a signal amplitude of a center burst of the averaged interferogram and determining a noise level of the averaged interferogram from data points of the averaged interferogram located away from the center burst. In certain embodiments, determining the SNR includes Fourier transforming the averaged interferogram into a frequency spectrum and numerically integrating the frequency spectrum.

16 Claims, 22 Drawing Sheets

Related U.S. Application Data

(60) Provisional application No. 62/900,829, filed on Sep. 16, 2019.

(58) Field of Classification Search
CPC .... G01J 3/0218; G01J 3/10; G01J 3/42; G01J 3/457; G01J 9/04; G01J 2003/423; G01N 21/274; G01N 21/39; G01N 21/45; G01N 2021/1795; G01N 2201/0221
See application file for complete search history.

(56) References Cited

U.S. PATENT DOCUMENTS

| | | | |
|---|---|---|---|
| 2017/0201328 A1* | 7/2017 | Hugi | G01J 3/433 |
| 2018/0045596 A1* | 2/2018 | Prasad | G01M 3/22 |
| 2018/0216996 A1* | 8/2018 | Kieu | H01S 3/1112 |

OTHER PUBLICATIONS

Coburn et al., "Regional trace-gas source attribution using a field-deployed dual frequency comb spectrometer", Optica vol. 5 No. 4, Apr. 2018, pp. 320-327.

Coddington et al., "Coherent dual-comb spectroscopy at high signal-to-noise ratio", Physical Review A 82, 2010, 13 pages.

Coddington et al., "Coherent linear optical sampling at 15 bits of resolution", Optics Letters vol. 34 No. 14, Jul. 15, 2009, 3 pages.

Giorgetta et al., "Fast high-resolution spectroscopy of dynamic continuous-wave laser sources", Nature Photonics vol. 4, Oct. 24, 2010, 5 pages.

Newbury et al., "Sensitivity of coherent dual-comb spectroscopy", Optics Express vol. 18 No. 8, Apr. 12, 2010, pp. 7929-7945.

\* cited by examiner

700

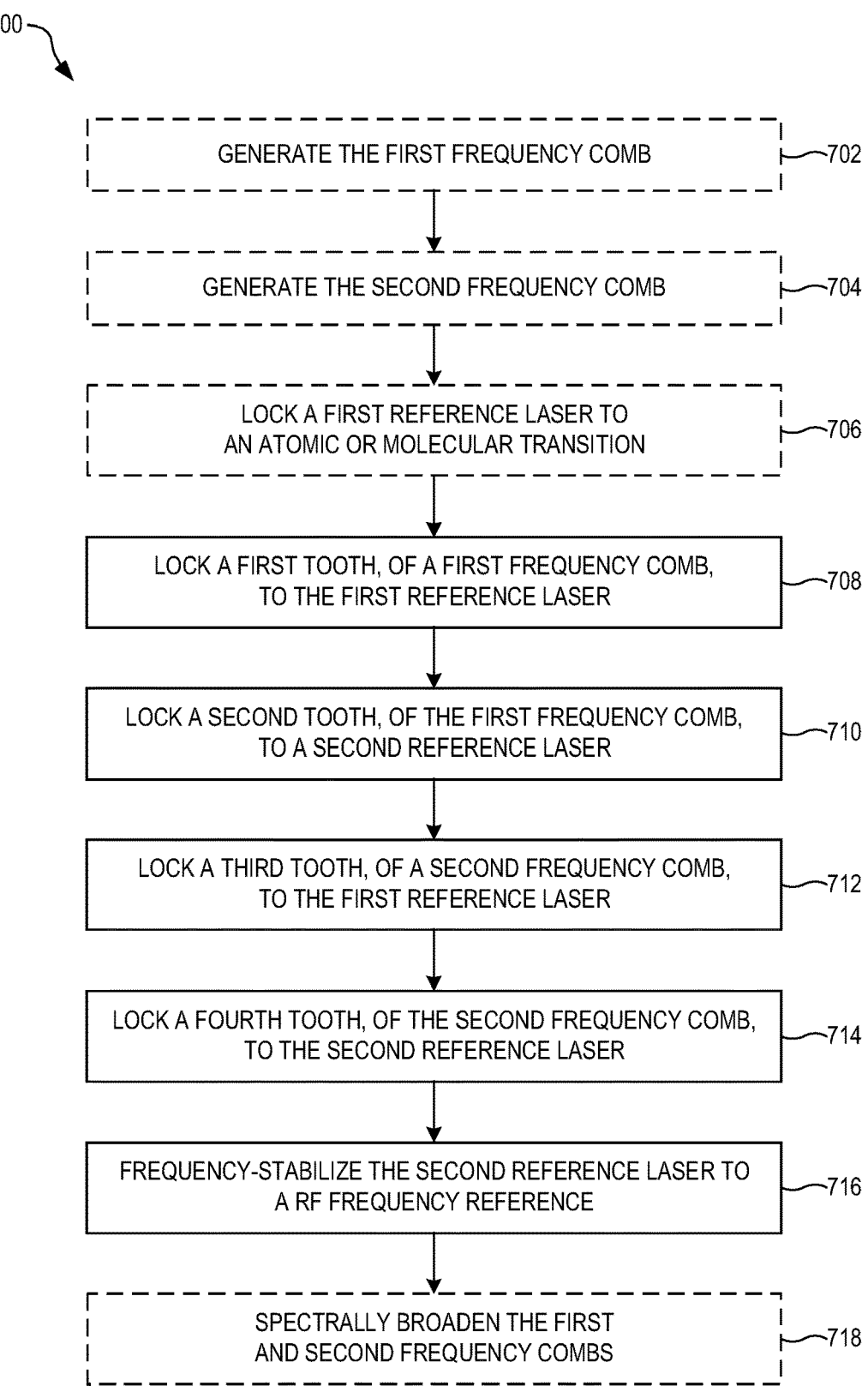

GENERATE THE FIRST FREQUENCY COMB — 702

GENERATE THE SECOND FREQUENCY COMB — 704

LOCK A FIRST REFERENCE LASER TO
AN ATOMIC OR MOLECULAR TRANSITION — 706

LOCK A FIRST TOOTH, OF A FIRST FREQUENCY COMB,
TO THE FIRST REFERENCE LASER — 708

LOCK A SECOND TOOTH, OF THE FIRST FREQUENCY COMB,
TO A SECOND REFERENCE LASER — 710

LOCK A THIRD TOOTH, OF A SECOND FREQUENCY COMB,
TO THE FIRST REFERENCE LASER — 712

LOCK A FOURTH TOOTH, OF THE SECOND FREQUENCY COMB,
TO THE SECOND REFERENCE LASER — 714

FREQUENCY-STABILIZE THE SECOND REFERENCE LASER TO
A RF FREQUENCY REFERENCE — 716

SPECTRALLY BROADEN THE FIRST
AND SECOND FREQUENCY COMBS — 718

*FIG. 7A*

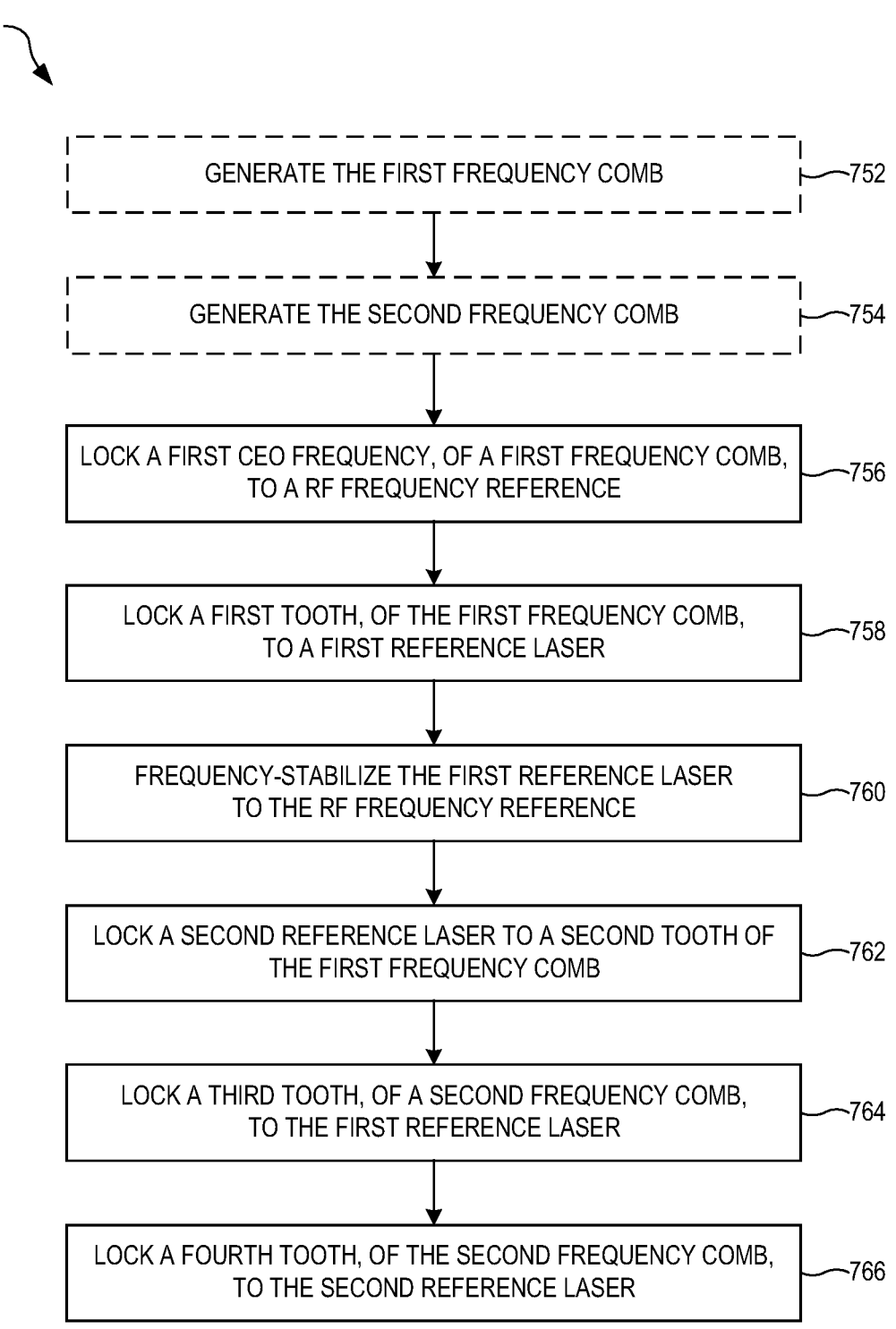

750

GENERATE THE FIRST FREQUENCY COMB — 752

GENERATE THE SECOND FREQUENCY COMB — 754

LOCK A FIRST CEO FREQUENCY, OF A FIRST FREQUENCY COMB, TO A RF FREQUENCY REFERENCE — 756

LOCK A FIRST TOOTH, OF THE FIRST FREQUENCY COMB, TO A FIRST REFERENCE LASER — 758

FREQUENCY-STABILIZE THE FIRST REFERENCE LASER TO THE RF FREQUENCY REFERENCE — 760

LOCK A SECOND REFERENCE LASER TO A SECOND TOOTH OF THE FIRST FREQUENCY COMB — 762

LOCK A THIRD TOOTH, OF A SECOND FREQUENCY COMB, TO THE FIRST REFERENCE LASER — 764

LOCK A FOURTH TOOTH, OF THE SECOND FREQUENCY COMB, TO THE SECOND REFERENCE LASER — 766

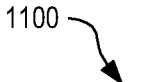

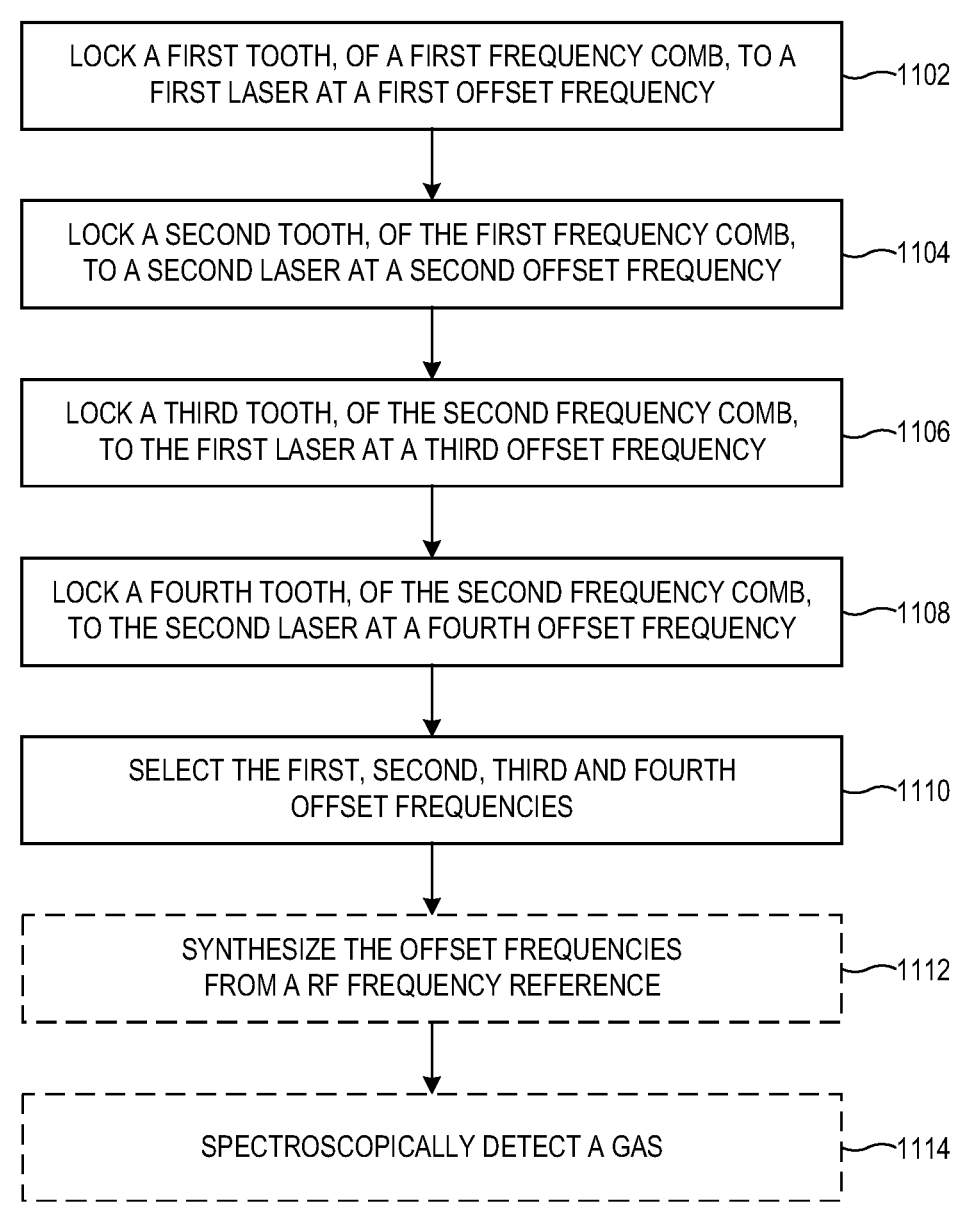

1100

LOCK A FIRST TOOTH, OF A FIRST FREQUENCY COMB, TO A FIRST LASER AT A FIRST OFFSET FREQUENCY ⟩—1102

LOCK A SECOND TOOTH, OF THE FIRST FREQUENCY COMB, TO A SECOND LASER AT A SECOND OFFSET FREQUENCY ⟩—1104

LOCK A THIRD TOOTH, OF THE SECOND FREQUENCY COMB, TO THE FIRST LASER AT A THIRD OFFSET FREQUENCY ⟩—1106

LOCK A FOURTH TOOTH, OF THE SECOND FREQUENCY COMB, TO THE SECOND LASER AT A FOURTH OFFSET FREQUENCY ⟩—1108

SELECT THE FIRST, SECOND, THIRD AND FOURTH OFFSET FREQUENCIES ⟩—1110

SYNTHESIZE THE OFFSET FREQUENCIES FROM A RF FREQUENCY REFERENCE ⟩—1112

SPECTROSCOPICALLY DETECT A GAS ⟩—1114

*FIG. 11*

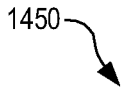
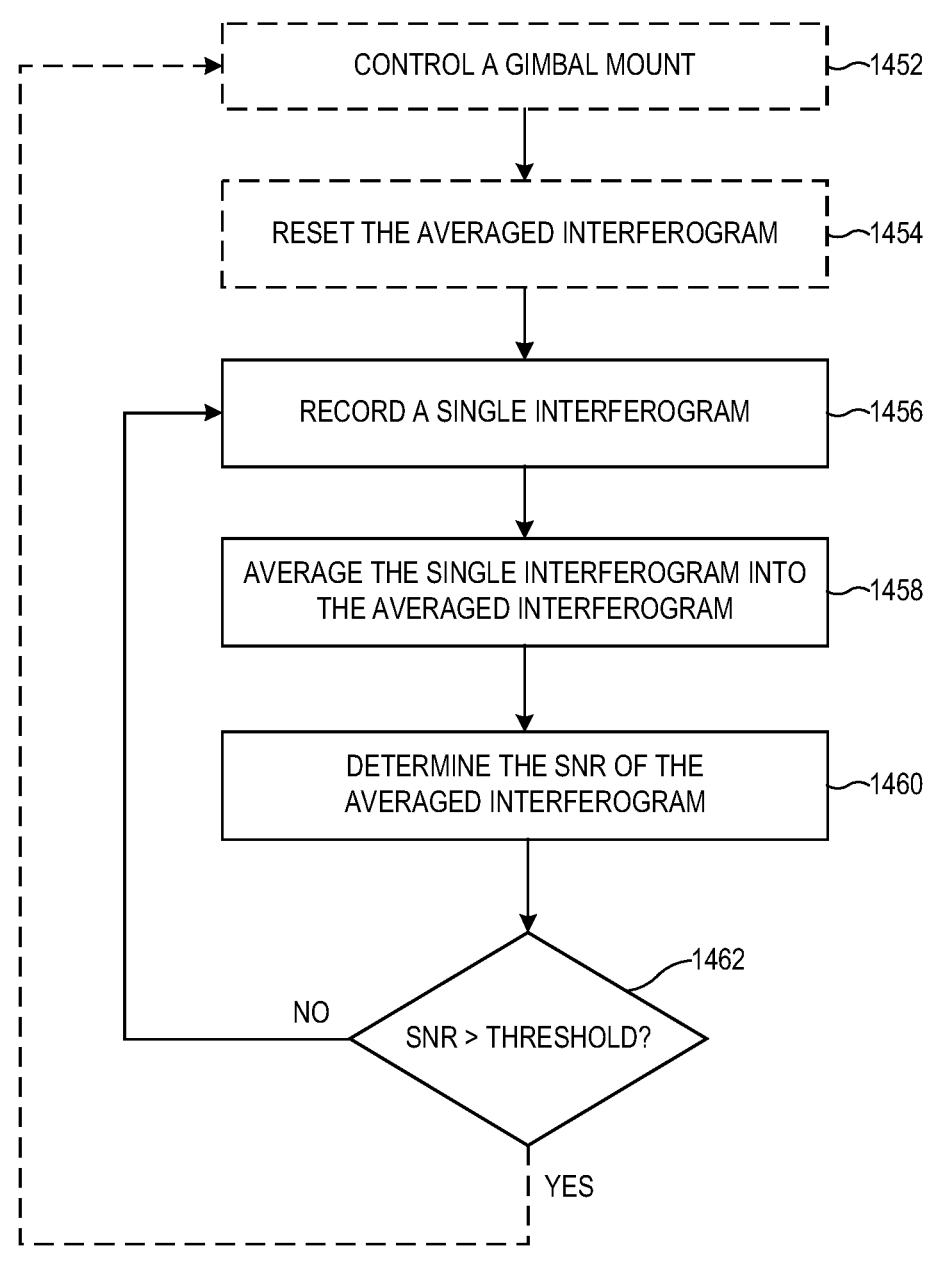
1450
CONTROL A GIMBAL MOUNT ⟋1452
RESET THE AVERAGED INTERFEROGRAM ⟋1454
RECORD A SINGLE INTERFEROGRAM ⟋1456
AVERAGE THE SINGLE INTERFEROGRAM INTO THE AVERAGED INTERFEROGRAM ⟋1458
DETERMINE THE SNR OF THE AVERAGED INTERFEROGRAM ⟋1460
⟋1462
NO   SNR > THRESHOLD?
YES
*FIG. 14B*

1500
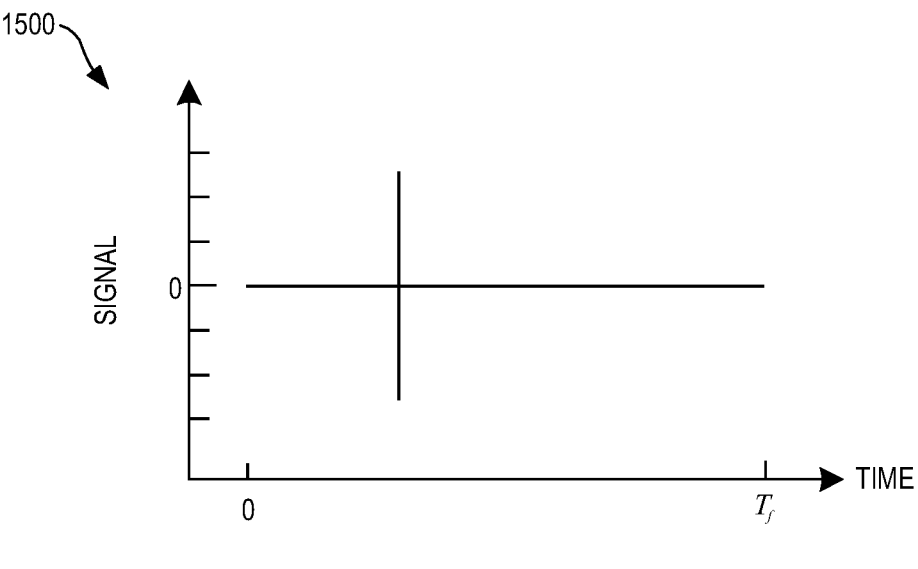
TIME
1510
1502
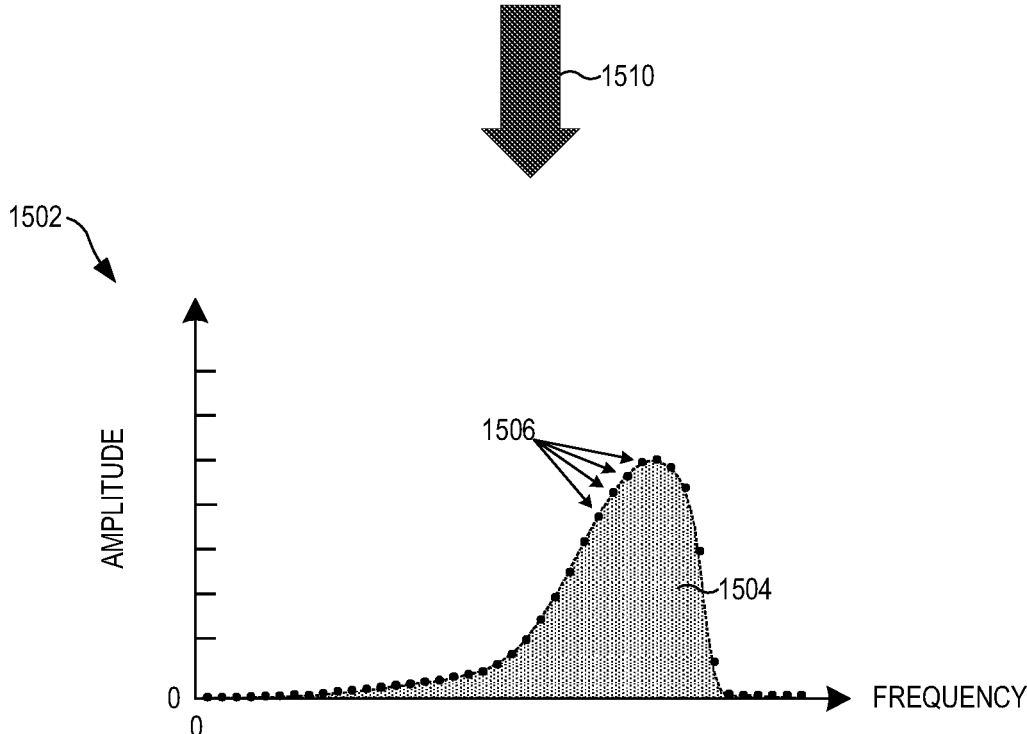
*FIG. 15*

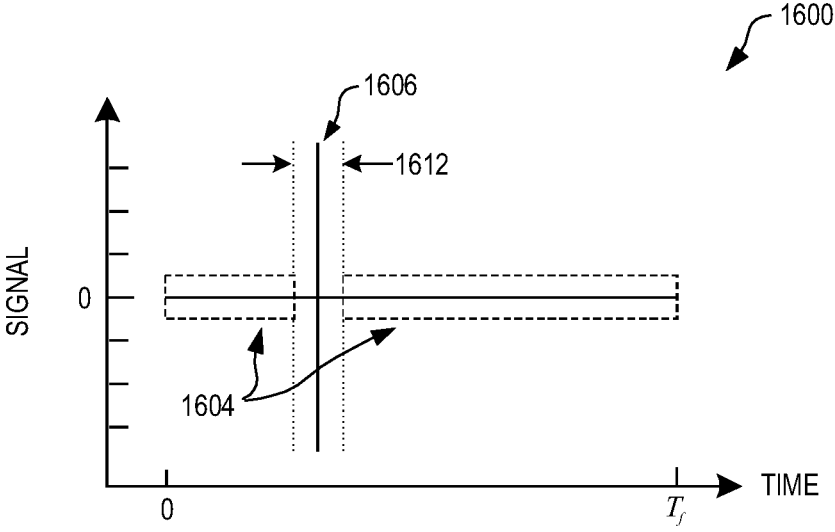
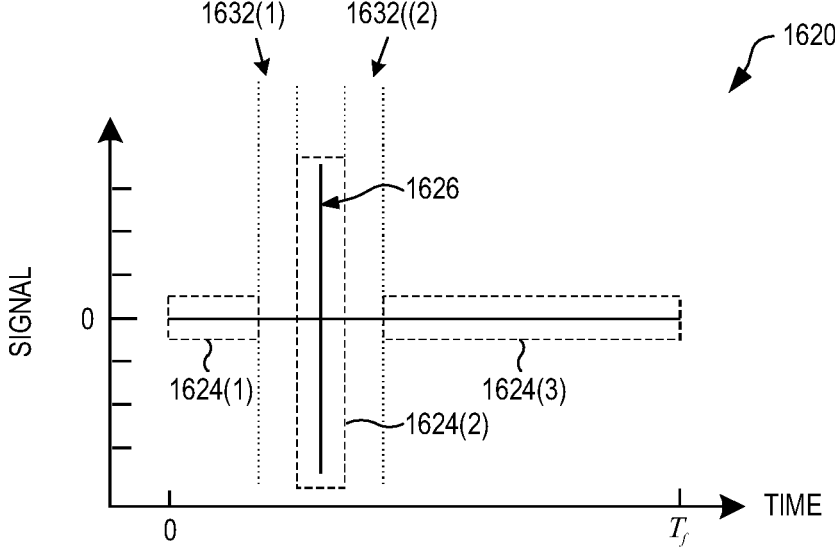
*FIG. 16*

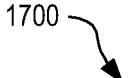
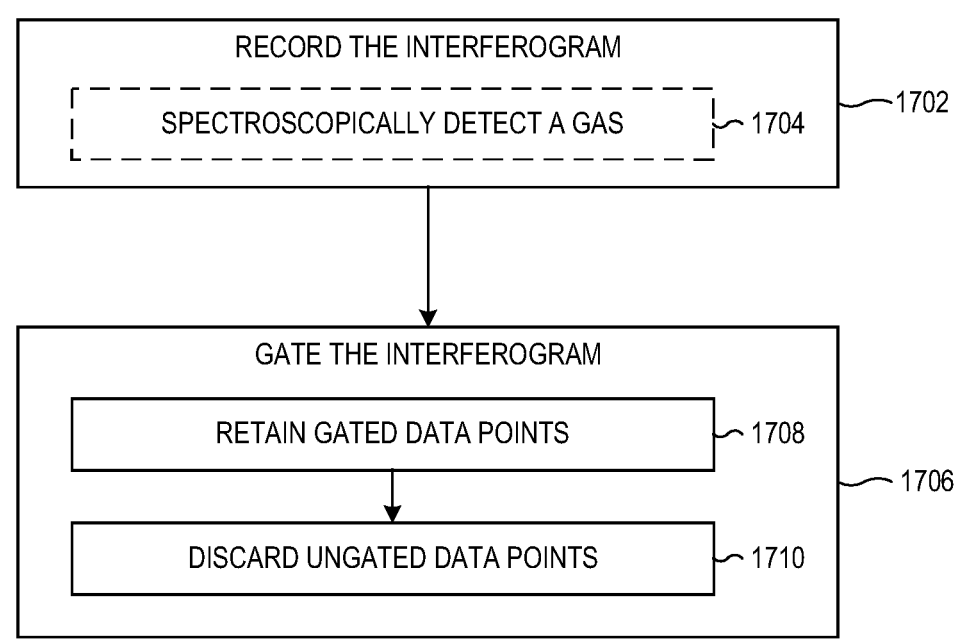
*FIG. 17*

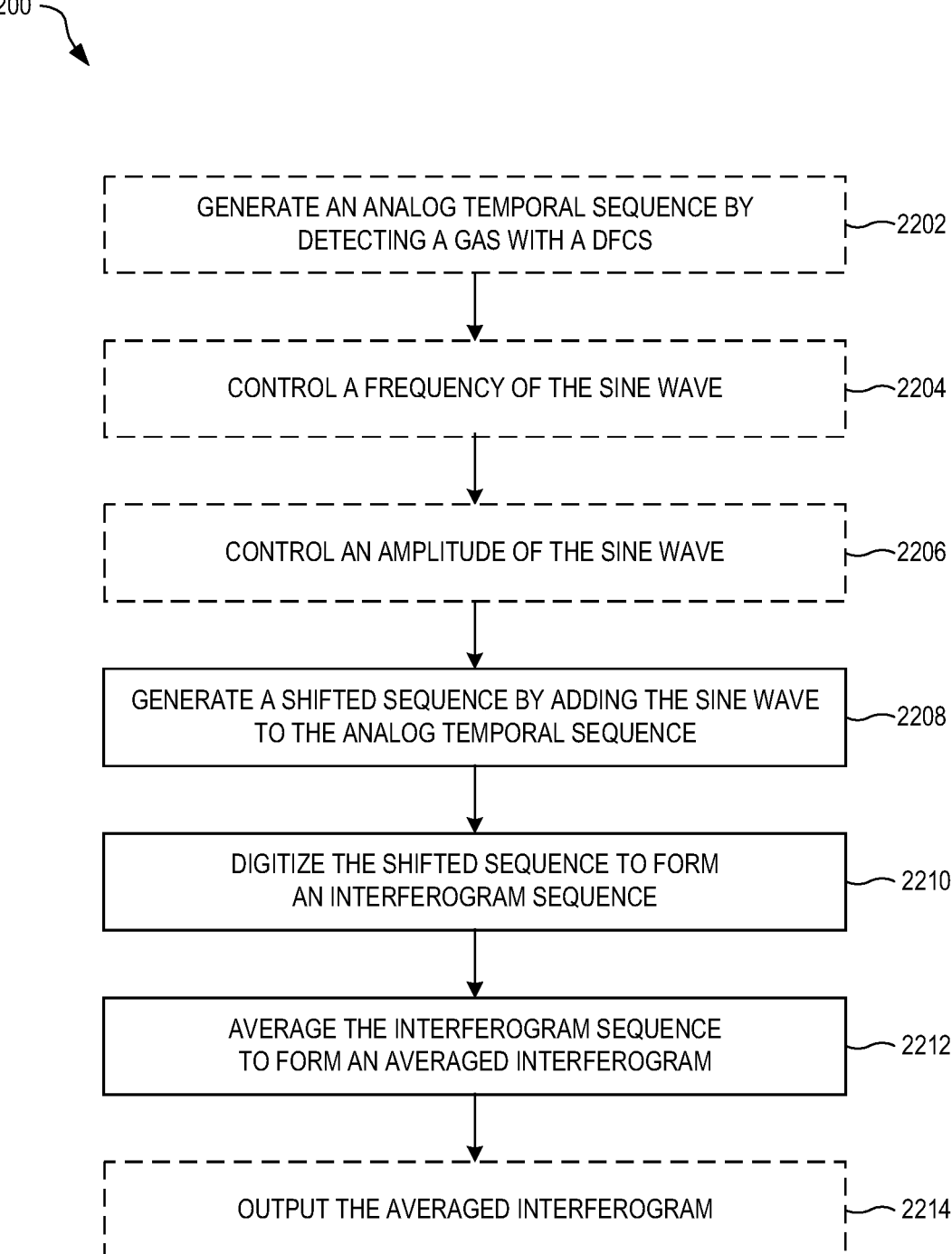

2200

GENERATE AN ANALOG TEMPORAL SEQUENCE BY
DETECTING A GAS WITH A DFCS ⁓2202

CONTROL A FREQUENCY OF THE SINE WAVE ⁓2204

CONTROL AN AMPLITUDE OF THE SINE WAVE ⁓2206

GENERATE A SHIFTED SEQUENCE BY ADDING THE SINE WAVE
TO THE ANALOG TEMPORAL SEQUENCE ⁓2208

DIGITIZE THE SHIFTED SEQUENCE TO FORM
AN INTERFEROGRAM SEQUENCE ⁓2210

AVERAGE THE INTERFEROGRAM SEQUENCE
TO FORM AN AVERAGED INTERFEROGRAM ⁓2212

OUTPUT THE AVERAGED INTERFEROGRAM ⁓2214

*FIG. 22*

DUAL COMB SPECTROSCOPY UNDER NO-WALKING CONDITION

RELATED APPLICATIONS

This application is a continuation of U.S. patent application Ser. No. 17/023,080, filed on Sep. 16, 2020, which claims priority to U.S. Provisional Patent Application No. 62/900,829, filed on Sep. 16, 2019. Each of these applications is incorporated herein by reference in its entirety.

STATEMENT REGARDING FEDERALLY SPONSORED RESEARCH OR DEVELOPMENT

This invention was made with government support under grant numbers DE-AR0000539 and DE-FE0029168 awarded by the U.S. Department of Energy. The government has certain rights in the invention.

BACKGROUND

The burning of natural gas emits fewer carbon emissions than the burning of coal, and thus a transition from coal to natural gas may help reduce or revert climate change. The United States is already the world's largest producer of natural gas, outputting over 37 trillion cubic feet in 2018. In the United States, natural gas represents approximately one-third of the nation's entire energy production, the most of any energy type. It is also one of the nation's largest energy sources for electrical generation.

Natural gas is predominantly methane, a potent greenhouse gas. The potency of a greenhouse gas is commonly measured by global warming potential (GWP), which quantifies how much heat the gas traps in the atmosphere, relative to carbon dioxide, over a specific time horizon. By definition, the GWP of carbon dioxide is one. The GWP of methane is 86 over 20 years, and 34 over 100 years.

Significant infrastructure has been constructed, both in the United States and abroad, to extract, process, transport, and utilize natural gas. This infrastructure includes wells and rigs for extraction, pipelines and liquid natural gas (LNG) tankers for transportation, liquification and condensation facilities, processing plants for removing impurities and non-methane components, storage tanks, and industrial boilers (e.g., refineries, power stations, chemical plants) that utilize methane as an energy source for generating heat.

Since methane is a gas, it can easily escape into the atmosphere through leaks that form in equipment and components, such as valves, pipes, connectors, pumps, pressure-relief devices, open-ended lines, and sampling connections. Emissions at a typical facility (e.g., refinery or chemical plant) may arise, for example, from seals and gaskets that are improperly seated or maintained. A typical facility has almost 20,000 valves and connectors, and may have over 100,000. Failure of any one of these components may result in a leak. However, leaks may also arise from corrosion of metal components, as well as damage to components due to normal wear and tear and/or anomalous operation.

Therefore, to obtain the full environmental benefit of switching from coal to natural gas, it is important to reduce the number of methane leaks and the quantity of methane emitted by each leak. The amount of leaked methane (also known as "fugitive emissions") in the United States is estimated to be between 1.4% and 2.3% of total production per year. Equivalent to 0.5-0.8 trillion cubic feet, these fugitive emissions are enough to heat between 7 and 11 million homes.

In 2016, the United States Environmental Protection Agency (EPA) passed three new rules to help reduce methane emissions in the oil and natural gas industries. These rules include New Source Performance Standards that sets emission limits for methane and requires owners/operators of equipment to find and repair fugitive methane leaks. The EPA estimates that these rules will reduce fugitive methane emissions by 510,000 short tons, or 23 billion cubic feet.

To adhere to the 2016 EPA rules, owners/operators of natural gas well sites, oil well sites, gathering and boosting stations, and compressor stations must survey their equipment for leaks at fixed schedules. Owners/operators must use optical gas imaging (OGI) to conduct these leak surveys. The most common type of OGI uses an infrared camera that is sensitive between 3.3 and 3.4 $\mu$m, where methane has absorption lines. However, the performance of an infrared camera depends on weather conditions (e.g., temperature, wind) as well as the emissivities of materials in the background of the image. As an alternative to OGI, owners/operators may invoke "Method 21" in which surveying is conducted with a portable instrument, such as an organic vapor analyzer. The 2016 EPA rules also allow the EPA to approve the use of emerging leak-monitoring technologies as alternatives to OGI; owners/operators must submit information demonstrating that the alternative technology is capable of achieving methane reductions equivalent to those that can be achieved when OGI or Method 21 is used to find and repair leaks.

In addition to the oil and gas industries, methane emissions are also of concern in agriculture, where global emissions from livestock is estimated at 119 Tg per year (equivalent to 5.9 trillion cubic feet). Other major anthropogenic sources of methane include methane-emitting bacteria that grow in rice paddies (estimated at 115-243 Tg emitted globally per year), biomass burning (estimated at 40-55 Tg emitted globally per year), and landfills (estimated at 40-55 Tg emitted globally per year).

SUMMARY

Many instruments for detecting gas leaks must be located relatively close to the source of the leak. For example, an infrared camera used for optical gas imaging (OGI) is most efficient at detecting a leak when located within thirty feet of it (with the exception of "super-emitters" that can be easily imaged at somewhat larger distances). For a portable instrument used under "Method 21" of the 2016 EPA rules, such as an organic vapor analyzer, the instrument must be even closer, i.e., within a few feet. In either case, proper use of the instrument poses a host of safety risks to the operator, especially at an oil and gas facility. For example, many potential sources of leaks are in hard-to-access places that require the operator to work in confined spaces and/or close to high-power machinery and heavy equipment. The operator may be exposed to excessive heat and noise, as are routinely encountered in oil refineries and other large industrial complexes. The operator may also need to work near components operating under high pressure, and thus can explode, resulting in blunt and/or penetrating trauma to the operator. The operator may also be exposed to chemicals that can pose a health risk through skin contact and/or inhalation (e.g., ethylbenzene, xylene, benzene, toluene, carbon monoxide, sulfur dioxide, hydrogen sulfide, etc.). To reduce this exposure, the operator may need to use a respirator mask and/or other types of personal protective equipment that limit their mobility. Furthermore, many leaking gases are flammable and have low flash points, and thus can cause severe damage if accidentally ignited.

Presented herein is a dual-comb spectroscopy (DCS) system that remotely senses a variety of trace gases with a sensitivity that rivals, or exceeds, that of prior-art instruments. Advantageously, the DCS system can autonomously (i.e., without a human operator) detect a leak more than one kilometer away from its source, and thus minimize the exposure of human operators to the multitude of safety risks described above. Specifically, when the DCS system determines that no leak exists at a particular location, a human operator need not be deployed to the location to conduct an emission survey. When the DCS system does detect a leak (or another type of abnormal emission), a human operator can, for example, be deployed to the location with more specific knowledge about the size, location, and composition of the leak, and thus can find and repair the leak more quickly, minimizing their time at the location.

The DCS system uses two optical frequency combs containing hundreds of thousands of frequencies, or more, covering the visible, near-infrared, and/or mid-infrared regions of the electromagnetic spectrum. Thus, the DCS system can detect several species of gases, unlike other types of remote trace gas detectors utilizing single-frequency lasers. For example, the DCS system can be configured to detect the most common gases that leak at oil and gas facilities, including methane, acetylene, carbon dioxide, water vapor, carbon monoxide, hydrogen sulfide, ethylene, ethane, propane, butane, and BTEX (benzene, toluene, ethylbenzene, and xylene). In fact, the DCS system can be configured to detect several of these species simultaneously, as well as other types of volatile organic compounds and hydrocarbons. Furthermore, the DCS system detects multiple spectral lines for each species, from which it can determine a temperature of the leaked gas; knowledge of the temperature can be helpful for determining the source of the leak.

Embodiments presented herein advantageously improve robustness, reliability, and portability of DCS systems by reducing component count, power consumption, size, and weight. Thus, the embodiments enable field-deployment of DCS systems while ensuring reliable, continuous operation throughout a variety of weather conditions that can affect performance.

In certain embodiments, a data-processing method for an interferogram having a plurality of data points advantageously speeds up data processing by removing data points that contain only, or predominantly, noise. The reduction of data points facilitates real-time data processing and reduces the need for high-power offline computing resources. The data-processing method includes recording the interferogram with a dual frequency comb spectrometer, and gating the interferogram by retaining a plurality of gated data points of the data points, and by discarding a remaining plurality of ungated data points.

In certain embodiments, a method for adaptive dual frequency-comb spectroscopy includes repeatedly (i) recording a single interferogram with a dual frequency-comb spectrometer, (ii) averaging the single interferogram into an averaged interferogram, and (iii) determining a SNR of the averaged interferogram, until the SNR of the averaged interferogram exceeds a SNR threshold.

BRIEF DESCRIPTION OF THE FIGURES

FIG. 7A is a flow chart of a frequency-stabilization method for field-deployable dual frequency-comb spectroscopy, in embodiments.

FIG. 7B is a flow chart of another frequency-stabilization method for field-deployable dual frequency-comb spectroscopy, in embodiments.

FIG. 11 is a flow chart of a drift-immune frequency-stabilization method for locking a dual frequency-comb spectrometer having first and second frequency combs, in embodiments.

FIG. 14B is a flow chart of a method for adaptive dual frequency-comb spectroscopy, in embodiments.

FIG. 15 illustrates how a frequency spectrum of an interferogram may be alternatively used to determine the SNR of the interferogram, in an embodiment.

FIG. 16 illustrates a method for gating an interferogram to reduce a number of data points used for data processing and storage, in embodiments.

FIG. 17 is a flow chart of a data-processing method for an interferogram having a plurality of data points, in embodiments.

FIG. 22 is a flow chart of a method 2200 for improving nonlinearity of an ADC in a dual frequency-comb spectrometer, in embodiments.

DETAILED DESCRIPTION

Figure 1:
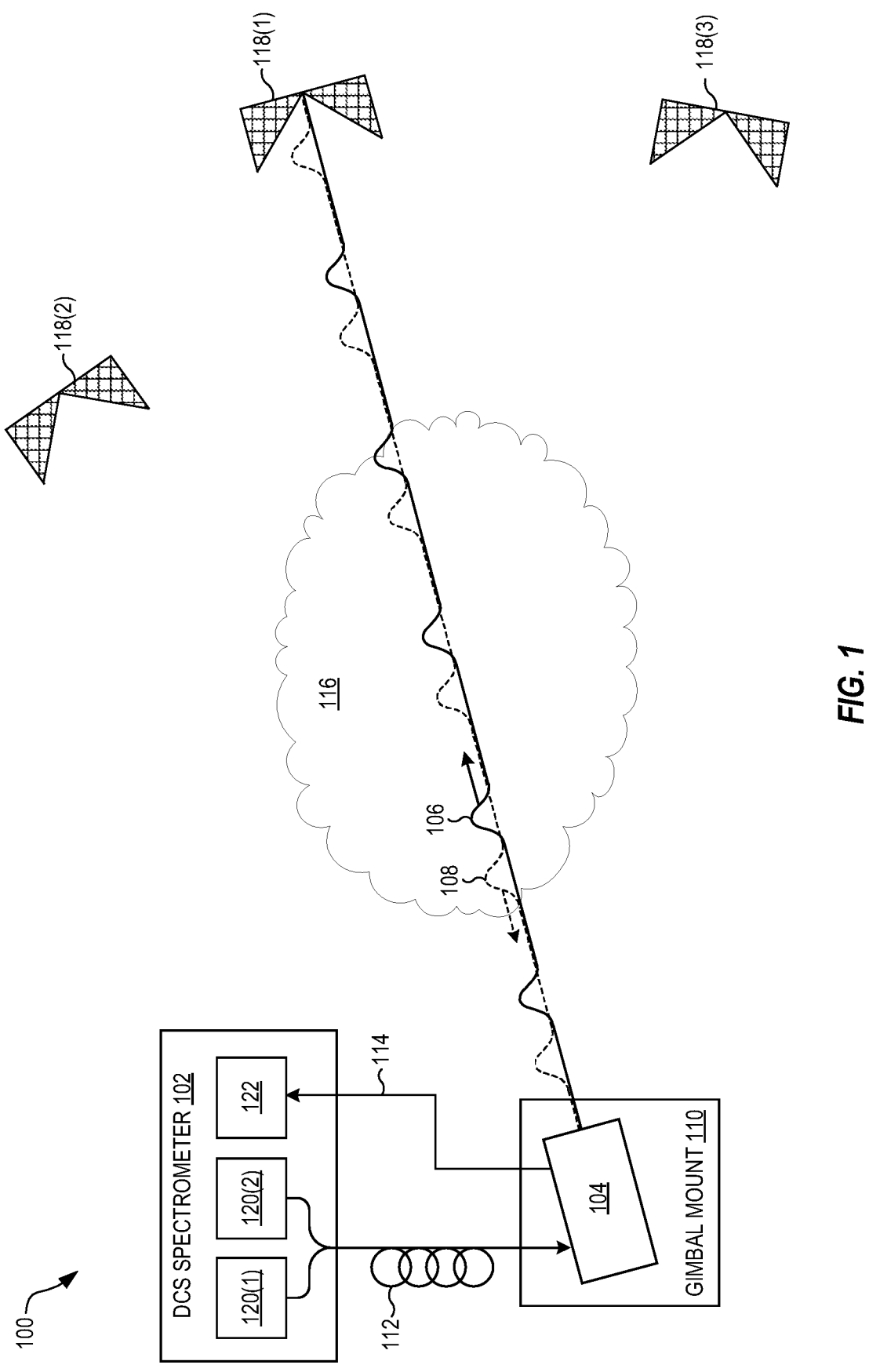
FIG. 1 is a functional diagram showing one example of a dual-comb spectroscopy (DCS) system that spectroscopically senses trace levels of a gas, in embodiments.

FIG. 1 is a functional diagram showing one example of a dual-comb spectroscopy (DCS) system 100 that spectroscopically senses trace levels of a gas 116. Gas 116 may be, for example, methane, acetylene, carbon dioxide, or another molecular species. DCS system 100 includes a DCS spectrometer 102 that generates a double pulse train 106 by combining first and second optical pulse trains outputted by respective first and second optical frequency combs 120(1), 120(2) (see also first and second optical pulse trains 210(1) and 210(2) in FIG. 2). Double pulse train 106 is delivered, via an optical fiber 112, to an optical transceiver 104 mounted on a gimbal mount 110. Optical transceiver 104 couples double pulse train 106 from optical fiber 112 into free space, and gimbal mount 110 is controlled to steer double pulse train 106 toward a retroreflector 118(1) that retroreflects double pulse train 106 into a retroreflected pulse train 108 that propagates back to optical transceiver 104. Optical transceiver 104 includes a photodetector that detects retroreflected pulse train 108 (see photodetector 220 in FIG. 2) and outputs a corresponding electrical signal to DCS spectrometer 102 via a data bus 114. DCS spectrometer 102 includes a data processing module 122 that receives and processes the photodetector signal to determine therefrom the presence of gas 116 along the path traversed by double pulse trains 106 and 108.

As described in more detail below, spectra of optical frequency combs 120(1) and 120(2) are configured such that spectral components of optical pulse train 106 match absorption features of gas 116. In particular, several gases of interest for trace gas measurement have absorption features between 1.5 and 2.2 μm. For example, the spectra may be configured such that double pulse train 106 has spectral components between 176 and 184 THz (i.e., wavelengths between 1.63 and 1.70 μm) for measuring methane. The spectra may be alternatively configured such that double pulse train 106 has spectral components between 193 and 198 THz (wavelengths between 1.52 and 1.55 μm) for measuring acetylene. Other gases with absorption features between 1.5 and 2.2 μm include water vapor and carbon dioxide.

While these examples describe absorption features in the infrared region of the electromagnetic spectrum, optical frequency combs 120(1) and 120(2) may be configured to measure gases with absorption features in other parts of the electromagnetic spectrum, such as the ultraviolet, visible, near-infrared, mid-infrared, and far-infrared regions. Thus, the term "optical", as used herein, is not limited to the visible part of the electromagnetic spectrum, and may refer to another region of the electromagnetic spectrum.

To detect or measure gas leaks that may occur, for example, at an oil or gas facility (e.g., well site, refinery, or chemical plant), a distance between optical transceiver 104 and retroreflector 118 may be one kilometer or more. To ensure that retroreflected pulse train 108 returns to optical transceiver 104, retroreflector 118 may be a corner-cube retroreflector, a cat's eye retroreflector, a hollow roof prism, or another type of optic that retroreflects an incident light beam identically regardless of the direction of the incident light beam. In embodiments where retroreflector 118 is a planar mirror, retroreflector 118 may be actively steered (e.g., via a motorized or piezo-actuated optical mount) to correctly retroreflect double pulse train 106 into retroreflected pulse train 108.

To identify one or more sources of gas 116 (i.e., gas leaks), it is frequently beneficial to acquire spectroscopic data along several paths throughout the spatial region of interest. Thus, several retroreflectors 118 may be positioned around the spatial region of interest, as shown in FIG. 1, and gimbal mount 110 may be controlled to steer double pulse train 106 to each of retroreflectors 118. Additional geometries for using DCS spectrometer 102 with several retroreflectors 118 to obtain spectroscopic data along several paths throughout the spatial region of interest may be found in (i) United States Patent Application Publication Number 2016/0334538, titled "Hub and Spoke System for Detecting and Locating Gas Leaks" and published on Nov. 17, 2016, (ii) United States Patent Application Publication Number 2018/0045596, titled "Determining a Location and Size of a Gas Source with a Spectrometer Gas Monitor" and published on Feb. 15, 2018, and (iii) International Publication Number WO 2018/075668, titled "Apparatus and Methods for Location and Sizing of Trace Gas Sources" and published on Apr. 26, 2018, all of which are incorporated herein by reference.

In FIG. 1, DCS spectrometer 102 is advantageously located separate from optical transceiver 104 such that DCS spectrometer 102 is not affixed to gimbal mount 110. Since DCS spectrometer 102 contains lasers and optical locks that are sensitive to vibrations and temperature fluctuations, DCS spectrometer 102 may be located in a vessel or room that environmentally isolates DCS spectrometer 102 from unnecessary mechanical motion (e.g., movement of gimbal mount 110), wind, precipitation (e.g., wind, ice, snow), and debris (e.g., branches, leaves, insects, bird droppings), thereby helping to improve robustness and reliability of DCS spectrometer 102. For example, DCS spectrometer 102 may be located in a van, building, or mobile office trailer near gimbal mount 110. Alternatively, optical fiber 112 and data bus 114 may be several kilometers long, wherein DCS spectrometer 102 is located several kilometers away from gimbal mount 110.

Principles of Dual-Comb Spectroscopy

Figure 2:
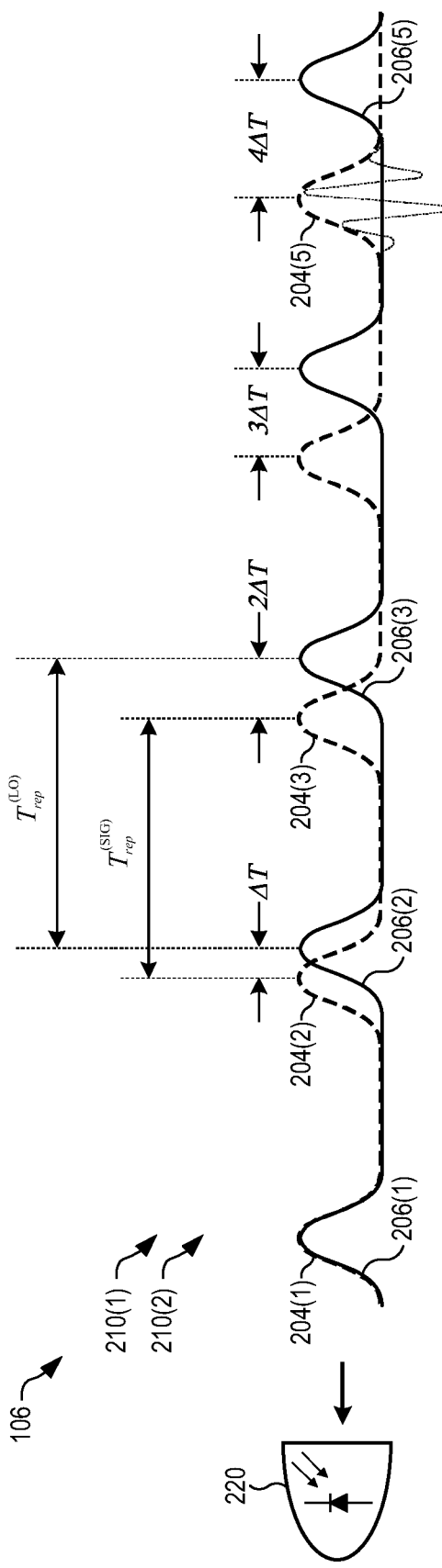
FIG. 2 shows how a double pulse train is formed by combining first and second optical pulse trains generated by respective first and second optical frequency combs.

FIG. 2 shows how double pulse train 106 is formed by combining first and second optical pulse trains 210(1), 210(2) generated by respective first and second optical frequency combs 120(1), 120(2) of FIG. 1. For clarity in the following description, first optical frequency comb 120(1) and corresponding first optical pulse train 210(1) may be referred to as "local oscillator" (LO) frequency comb 120(1) and LO pulse train 210(1), respectively, while second optical frequency comb 120(2) and second optical pulse train 210(2) may be referred to as "signal" (SIG) frequency comb 120(2) and SIG pulse train 210(2), respectively. SIG pulse train 210(2) is formed from a sequence of SIG pulses 204 that repeat with a repetition period $T_{rep}^{(SIG)}$), while LO pulse train 210(1) is formed from a sequence of LO pulses 206 that repeat with a repetition period) $T_{rep}^{(LO)}$ that is greater than repetition period $T_{rep}^{(SIG)}$ by a difference $\Delta T$ that is small compared to both) $T_{rep}^{(LO)}$ and $T_{rep}^{(SIG)}$, and that is smaller than, or comparable to, a temporal pulse width of each of pulses 204 and 206. In FIG. 2, LO pulse train 210(1) is shown as a solid line, and SIG pulse train 210(2) is shown as a dashed line.

In FIG. 2, a first SIG pulse 204(1) and a first LO pulse 206(1) are detected simultaneously by a photodetector 220. Due to the difference $\Delta T$ of repetition periods, a second LO pulse 206(2) lags a second SIG pulse 204(2) by $\Delta T$, a third LO pulse 206(3) lags a third SIG pulse 204(3) by $2\Delta T$, and so on. The difference $\Delta T$ may be chosen such that $T_{rep}^{(SIG)}$ is an integer multiple of $\Delta T$, i.e., $T_{rep}^{(SIG)} = m\,\Delta T$ for an integer m. Thus, the lag between the $m^{th}$ LO pulse 206 and the corresponding SIG pulse 204 is $T_{rep}^{(SIG)}$, in which case the $m^{th}$ LO pulse 206 is detected simultaneously with the (m+1)th SIG pulse 204, similar to first LO pulse 206(1) and first SIG pulse 204(1). Equivalently, double pulse train 106 is periodic with a period $T_{dpt} = (m-1)T_{rep}^{(LO)} = mT_{rep}^{(SIG)}$, and during one period $T_{dpt}$, SIG pulse train 210(2) generates m SIG pulses 204, and LO pulse train 210(1) generates m−1 LO pulses 206.

Photodetector 220 responds to the total intensity of pulse trains 220(1), 220(2) impinging thereon, including cross-terms that arise from interference between LO pulses 206 and SIG pulses 204. Thus, photodetector 220 outputs a photodetector signal that is a measure of the cross-correlation between pulse trains 210(1), 210(2). When an LO pulse and a SIG pulse coincide (i.e., have a large temporal overlap) at photodetector 220 (e.g., SIG pulse 204(1) and LO pulse 206(1)), constructive interference between the LO pulse and the SIG pulse generates a relatively large photodetector signal. When the LO pulse and the SIG pulse do not coincide (i.e., have a small temporal overlap) at photodetector 220 (e.g., SIG pulse 204(5) and LO pulse 206(5)), destructive interference between the LO pulse and the SIG pulse results in a small photodetector signal.

Figure 3:
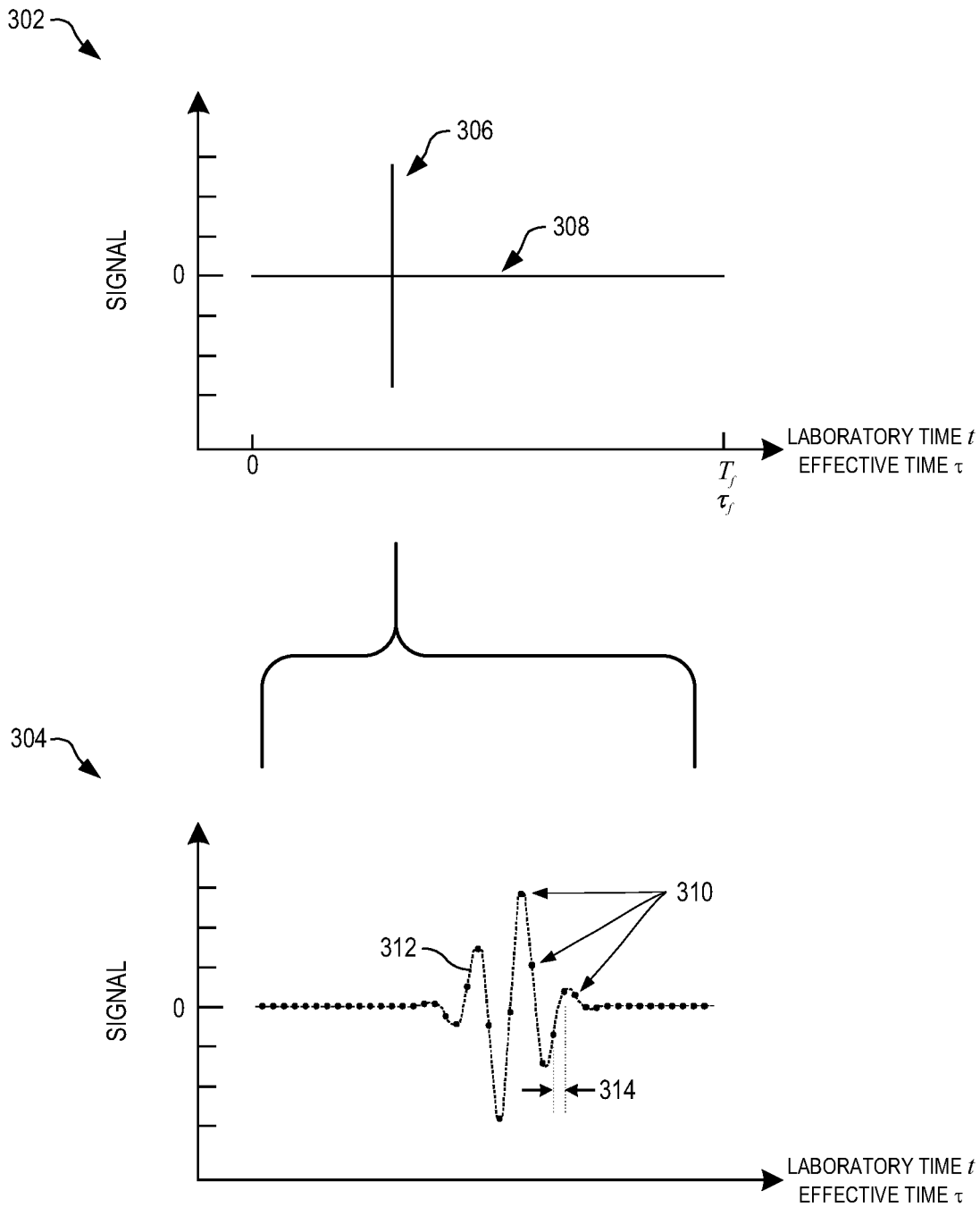
FIG. 3 shows one example of an interferogram obtained from a photodetector.

FIG. 3 shows one example of an interferogram 302 obtained from photodetector 220. Interferogram 302 contains m−1 data points that are obtained by sampling the output of photodetector 220 synchronously with m−1 consecutive LO pulses 206. Thus, in the laboratory, interferogram 302 is acquired in a frame time $T_f = (m-1)T_{rep}^{(LO)}$, which is shown in FIG. 3 relative to an initial time chosen to be zero. This "laboratory" time is denoted by t. Interferogram 302 contains a signal component 306, or "center burst", and a noise component 308.

FIG. 3 also shows a zoomed-in section 304 of center burst 306. In section 304, data points 310, equally spaced in time by a time step 314, are connected by a dashed line 312 to guide the eye. In laboratory time, time step 314 equals $T_{rep}^{(LO)}$. However, time step 314 also equals time lag $\Delta T$ that accrues between LO pulses 206 and SIG pulses 204 (see FIG. 2). Thus, the time axis of interferogram 402 may be scaled by $\Delta T/T_{rep}^{(LO)}$ to switch from laboratory time to an "equivalent" time denoted by $\tau$. In equivalent time, interferogram 302 represents the electric field of signal pulse train 210(1) as sampled by LO pulse train 210(1) with a time spacing of $\Delta T$. Thus, in equivalent time, interferogram 302 corresponds to a duration of $\tau_f = (m-1) \times \Delta T$.

The output of photodetector 220 repeats with a period equal to frame time $T_f$ (in laboratory time), and therefore interferogram 302 also repeats with the frame time $T_f$. As a result, several interferograms may be sequentially measured and averaged together to improve signal-to-noise ratio (SNR), provided that the total time to measure the several interferograms is less than the mutual coherence time of frequency combs 120(1), 120(2). Furthermore, the Fourier transform of interferogram 302 yields an absorption spectrum and/or optical transfer function of gas 116 from which a path-integrated quantity of gas 116 may be estimated.

Figure 4:
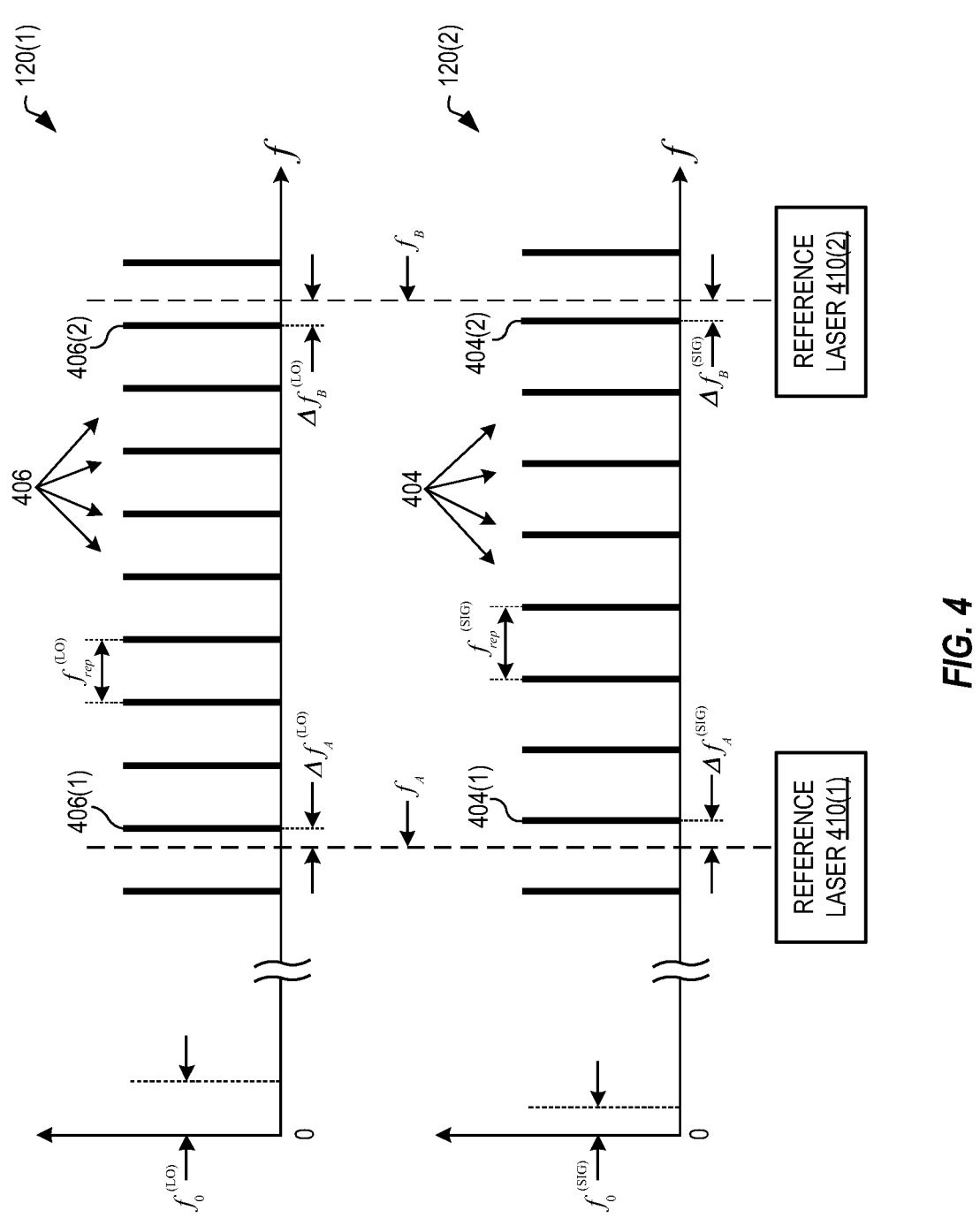
FIG. 4 compares frequency components of a local oscillator (LO) frequency comb and a signal (SIG) frequency comb, corresponding to a LO pulse train and a SIG pulse train, respectively, in embodiments.

FIG. 4 compares frequency components of LO frequency comb 120(1) and SIG frequency comb 120(2), corresponding to LO pulse train 210(1) and SIG pulse train 210(2), respectively. LO frequency comb 120(1) includes a plurality of coherent LO frequency components 406, or LO comb teeth 406, that are equally-spaced in frequency by a LO repetition rate $f_{rep}^{(LO)} = 1/T_{rep}^{(LO)}$. The LO repetition rate $f_{rep}^{(LO)}$ may also be referred to herein as a LO comb spacing. LO comb teeth 406 are also offset from zero frequency by a LO carrier-envelope offset (CEO) frequency $f_0^{(LO)}$ that has a value such that $-f_{rep}^{(LO)}/2 < f_0^{(LO)} \leq f_{rep}^{(LO)}/2$. Frequencies of LO comb teeth 406 may be represented mathematically by $f_n^{(LO)} = n f_{rep}^{(LO)} + f_0^{(LO)}$, where positive integer n indexes the frequencies $f_n^{(LO)}$. Similarly, SIG frequency comb 120(2) includes a plurality of coherent SIG frequency components 404, or SIG comb teeth 404, that are equally-spaced in frequency by a SIG repetition rate $f_{rep}^{(SIG)} = 1/T_{rep}^{(SIG)} = 1/(T_{rep}^{(LO)} - \Delta T)$. The SIG repetition rate $f_{rep}^{(LO)}$ may also be referred to herein as a SIG comb spacing. SIG comb teeth 404 are also offset from zero frequency by a SIG CEO frequency $f_0^{(SIG)}$ with a value such that $-f_{rep}^{(SIG)}/2 < f_0^{(SIG)} \leq f_{rep}^{(SIG)}/2$. Frequencies of SIG comb teeth 404 may be represented mathematically by $f_{n'}^{(SIG)} = n' f_{rep}^{(SIG)} + f_0^{(SIG)}$, where positive integer n' indexes the frequencies $f_{n'}^{(SIG)}$.

To measure or detect gas 116 with DCS system 100, a value of $\Delta T$ is selected and implemented by controlling repetition rates $f_{rep}^{(LO)}$ and $f_{rep}^{(SIG)}$ and CEO frequencies $f_0^{(LO)}$ and $f_0^{(SIG)}$. As described above, the value of $\Delta T$ may be chosen such that $\Delta T$ divides $T_{rep}^{(SIG)}$ by an integer m, wherein m−1 equals the number of data points in one interferogram. To ensure that the interferograms repeat every m LO pulses 206, comb teeth 404 and/or 406 are controlled to establish lower and upper anchor frequencies. At the lower anchor frequency, the frequency of one LO tooth 406 equals the frequency of one SIG tooth 404. At the upper anchor frequency, the frequency of another LO tooth 406 equals the frequency of another SIG tooth 404. Frequency combs 120(1), 120(2) should have no matching teeth 404, 406 at frequencies between the lower and upper anchor frequencies, which may be achieved by selecting $f_{rep}^{(LO)}$ and/or $f_{rep}^{(SIG)}$ such that the number of LO teeth 406 between the lower and upper anchor frequencies is one more than the number of SIG teeth 404 between the lower and upper anchor frequencies. The frequency range between upper and lower anchor frequencies is also be referred to herein as a "Nyquist window". The anchor frequencies should be chosen so that all spectral features of gas 116 to be detected fall within the Nyquist window.

Comb teeth 404, 406 may be controlled (e.g., via phase or frequency locking) to establish mutual coherence between pulse trains 210(1) and 210(2), thereby ensuring that photodetector 220 measures the cross-correlation between pulse trains 210(1), 210(2) rather than incoherent noise/jitter. Alternatively, jitter between pulse trains 210(1), 210(2) may be measured and used to correct interferograms obtained when frequency combs 120(1), 120(2) are not actively stabilized.

It is beneficial to frequency-stabilize LO teeth 406 and SIG teeth 404 to ensure that the optical phase of SIG pulse train 210(2) sampled by LO pulses 206 does not drift between a data point of one interferogram and the same data point of the next interferogram. It is additionally beneficial to absolutely frequency-stabilize comb teeth 404 and 406 so that spectral features obtained from the Fourier transform of an interferogram may be more easily compared to known absorption lines of gas 116, thereby facilitating the identification of gas 116.

To establish mutual coherence between frequency combs 120(1) and 120(2), and to stabilize teeth 404 and 406, frequency combs 120(1) and 120(2) may be stabilized to first and second reference lasers 410(1) and 410(2). Stabilizing LO frequency comb 120(1) means stabilizing the frequencies of all LO teeth 406 by controlling the LO CEO frequency $f_0^{(LO)}$ and the LO repetition rate $f_{rep}^{(LO)}$ (or LO comb spacing). Similarly, stabilizing SIG frequency comb 120(2) means stabilizing the frequencies of all SIG teeth 404 by controlling the SIG CEO frequency $f_0^{(SIG)}$ and the SIG repetition rate $f_{rep}^{(SIG)}$ (or SIG comb spacing).

As shown in FIG. 4, first reference laser 410(1) outputs first coherent light (see first coherent light 560 in FIG. 5) at a reference frequency $f_A$ that is closest in frequency to a LO tooth 406(1). Heterodyning the first coherent light and LO frequency comb 120(1) generates a first beat whose frequency may be locked, via a phase-lock loop, to a first frequency offset $\Delta f_A^{(LO)}$ by controlling the LO CEO frequency $f_0^{(LO)}$. This stabilizes the frequency of LO tooth 406(1) with a frequency stability and phase noise determined by first reference laser 410(1).

Second reference laser 410(2) outputs second coherent light (see second coherent light 570 in FIG. 5) at a reference frequency $f_B$, different from $f_A$, that is closest in frequency to a LO tooth 404(2). Heterodyning the second coherent light and LO frequency comb 120(1) generates a second beat whose frequency may be locked, via a phase-lock loop, to a second frequency offset $\Delta f_B^{(LO)}$ by controlling the LO repetition rate $f_{rep}^{(LO)}$. This stabilizes the frequency of LO tooth 406(2) with a frequency stability and phase noise determined by second reference laser 410(2).

Reference frequency $f_A$ is also closest in frequency to a SIG tooth 404(1). Heterodyning the first coherent light and SIG frequency comb 120(2) generates a third beat whose frequency may be locked, via a phase-lock loop, to a third frequency offset $\Delta f_A^{(SIG)}$ by controlling the SIG CEO frequency $f_0^{(SIG)}$ This stabilizes the frequency of SIG tooth 404(1) with a frequency stability and phase noise determined by first reference laser 410(1).

Similarly, reference frequency $f_B$ is also closest in frequency to a SIG tooth 404(2). Heterodyning the second coherent light and SIG frequency comb 120(2) generates a fourth beat whose frequency may be locked, via a phase-lock loop, to a fourth frequency offset $\Delta f_B^{(SIG)}$ by controlling the SIG repetition rate $f_{rep}^{(SIG)}$. This stabilizes the frequency of SIG tooth 404(2) with a frequency stability and phase noise determined by second reference laser 410(2).

When frequency combs 120(1) and 120(2) are tightly locked to first and second reference lasers 410(1), 410(2), mutual coherence is established between frequency combs 120(1) and 120(2). Here, "tightly locked" means that each of the phase-lock loops has a loop bandwidth and gain high enough to replace the intrinsic phase/frequency noise of frequency combs 120(1) and 120(2) with the phase/frequency noise (i.e., laser linewidth) of reference lasers 410(1) and 410(2) such that the phase/frequency noise of frequency combs 120(1), 120(2) is dominated by that of reference lasers 410(1) and 410(2).

When frequency combs 120(1) and 120(2) are locked to first and second reference lasers 410(1), 410(2), the frequency stability of any one of teeth 404 and 406 is determined by a combination of the frequency stabilities of reference lasers 410(1) and 410(2). Thus, teeth 404 and 406 will drift in frequency as reference frequencies $f_A$ and $f_B$ drift. Many laser systems that can serve as first and second reference lasers 410(1) and 410(2) do not have sufficient levels of intrinsic frequency stability for DCS, and may be actively frequency-stabilized to reduce this drift to acceptable levels for DCS.

Simplified DCS Spectrometer for Portable Remote Gas Sensing

To properly identify a trace gas, frequencies of teeth 404, 406 must be known. That is, optical frequency combs 120(1) and 120(2) must be calibrated for accuracy. A Fourier transform of interferogram 302 generates a series of frequency-data points that are spaced in frequency by $\Delta f_{rep} = f_{rep}^{(SIG)} - f_{rep}^{(LO)}$, which can be accurately measured with a frequency counter. The frequency-data points are offset in frequency by the lower anchor frequency, which can be determined from reference frequencies $f_A$ and/or $f_B$, and frequency offsets $\Delta f_A^{(SIG)}$, $\Delta f_A^{(LO)}$, $\Delta f_B^{(SIG)}$, and/or $\Delta f_B^{(LO)}$. Since the frequency offsets are known, calibration of optical frequency combs 120(1), 120(2) is most challenged by accurately determining laser frequencies $f_A$ and $f_B$. Laser frequencies $f_A$ and $f_B$ can be determined with one of optical frequency combs 120(1) and 120(2), but only if $f_A$ and $f_B$ are known to within the comb spacing $f_{rep}$. To measure $f_A$ and $f_B$ to this level of precision requires a high-performance wavemeter that increases the size, weight, and complexity of DCS system 100, and thus inhibits portability of DCS system 100.

Figure 5:
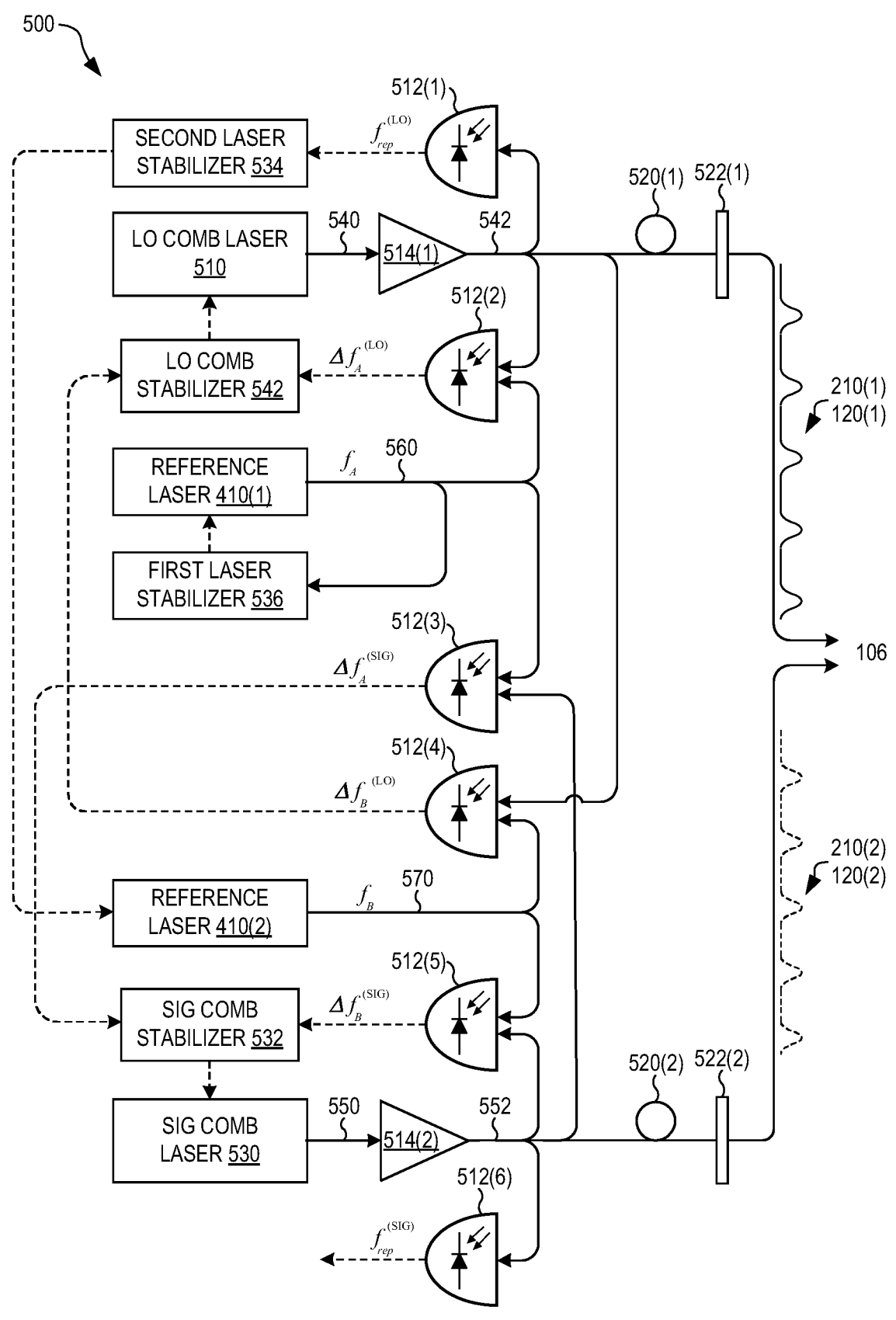
FIG. 5 is a functional diagram of a dual frequency-comb source (DFCS) that advantageously frequency-stabilizes a first reference laser to a transition in an atomic or molecular vapor, thereby establishing the laser frequency of the first reference laser as the frequency of the transition, in embodiments.

FIG. 5 is a functional diagram of a dual frequency-comb source (DFCS) 500 that advantageously frequency-stabilizes first reference laser 410(1) to a transition in an atomic or molecular vapor, thereby establishing the laser frequency $f_A$ as the frequency of the transition. The transition frequency, based on the atomic or molecular species of the vapor, is known with sufficient accuracy that optical frequency combs 120(1) and 120(2) can be calibrated without a high-performance wavemeter. Given that (i) the spectral features to be measured in gas 116 are Doppler-broadened to widths of several gigahertz, and (ii) the comb spacings $f_{rep}$ of optical frequency combs 120(1) and 120(2) are typically greater than 50 MHz, the laser frequency $f_A$ only needs to be stabilized and accurately determined to within 25 MHz. An accuracy of just a few megahertz can be readily achieved by locking $f_A$ to any of several atomic and molecular species in a robust, compact vapor-cell-based spectrometer, even over a wide variety of environmental and operating parameters (e.g., temperature of the vapor cell, laser power probing the vapor, etc.). DFCS 500 may be used with DCS spectrometer 102 of FIG. 1.

Advantageously, DFCS 500 stabilizes all comb teeth 404, 406 of both frequency combs 120(1), 120(2) without f-2f interferometers typically used to detect CEO frequencies $f_0^{(LO)}$ and $f_0^{(SIG)}$. Thus, DFCS 500 does not require each of frequency combs 120(1), 120(2) to span more than an octave in frequency, thereby relaxing the requirements for their generation. By operating without f-2f interferometers, DFCS 500 eliminates two optical amplifiers, two nonlinear optical fibers, and two frequency-doubling crystals, among other components, advantageously improving portability and reliability by reducing component count and power consumption.

DFCS 500 includes a LO comb laser 510 that generates a first optical pulse train 540 that is amplified by a first optical amplifier 514(1) into a first amplified pulse train 542. DFCS 500 also includes a SIG comb laser 530 that generates a second optical pulse train 550 that is amplified by a second optical amplifier 514(2) into a second amplified pulse train 552. LO comb laser 510 and SIG comb laser 530 may each be any type of pulsed laser whose output train has a frequency-comb-like structure. For example, LO comb laser 510 and SIG comb laser 530 may each be a solid-state pulsed laser, such as a Kerr-lens, mode-locked, titanium: sapphire laser. Alternatively, LO comb laser 510 and SIG comb laser 530 may each be a mode-locked fiber laser based on a fiber doped with erbium, ytterbium, holmium, or thulium. Alternatively, LO comb laser 510 and SIG comb laser 530 may each be a mode-locked diode laser, mode-locked disc laser, or another type of mode-locked laser. When LO comb laser 510 and SIG comb laser 530 are mode-locked pulsed lasers, LO comb laser 510 and SIG comb laser 530 may be implemented with active mode-locking, passive mode-locking, or a hybrid thereof.

DFCS 500 also includes first reference laser 410(1) that outputs a first coherent light 560 at reference frequency $f_A$, and second reference laser 410(2) that output second coherent light 570 at reference frequency $f_B$. First and second reference lasers 410(1), 410(2) may be any type of tunable, single-frequency laser whose output has a frequency that overlaps with first and second frequency combs 120(1), 120(2) for heterodyning therewith. For example, first and second reference lasers 410(1), 410(2) may each be a continuous-wave (cw) diode laser (e.g., external-cavity diode laser, distributed Bragg reflector (DBR) diode laser, distributed feedback laser (DFB), vertical-cavity surface-emitting laser (VCSEL), quantum cascade laser, etc.), fiber laser (e.g., erbium-doped, ytterbium-doped, etc.), solid-state laser (e.g., Nd:YAG laser), or gas laser (e.g., He—Ne laser). First reference laser 410(1) may include a frequency-doubling crystal (e.g., potassium titanyl phosphate (KTP), lithium niobate ($LiNbO_3$), potassium niobate ($KNbO_3$), etc.), or another type of nonlinear optical element, so that frequency $f_A$ of first coherent light 560 overlaps with first and second frequency combs 120(1), 120(2) for heterodyning therewith; second reference laser 410(2) may also include a frequency-doubling crystal for similar reasons.

DFCS 500 also includes a first laser stabilizer 536 that samples first coherent light 560 and controls first reference laser 410(1) to stabilize the frequency $f_A$. First laser stabilizer 536 may include a vapor-cell spectrometer used to generate a feedback signal for locking $f_A$ to a transition in the vapor. In one embodiment, the vapor spectrometer includes a vapor cell containing an atomic or molecular gas probed with first coherent light 560 in a Doppler-free configuration (i.e., overlapping, counterpropagating probe and pump beams) to generate a dispersive signal, at a transition in the atomic or molecular species, that is fed back to first reference laser 410(1) to stabilize $f_A$ to the transition frequency. In another embodiment, first laser stabilizer 536 is a phase-lock loop that phase-locks first reference laser 410(1) to another reference laser (not shown in FIG. 5) whose output is more frequency-stable than $f_A$ when first reference laser 410(1) is free-running. In another embodiment, first laser stabilizer 536 is a phase-lock loop that phase-locks first reference laser 410(1) to a third frequency comb (not shown in FIG. 5) whose frequency components are more frequency-stable than $f_A$ when first reference laser 410(1) is free-running. The third frequency comb may be self-referenced and locked to a RF frequency standard such that all frequency components of the third frequency comb are accurate relative to the RF frequency standard. First laser stabilizer 536 may also include a frequency-doubling crystal (e.g., KTP, $LiNbO_3$, $KNbO_3$, etc.), or another type of nonlinear optical element, such that frequency $f_A$ is suitable for generating a dispersive feedback signal (e.g., to resonate with an atomic transition in a vapor). First laser stabilizer

536 may be another type of optical/electrical device that controls first reference laser 410(1) to stabilize $f_A$ without departing from the scope hereof.

DFCS 500 includes: (i) a first photodetector 512(1) that samples first amplified pulse train 542 for measuring the LO repetition rate $f_{rep}^{(LO)}$, (ii) a second photodetector 512(2) that detects the first beat between first amplified pulse train 542 and first coherent light 560, (iii) a third photodetector 512(3) that detects the third beat between second amplified pulse train 552 and first coherent light 560, (iv) a fourth photodetector 512(4) that detects the second beat between first amplified pulse train 542 and second coherent light 570, (v) a fifth photodetector 512(5) that detects the fourth beat between second amplified pulse train 552 and second coherent light 570, and (vi) a sixth photodetector 512(6) that samples second amplified pulse train 552 for measuring the SIG repetition rate $f_{rep}^{(SIG)}$.

DFCS 500 also includes a LO comb stabilizer 542 that locks the first beat to a selected value of $\Delta f_A^{(LO)}$ controlling LO comb laser 510 to change the CEO frequency $f_0^{(LO)}$. LO comb stabilizer 542 also locks the second beat to a selected value of $\Delta f_B^{(LO)}$ by controlling LO comb laser 510 to change the repetition rate $f_{rep}^{(LO)}$. For example, LO comb stabilizer 542 may phase-lock the first beat to $\Delta f_A^{(LO)}$ by controlling a pump that powers LO comb laser 510, and phase-lock the second beat to $\Delta f_B^{(LO)}$ by controlling a cavity spacing of LO comb laser 510. The lock frequencies $\Delta f_A^{(LO)}$ and $\Delta f_B^{(LO)}$ are RF frequencies that may be generated from a common RF frequency reference (e.g., quartz oscillator, microwave atomic clock, atomic frequency standard, maser, etc.) using frequency synthesis techniques known in the art.

DFCS 500 also includes a SIG comb stabilizer 532 that locks the third beat to a selected value of $\Delta f_A^{(SIG)}$ by controlling SIG comb laser 530 to change the CEO frequency $f_0^{(SIG)}$. SIG comb stabilizer 532 also locks the fourth beat to a selected value of $\Delta f_B^{(SIG)}$ by controlling SIG comb laser 530 to change the repetition rate $f_{rep}^{(SIG)}$. For example, SIG comb stabilizer 532 may phase-lock the third beat to $\Delta f_A^{(SIG)}$ by controlling a pump that powers SIG comb laser 530, and phase-lock the fourth beat to $\Delta f_B^{(SIG)}$ by controlling a cavity spacing of SIG comb laser 530. The lock frequencies $\Delta f_A^{(SIG)}$ and $\Delta f_B^{(SIG)}$ are RF frequencies that may be synthesized from the same frequency reference used to generate $\Delta f_A^{(LO)}$ and $\Delta f_B^{(LO)}$.

DFCS 500 also includes a second laser stabilizer 534 that uses the repetition rate $f_{rep}^{(LO)}$ as measured by first photodetector 510(1), to control second reference laser 410(2) to stabilize frequency $f_B$. When LO comb laser 510 is phase-locked to second reference laser 410(2) via control of the LO repetition rate $f_{rep}^{(LO)}$, drift of frequency $f_B$ is detectable as a change in $f_{rep}^{(LO)}$. Second laser stabilizer 534 compares the measured $f_{rep}^{(LO)}$ to a chosen locking frequency to generate a frequency correction, and controls second reference laser 410(2) according to the frequency correction to change $f_B$ so that the measured $f_{rep}^{(LO)}$ equals the chosen locking frequency, thereby stabilizing frequency $f_B$. The chosen lock frequency may be frequency synthesized from the same frequency reference used to generate $\Delta f_A^{(LO)}$, $\Delta f_B^{(LO)}$, $\Delta f_A^{(SIG)}$ and $\Delta f_B^{(SIG)}$.

In certain embodiments, DFCS 500 includes a first nonlinear optical fiber 520(1) that spectrally broadens first amplified pulse train 542 such that LO frequency comb 120(1) has a spectral width that covers spectral features (i.e., absorption lines) of interest in gas 116. Similarly, DFCS 500 may include a second nonlinear optical fiber 520(2) that spectrally broadens second amplified pulse train 532 such that SIG frequency comb 120(2) also has a spectral width that covers the spectral features of interest. Each of nonlinear optical fibers 520(1), 520(2) may be any type of nonlinear optical element that spectrally broadens an optical pulse train (e.g., amplified pulse trains 542, 532) while preserving the coherent comb-like structure of the optical pulse train. For example, each of nonlinear optical fibers 520(1), 520(2) may be a highly nonlinear optical fiber, an air-silica microstructure fiber, a photonic crystal fiber, or another type of nonlinear optical element that uses self-phase modulation and/or four-wave mixing to implement spectral broadening.

While FIG. 5 shows first nonlinear optical fiber 520(1) after photodetectors 512(1), 512(2), and 512(4), first nonlinear optical fiber 520(1) may be alternatively located before any of photodetectors 512(1), 512(2), and 512(4). Such an alternative location may be beneficial if the spectral broadening introduced by first nonlinear optical fiber 520(1) improves the SNR of the detected heterodyne beat(s). Similar arguments hold for the location of second nonlinear optical fiber 520(2) relative to photodetectors 512(3), 512(4), and 512(6).

As shown in FIG. 5, DFCS 500 may include first and second optical filters 522(1), 522(2) that filter respective LO and SIG frequency combs 120(1), 120(2) to block comb teeth 404, 406 lying outside of the spectral region of interest (i.e., Nyquist window) that may cause aliasing of the interferogram. Thus, each of first and second optical filters 522(1), 522(2) may block comb teeth 404, 406 with frequencies below the lower anchor frequency and above the upper anchor frequency.

In some embodiments, DFCS 500 is configured without one or both of optical amplifiers 514(1), 514(2) when one or both of LO comb laser 510 and SIG comb laser 530 outputs a frequency comb of sufficient spectral width and power for detecting gas 116. Optical amplifiers 514(1), 514(2) boost the optical power of respective optical pulse trains 540, 530 to improve spectral broadening in corresponding nonlinear optical fibers 520(1), 520(2). Thus, in embodiments where nonlinear optical fibers 520(1), 520(2) are not included in DFCS 500, optical amplifiers 514(1), 512(2) may not be needed, advantageously improving portability by reducing component count and power consumption, and advantageously improving reliability by removing components with limited operational lifetimes (i.e., optical amplifiers).

The accuracy and stability of any one of comb teeth 404, 406 ultimately derives from (i) the accuracy and stability of the RF frequency reference used to generate $\Delta f_A^{(LO)}$, $\Delta f_B^{(LO)}$, $\Delta f_A^{(SIG)}$, $\Delta f_B^{(SIG)}$, and the lock frequency for locking $f_{rep}^{(SIG)}$, and (ii) the accuracy and stability of first reference laser 410(1), when locked via first laser stabilizer 536. The RF frequency reference may be linked to the cesium second (e.g., via locking to a GPS signal or cesium atomic standard), thereby ensuring high accuracy of all RF locking frequencies. The accuracy of first reference laser 410(1) may be determined via calibration, or previous knowledge of the transition frequency of the atomic or molecular transition to which first reference laser 410(1) is locked.

As an example of first reference laser 410(1) and first laser stabilizer 536, first reference laser 410(1) may be a diode laser at 1560 nm, and first laser stabilizer 536 may include a frequency-doubling crystal that converts the light at 1560 nm into light at 780 nm. First laser stabilizer 536 may also include a rubidium vapor-cell spectrometer for locking the frequency-doubled light to the $D_2$ transition in rubidium. The frequency of this transition is known with an accuracy of a few kHz, and a compact rubidium vapor-cell spectrometer can be used to stabilize a laser frequency to within 1 MHz of the transition frequency. First laser stabilizer 536 may lock the frequency $f_A$ to the transition using any technique known in the art, including saturated absorption spectroscopy, first-derivative locking, third-derivative locking, frequency-modulation spectroscopy, modulation transfer spectroscopy, polarization spectroscopy, and dichroic atomic vapor laser locking (DAVLL).

As another example, first reference laser 410(1) may be a diode laser outputting first coherent light 560 at 1704 nm, wherein first laser stabilizer 536 includes a frequency-doubling crystal that converts first coherent light 560 into frequency-doubled light at 852 nm. First laser stabilizer 536 may also include a cesium vapor cell spectrometer for locking the frequency-doubled light to the $D_2$ transition in cesium. Alternatively, first laser stabilizer 536 may contain a vapor cell of gas 116 (e.g., methane), wherein first last stabilizer 536 stabilizes the frequency $f_A$ of first reference laser 410(1) to a transition in gas 116 without frequency doubling. Other atomic and molecular species that may be used to form a vapor cell spectrometer include potassium (K), argon (Ar), krypton (Kr), iodine ($I_2$), tellurium ($Te_2$), water vapor ($H_2O$), ethane ($C_2H_6$), acetylene ($C_2H_6$), carbon monoxide (CO), carbon dioxide ($CO_2$), and hydrogen cyanide (HCN).

In FIG. 5, first and second amplified pulse trains 542, 552 are split into different portions for detecting various heterodyne beats and generating pulse trains 210(1), 210(2). When gas 116 is detected based on spectral features in the infrared (e.g., 1.3-1.8 microns), DFCS 500 may be implemented with all fiber-optic components. In this case, first and second amplified pulse trains 542, 552 may be split via fiber-optic beamsplitters. Alternatively, first and second amplified pulse trains 542, 552 may be split via free-space beamsplitters (e.g., plates, cubes) when first and second amplified pulse trains 542, 552 propagate through free space.

First optical pulse train 210(1) (corresponding to LO frequency comb 120(1)) and second optical pulse train 210(2) (corresponding to SIG frequency comb 120(2)) may be combined (via a beam splitter or beam combiner) into one optical beam to form double pulse train 106, as shown in FIG. 5. Double pulse train 106 may then be coupled into optical fiber 112 for delivery to optical transceiver 104, as shown in FIG. 1.

In some embodiments, second reference laser 410(2) is frequency-stabilized similarly to first reference laser 410(1). For example, second reference laser 410(2) may also be locked to an atomic or molecular transition, via measurement in a vapor cell spectrometer. In these embodiments, second laser stabilizer 534 samples second coherent light 570 similarly to how first laser stabilizer 534 samples first coherent light 560. Second laser stabilizer 534 then controls second reference laser 410(2) to stabilize the frequency $f_B$ of second reference laser 410(2) to the atomic or molecular transition probed in the vapor cell spectrometer.

In embodiments where both first and second reference lasers 410(1), 410(2) are stabilized to atomic/molecular transitions, first and second laser stabilizers 410(1), 410(2) may be combined to use one vapor cell, advantageously reducing component count and eliminating a possible source of differential frequency drift between $f_A$ and $f_B$. For example, when first reference laser 410(1) is a diode laser at 1560 nm whose output is frequency-doubled for locking to the $D_2$ transition in rubidium at 780 nm, second reference laser 410(2) may be a diode laser at 1590 nm whose output is frequency-doubled for locking to the $D_1$ transition in rubidium at 795 nm. Both transitions may be probed by passing both frequency-doubled beams through one rubidium vapor cell. The vapor cell may be filled with two species of vapor such that first and second reference lasers 410(1), 410(2) are stabilized to transitions in different species. For example, when first reference laser 410(1) is a diode laser at 1560 nm whose output is frequency-doubled for locking to the $D_2$ transition in rubidium at 780 nm, second reference laser 410(2) may be a diode laser at 1704 nm whose output is frequency-doubled for locking to the $D_2$ transition in cesium at 852 nm. Other combinations of vapors may be used without departing from the scope hereof.

While FIG. 5 shows second laser stabilizer 534 controlling second reference laser 410(2) to stabilize the frequency $f_B$ via measurements of the LO repetition rate $f_{rep}^{(LO)}$, second laser stabilizer 534 may be alternatively configured to stabilize the frequency $f_B$ via measurements of the SIG repetition rate $f_{rep}^{(SIG)}$. Specifically, when SIG comb laser 530 is phase-locked to second reference laser 410(2) via control of the SIG repetition rate $f_{rep}^{(SIG)}$, drift of frequency $f_B$ is detectable as a change in $f_{rep}^{(SIG)}$ measured by sixth photodetector 512(6). Second laser stabilizer 534 compares the measured $f_{rep}^{(SIG)}$ to a chosen locking frequency to generate a frequency correction, and controls second reference laser 410(2) according to the frequency correction to change $f_B$ so that the measured $f_{rep}^{(SIG)}$ equals the chosen locking frequency, thereby stabilizing frequency $f_B$.

Figure 6:
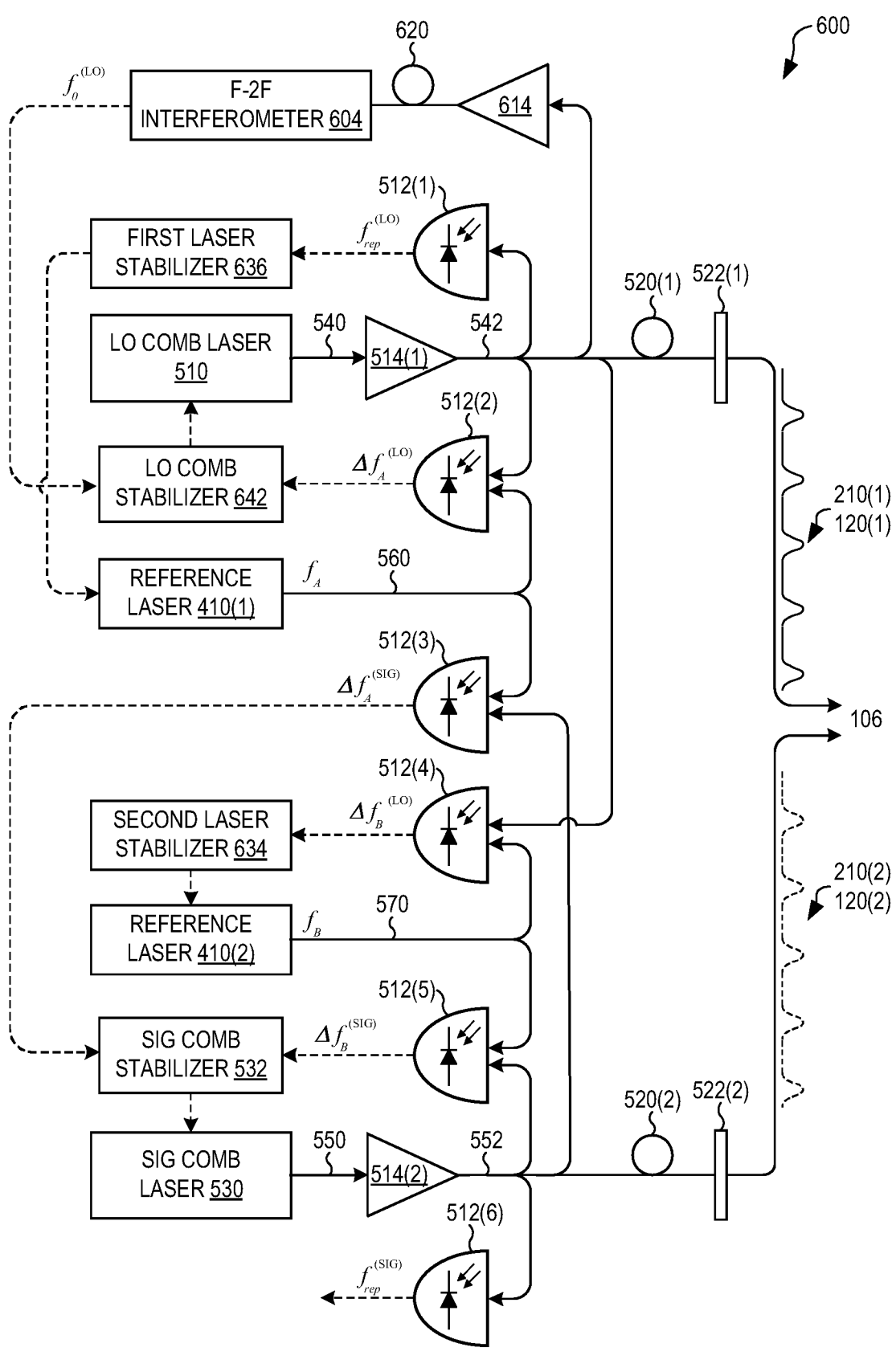
FIG. 6 is a functional diagram of a DFCS that is similar to the DFCS of FIG. 5, except that the DFCS of FIG. 6 includes one f-2f interferometer for detecting and stabilizing a carrier-envelope offset (CEO) frequency, in embodiments.

FIG. 6 is a functional diagram of a DFCS 600 that is similar to DFCS 500 of FIG. 5, except that DFCS 600 includes one f-2f interferometer 604 for detecting and stabilizing the CEO frequency $f_0^{(LO)}$. Advantageously, DFCS 600 stabilizes all comb teeth 404, 406 to the common RF frequency reference using only one f-2f interferometer 604. DFCS 600 operates without first reference laser 410(1) being locked to an atomic or molecular transition.

To detect to $f_0^{(LO)}$ with f-2f interferometer 604, DFCS 600 includes an optical amplifier 614 and nonlinear optical fiber 620 for broadening the spectrum of first amplified pulse train 542 to extend over an octave. Alternatively, f-2f interferometer 604 may sample first amplified pulse train 542 after spectral broadening in nonlinear optical fiber 520(1). Although not shown in FIG. 6, f-2f interferometer 604 may include a frequency-doubling crystal configured for doubling the frequencies of LO comb teeth 406 covering a low-frequency portion of LO frequency comb 120(1). Furthermore, f-2f interferometer 604 may include an additional photodetector (similar to any of photodetectors 512) for detecting a heterodyne beat between the frequency-doubled low-frequency portion and a high-frequency portion of LO frequency comb 120(1). The lowest-frequency beat detected by this additional photodetector is $f_0^{(LO)}$.

DFCS 600 includes an LO comb stabilizer 642 that is similar to LO comb stabilizer 542 of DFCS 500, except that LO comb stabilizer 642 phase-locks $f_0^{(LO)}$ to a selected lock frequency. The lock frequency may be generated from the common RF frequency reference. LO comb stabilizer 642 phase locks the first beat, detected by photodetector 512(2), to a selected value of $\Delta f_A^{(LO)}$ by controlling LO comb laser 510 to change the repetition rate $f_{rep}^{(LO)}$. DFCS 600 also includes a first laser stabilizer 636 that measures the repetition rate $f_{rep}^{(LO)}$ detected by photodetector 512(1), and controls first reference laser 410(1) to change $f_A$ so that $f_{rep}^{(LO)}$ is locked to a desired repetition rate. That is, first laser stabilizer 636 stabilizes $f_A$ similarly to how second laser stabilizer 534 stabilizes frequency $f_B$ of second reference laser 410(2) in FIG. 5.

With LO comb stabilizer 642 and first laser stabilizer 636, all LO comb teeth 406 are locked with respect to the common RF frequency reference. When the common frequency reference is traceable to the cesium second, the frequencies of all LO teeth 406 have absolute accuracy. Furthermore, locking $f_{rep}^{(LO)}$ by controlling $f_A$ advantageously transfers the narrow linewidth of first coherent light 560 to LO teeth 406, which may be 10 kHz, or less. By comparison, when $f_{rep}^{(LO)}$ is phase-locked by directly controlling LO comb laser 510, the phase noise of one LO tooth 406 will equal the phase noise of the common RF frequency reference, scaled up by the ratio of the frequency of the one LO tooth 406 to the frequency of the reference (e.g., 10 MHz). This scale factor, which may be 107 or more, is so large that the one LO tooth 406 will be significantly phase/frequency-broadened, reducing spectral sensitivity.

To frequency-stabilize SIG comb teeth 404, DFCS 600 includes a second laser stabilizer 634 that phase-locks second reference laser 410(2) to LO tooth 406(2) using the second beat detected by photodetector 512(4). Thus, second laser stabilizer 634 transfers the phase noise and frequency stability of LO tooth 406(2) to frequency $f_B$. DFCS 600 also includes SIG comb stabilizer 532, which controls signal comb laser 530 to phase-lock the third beat, detected by photodetector 512(3), to $\Delta f_A^{(SIG)}$, and which controls signal comb laser 530 to phase-lock the fourth beat, detected by photodetector 512(5), to $\Delta f_B^{(SIG)}$. Thus, SIG comb stabilizer 532, by locking SIG comb laser 530 to first and second reference lasers 410(1), 410(2), transfers the accuracy and frequency stability of the common RF frequency reference to all SIG teeth 404.

FIG. 7A is a flow chart of a frequency-stabilization method 700 for field-deployable dual frequency-comb spectroscopy. Method 700 frequency-stabilizes teeth of first and second frequency combs relative to a single RF frequency reference and a frequency-stabilized first reference laser. Method 700 also establishes coherence between the first and second frequency combs based on coherence of the first and second reference lasers. Method 700 may be implemented with DFCS 500 of FIG. 5.

Method 700 includes steps 708, 710, 712, and 714, which may occur in any order. In step 708, a first tooth, of a first frequency comb of teeth equally-spaced by a first comb spacing and shifted from zero by a first CEO frequency, is locked to a first reference laser by controlling the first CEO frequency. In some embodiments, the first reference laser is locked to an atomic or molecular transition. In one example of step 708, LO tooth 406(1) is phase-locked to first reference laser 410(1) at the first frequency offset $\Delta f_A^{(LO)}$ (see FIG. 4). In step 710, a second tooth, of the first frequency comb, is locked to a second reference laser by controlling the first comb spacing. In one example of step 710, LO tooth 406(2) is phase-locked to second reference laser 410(2) at the second frequency offset $\Delta f_B^{LO}$.

In step 712, a third tooth, of a second frequency comb of teeth equally-spaced by a second comb spacing and shifted from zero by a second CEO frequency, is locked to the first reference laser by controlling the second CEO frequency. In one example of step 712, SIG tooth 404(1) is phase-locked to first reference laser 410(1) at the third frequency offset $\Delta f_A^{(SIG)}$. In step 714, fourth tooth, of the second frequency comb, is locked to the second reference laser by controlling the second comb spacing. In one example of step 714, SIG tooth 406(2) is phase-locked to second reference laser 410(2) at the fourth frequency offset $\Delta f_B^{(SIG)}$.

Method 700 also includes a step 716 to frequency-stabilize the second reference laser to a RF frequency reference by controlling the second reference laser to lock the first comb spacing. In one example of step 716, first photodetector 512(1) and second laser stabilizer 534 of DFCS 500 cooperate to measure the LO repetition rate $f_{rep}^{(LO)}$ and control second reference laser 410(2) to stabilize laser frequency $f_B$ relative to the RF frequency reference. In one embodiment, step 716 alternatively frequency-stabilizes the second reference laser to the RF frequency reference by controlling the second reference laser to lock the second comb spacing. In one example of step 716 of this embodiment, sixth photodetector 512(6) and second laser stabilizer 534 of DFCS 500 cooperate to measure the SIG repetition rate $f_{rep}^{(SIG)}$ and control second reference laser 410(2) to stabilize laser frequency $f_B$ relative to the RF frequency reference.

In some embodiments, method 700 includes a step 718 to spectrally broadening the first and second frequency combs, in respective first and second nonlinear fibers, into first and second spectra that cover spectral lines of a gas to be spectroscopically detected with the first and second spectra. In one example of step 718, first and second nonlinear optical fiber 520(1), 520(2) of DFCS 500 spectrally broaden respective amplified pulse trains 542, 552 such that respective frequency combs 120(1), 120(2) have a spectral width that covers spectral features (i.e., absorption lines) of interest in gas 116. In one of these embodiments, the first and second spectra contain infrared light. In another of these embodiments, the target gas is one or more of methane, carbon dioxide, carbon monoxide, hydrogen sulfide, acetylene, ethylene, propane, butane, ethane, and water vapor. In another of these embodiments, method 700 includes spectroscopically measuring a gaseous sample with the first and second spectra to detect the target gas in the gaseous sample. In one example of spectroscopically measuring, pulse trains 106, 108 traverse gas 116 to detect the target gas therein (see FIG. 1).

In some embodiments, method 700 includes a step 702 to generate the first frequency comb with a first mode-locked laser, and a step 704 to generate the second frequency comb with a second mode-locked laser. In one of these embodiments, each of the first and second mode-locked lasers is a femtosecond fiber laser. Each femtosecond fiber laser may an erbium-fiber laser operating in the infrared with a repetition rate $f_{rep}$ between 10 and 1000 MHz. In one example of step 702, LO comb laser 510 generates first optical pulse train 540 that is subsequently processed (e.g., amplified and spectrally broadened) to become LO frequency comb 120 (1), and SIG comb laser 530 generates second optical pulse train 550 that is subsequently processed to become SIG frequency comb 120(2).

In embodiments that include the first and second mode-locked lasers, the first mode-locked laser may form a first cavity of a first cavity length, wherein step 710 may be implemented by controlling the first cavity length. Similarly, the second mode-locked laser may form a second cavity of a second cavity length, wherein step 714 may be implemented by controlling the second cavity length. Furthermore, the first mode-locked laser may be powered by a first pump that outputs a first pump level (e.g., an optical power level), wherein step 708 may be implemented by controlling the first pump level. Similarly, the second mode-locked laser may be powered by a second pump that outputs a second pump level, wherein step 712 may be implemented by controlling the second pump level.

In some embodiments, method 700 includes a step 706 to lock the first reference laser to an atomic or molecular transition such that the frequency of the first reference laser is stabilized to the frequency of the atomic or molecular transition. In one example of step 706, first laser stabilizer 536 of DFCS 500 samples first coherent light 560 and controls first reference laser 410(1) to stabilize the frequency $f_A$. First laser stabilizer 536 may include a vapor-cell spectrometer with a vapor cell containing a gas that is spectroscopically probed by the sampled first coherent light 560 to generate a feedback signal for locking $f_A$ to a transition in the gas.

FIG. 7B is a flow chart of a frequency-stabilization method 752 for field-deployable dual frequency-comb spectroscopy. Method 750 includes steps 756, 758, 760, 762, 764, and 766 that may occur in any order. Method 750 frequency-stabilizes teeth of first and second frequency combs relative to a single RF frequency reference. Method 700 also establishes coherence between the first and second frequency combs based on coherence of first and second reference lasers. Method 700 may be implemented with DFCS 600 of FIG. 6.

Method 750 includes step 756 to lock a first CEO frequency, of a first frequency comb of teeth equally-spaced by a first comb spacing and shifted from zero by the first CEO frequency, to a RF frequency reference by controlling the first CEO frequency. In one example of step 756, f-2f interferometer 604 of FIG. 6 is used to detect the LO CEO frequency $f_0^{(LO)}$, and LO comb stabilizer 642 phase-locks $f_0^{(LO)}$ to a RF signal generated by a frequency synthesizer referenced to the RF frequency reference.

Method 750 includes step 758 to lock a first tooth, of the first frequency comb, to a first reference laser by controlling the first comb spacing. Method 750 includes step 760 to frequency-stabilize the first reference laser to the RF frequency reference by controlling the first reference laser to lock the first comb spacing. Steps 758 and 760 cooperate to stabilize the first comb spacing. In one example of steps 758 and 760, LO comb stabilizer 642 of FIG. 2 phase-locks the first beat $\Delta f_A^{(LO)}$, to a RF signal generated by a frequency synthesizer referenced to the RF frequency reference, by controlling LO comb laser 510 to change the LO repetition rate $f_{rep}^{(LO)}$. First laser stabilizer 636 then controls reference laser 410(1) to change the laser frequency $f_A$ such that the LO repetition rate $f_{rep}^{(LO)}$, as measured by photodetector 512(1), is locked relative to the RF frequency reference.

Method 750 includes step 762 to lock a second reference laser to a second tooth of the first frequency comb. In one example of step 762, second laser stabilizer 634 of FIG. 6 controls the frequency $f_B$ of reference laser 410(2) to phase-lock the second beat $\Delta f_B^{(LO)}$ to a RF signal generated by a frequency synthesizer referenced to the RF frequency reference.

Method 750 includes step 764 to lock a third tooth, of a second frequency comb of teeth equally-spaced by a second comb spacing and shifted from zero by a second CEO frequency, to the first reference laser by controlling the second comb spacing. Method 750 includes step 766 to lock a fourth tooth, of the second frequency comb, to the second reference laser by controlling the second CEO frequency. In one example of step 764, SIG comb stabilizer 532 of FIG. 6 phase locks the third beat $\Delta f_A^{(SIG)}$, to a RF signal generated by a frequency synthesizer referenced to the RF frequency reference, by controlling SIG comb laser 530 to change the SIG repetition rate $f_{rep}^{(SIG)}$. In one example of step 766, SIG comb stabilizer 532 phase locks the fourth beat $\Delta f_B^{(SIG)}$, to a RF signal generated by a frequency synthesizer referenced to the RF frequency reference, by controlling SIG comb laser 530 to change the SIG CEO frequency $f_0^{(SIG)}$.

In some embodiments, method 750 includes a step 752 to generate the first frequency comb with a first mode-locked laser, and a step 754 to generate the second frequency comb with a second mode-locked laser. In one of these embodiments, each of the first and second mode-locked lasers is a femtosecond fiber laser. Each femtosecond fiber laser may an erbium-fiber laser operating in the infrared with a repetition rate $f_{rep}$ between 10 and 1000 MHz. In one example of step 752, LO comb laser 510 generates first optical pulse train 540 that is subsequently processed (e.g., amplified and spectrally broadened) to become LO frequency comb 120 (1), and SIG comb laser 530 generates second optical pulse train 550 that is subsequently processed to become SIG frequency comb 120(2).

In embodiments that include the first and second mode-locked lasers, the first mode-locked laser may form a first cavity of a first cavity length, wherein step 758 may be implemented by controlling the first cavity length. Similarly, the second mode-locked laser may form a second cavity of a second cavity length, wherein step 764 may be implemented by controlling the second cavity length. Furthermore, the first mode-locked laser may be powered by a first pump that outputs a first pump level (e.g., an optical power level), wherein step 756 may be implemented by controlling the first pump level. Similarly, the second mode-locked laser may be powered by a second pump that outputs a second pump level, wherein step 766 may be implemented by controlling the second pump level.

In some embodiments, method 750 includes spectrally broadening the first and second frequency combs, in respective first and second nonlinear fibers, into first and second spectra that cover spectral lines of a target gas to be spectroscopically detected with the first and second spectra. In one example of spectrally broadening, first and second nonlinear optical fiber 520(1), 520(2) of DFCS 600 spectrally broaden respective amplified pulse trains 542, 552 such that respective frequency combs 120(1), 120(2) have a spectral width that covers spectral features (i.e., absorption lines) of interest of the target gas. In one of these embodiments, the first and second spectra contain infrared light. In another of these embodiments, the target gas is one or more of methane, carbon dioxide, carbon monoxide, hydrogen sulfide, acetylene, ethylene, propane, butane, ethane, and water vapor. In another of these embodiments, method 750 includes spectroscopically measuring a gaseous sample with the first and second spectra to detect the target gas in the gaseous sample. In one example of spectroscopically measuring, pulse trains 106, 108 traverse gas 116 to detect the target gas therein (see FIG. 1).

Embodiments with More than Two Optical Frequency Combs

In DFCS 500 and DFCS 600, first optical frequency comb 120(1), as generated by LO comb laser 510, is used for both stabilizing reference lasers 410 and outputting LO pulse train 210(1) to form double pulse train for DCS. In embodiments, reference-laser stabilization and LO pulse-train formation for DCS are implemented with two optical frequency combs generated by separate comb lasers, thereby increasing the overall number of optical frequency combs from two to three. Similar to DFCS 500 and DFCS 600, embodiments with three optical frequency combs can be advantageously implemented with at most one f-2f interferometer or one vapor-cell spectrometer for locking to an atomic or molecular transition.

In some embodiments of a DFCS with three optical frequency combs, DFCS 500 of FIG. 5 is expanded to include a third optical frequency comb that is generated by a third comb laser whose frequency components, or third-comb teeth, are stabilized using any technique, or combinations of techniques, known in the art. For example, the third comb may span an octave and include an f-2f interferometer (e.g., see f-2f interferometer 604 of FIG. 6) to detect and phase-lock a third-comb CEO frequency to a RF frequency reference. A repetition rate of the third comb may be phase-locked to the RF frequency reference by directly controlling the cavity spacing of the third comb laser, or via control of a reference laser to which the third comb is locked (i.e., similarly to how second laser stabilizer 534 of FIG. 5 phase-locks the LO repetition rate $f_{rep}^{(LO)}$ by controlling the frequency $f_B$ of second reference laser 410(2)). In another example, one of the third-comb CEO frequency and the third-comb repetition rate is frequency-stabilized by phase-locking one third-comb tooth to a stabilized reference laser that is different from first and second reference lasers 410(1), 410(2). In another example, both the third-comb CEO frequency and the third-comb repetition rate are frequency-stabilized by phase-locking two third-comb teeth to two corresponding stabilized reference lasers different from first and second reference lasers 410(1), 410(2). Each of the stabilized reference lasers may be a laser whose frequency is locked to an atomic or molecular transition (e.g., via Doppler-free spectroscopy of a gas in a vapor cell).

The frequency stability of the third-comb teeth is transferred to first and second reference lasers 410(1), 410(2) by phase-locking first and second reference lasers 410(1), 410 (2) to two different third-comb teeth. The phase-locking of first reference laser 410(1) can be implemented with first laser stabilizer 536 using a heterodyne beat between first reference laser 410(1) and a first third-comb tooth. Similarly, the phase-locking of second reference laser 410(2) can be implemented with second laser stabilizer 534 using a heterodyne beat between second reference laser 410(2) and a second third-comb tooth (rather than using the LO repetition rate $f_{rep}^{(LO)}$, as shown in FIG. 5).

The frequency stability of the third-comb teeth is then transferred to LO frequency comb 120(1) by phase-locking two of LO teeth 404 to first and second reference lasers 410(1), 410(2) in the same manner described above for FIG. 5. The frequency stability of the third-comb teeth is also transferred to SIG frequency comb 120(2) by phase-locking two of SIG teeth 406 to first and second reference lasers 410(1), 410(2) in the same manner described above for FIG. 5.

In some embodiments, a three-frequency-comb DFCS uses a frequency microcomb for the third optical frequency comb. Advantageously, a frequency microcomb (also called a chip-based frequency comb or a microresonator frequency comb) is significantly smaller than a conventional frequency comb (e.g., one based on a Ti:Saph or fiber femtosecond laser) and therefore can help facilitate portability and robustness of a DCS spectrometer. However, due to its small cavity length, a frequency microcomb typically has a repetition rate so high that the pulse-train outputted by the microcomb cannot be used for DCS. Nevertheless, a frequency microcomb may still be used as an aide for stabilizing reference lasers for DCS, as described above.

In some embodiments, more than two optical frequency combs (i.e., LO comb laser 510 and SIG comb laser 530) are frequency-stabilized to the third frequency comb. For example, fourth and fifth frequency combs can be phase-locked to first and second reference lasers 410(1), 410(2) similarly to first and second optical frequency combs 120(1) and 120(2). Pulse trains outputted by the fourth and fifth frequency combs can be combined to generate a second double pulse train for DCS. The second double pulse train may be configured differently from double pulse train 106 (e.g., different repetition rates and spectral broadening) such that both double pulse trains simultaneously probe a gas sample with different spectra (e.g., to detect different target species in the same or different spectral features of the same target species). Additional frequency combs can be similarly locked to first and second reference lasers 410(1), 410(2) without departing from the scope hereof.

In some embodiments, more than two reference lasers are stabilized to the third frequency comb. For example, third and fourth reference lasers can be phase-locked to the third optical frequency comb similarly to first and second reference lasers 410(1), 410(2). In embodiments where fourth and fifth frequency combs are used (e.g., to generate a second double pulse train, as described above), the fourth and fifth frequency combs may be phase-locked to the third and fourth reference lasers instead of first and second reference 410(1), 410(2). The third and fourth reference lasers may operate at different wavelengths than first and second reference lasers 410(1), 410(2). The third and fourth reference lasers may be selected such that their wavelengths better overlap the spectra of the fourth and fifth frequency combs, as compared to the wavelengths of first and second reference lasers 410(1), 410(2). The improved spectral overlap increases the SNR of heterodyne beats detected between each of the third and fourth reference lasers and each of the fourth and fifth frequency combs, advantageously improving robustness of the phase-lock loops used to frequency stabilize the fourth and fifth frequency combs.

DCS Stabilization Based on Walking Interferograms

As described above for FIGS. 5 and 6, an optical frequency comb can be calibrated using a single-frequency reference laser (e.g., first reference laser 410(1)) whose frequency is initially known to within the comb spacing $f_{rep}$ (e.g., typically between 50 and 1000 MHz). Initial knowledge of the laser frequency to this level of accuracy uniquely determines the integer n that indexes the comb tooth closest to the laser frequency. An initial value for the laser frequency may be obtained with a high-resolution wavemeter. However, such a wavemeter increases the size, weight, and complexity of DCS system 100, and thus inhibits portability of DCS system 100. Alternatively, the laser frequency can be determined by locking the reference laser to an atomic or molecular transition with a known transition frequency. However, the reference laser may have a frequency that is spectrally far from any convenient transition that could be used for such locking.

Figure 8:
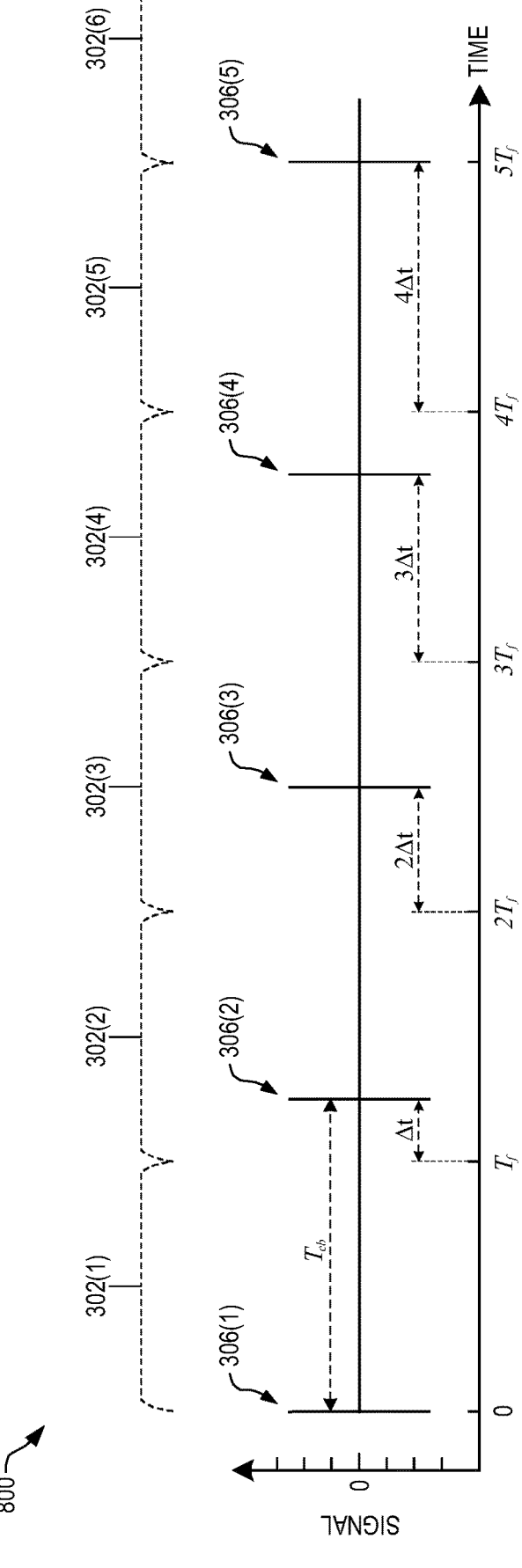
FIG. 8 shows a temporal sequence of interferograms in which a "walking" center burst is used to determine the laser frequency of the first reference laser of FIGS. 4 and 5, in an embodiment.
Figure 9:
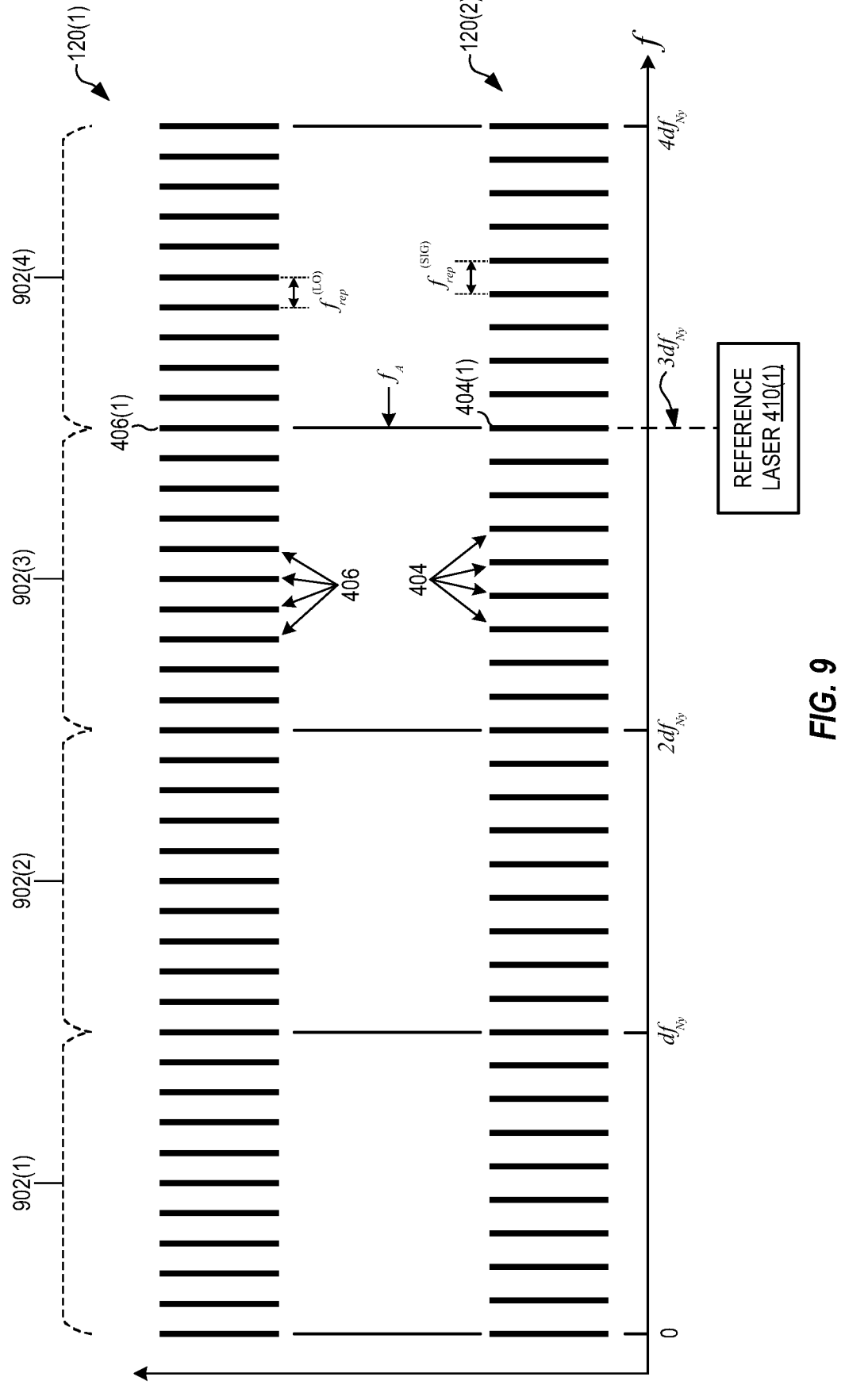
FIG. 9 is a frequency-domain plot showing the laser frequency $f_A$ of the first relative to LO and SIG comb teeth of the LO and SIG frequency combs of FIGS. 4, in an embodiment.

FIGS. 8 and 9 illustrate a frequency measurement method that utilizes a dual frequency-comb source as an optical frequency meter to measure the laser frequency $f_A$ of first reference laser 410(1). With this method, the frequency $f_A$ can be advantageously measured, relative to a RF frequency reference, without a high-resolution wavemeter and without relying on spectroscopic knowledge of an atomic or molecular transition. Thus, the frequency-measurement method advantageously eliminates the need for a dedicated high-performance wavemeter, enabling portability by reducing size, power consumption, and component count.

The frequency-measurement method requires the two frequency combs of the dual frequency-comb source to have their CEO frequencies locked relative to the RF frequency reference. Thus, each of the two frequency combs operates with an f-2f interferometer (e.g., f-2f interferometer 604 of FIG. 6). Since many prior-art DCS systems already operate with f-2f interferometers to stabilize the CEO frequencies, the frequency-measurement method embodiments presented herein can implement new functionality with existing DCS systems.

For clarity in the following discussion, the frequency-measurement method is described for measuring the frequency $f_A$ of first reference laser 410(1). More specifically, since it is assumed that the CEO frequencies of both frequency combs are detected and locked, second reference laser 410(2) is not needed to fully stabilize the two frequency combs. However, it should be appreciated that the frequency-measurement method can be similarly applied to any single-frequency laser to which the two frequency combs are locked.

First reference laser 410(1) may be free-running or locked. For example, first reference laser 410(1) may be locked to a resonance, of a Fabry-Perot cavity, with an unknown resonant frequency, wherein the frequency-measurement method can be used to measure the resonant frequency. Alternatively, first reference laser 410(1) may be locked to an atomic or molecular transition with an unknown transition frequency, wherein the frequency-measurement method can be used to measure the transition frequency.

FIG. 8 shows a temporal sequence 800 of interferograms 302 in which a "walking" center burst 306 is used to determine the laser frequency $f_A$ of first reference laser 410(1). Both frequency combs 120(1) and 120(2) are locked to reference laser 410(1), at respective offset frequencies $\Delta f_A^{(SIG)}$ and $\Delta f_A^{(LO)}$, as shown in FIG. 4. As described in more detail below, the temporal evolution of center burst 306 in temporal sequence 800 can be used to determine the number of teeth in each of a plurality of Nyquist windows (see Nyquist windows 902 in FIG. 9) from which the laser frequency $f_A$ can be determined.

FIG. 9 is a frequency-domain plot showing the laser frequency $f_A$ of reference laser 410(1) relative to LO and SIG teeth 406, 404 of LO and SIG frequency combs 120(1), 120(2), respectively. Frequency $f_A$ can be expressed mathematically as $$f_A = f_0^{(LO)} + n_A^{(LO)} f_{rep}^{(LO)} + \Delta f_A^{(LO)} = f_0^{(SIG)} + n_A^{(SIG)} f_{rep}^{(SIG)} + \Delta f_A^{(SIG)}. \tag{1}$$

For simplicity, it is assumed that $f_0^{(LO)} = f_0^{(SIG)} = 0$, in which case the zeroth-mode frequency components of both frequency combs 120(1), 120(2) coincide exactly at 0 Hz, as shown in FIG. 9. It is also assumed that $\Delta f_A^{(LO)} = \Delta f_A^{(SIG)} = 0$ such that $f_A$ has the same frequency as one LO tooth 406(1) and one SIG tooth 404(1). With these assumptions, Eqn. 1 simplifies to $$f_A = n_A^{(LO)} f_{rep}^{(LO)} = n_A^{(SIG)} f_{rep}^{(SIG)}. \tag{2}$$

Repetition rate $f_{rep}^{(LO)}$ and/or $f_{rep}^{(SIG)}$ may be controlled to form Nyquist windows 902, each with a frequency span $df_{Ny}$. At integer multiples of $df_{Ny}$, LO teeth 406 and SIG teeth 404 coincide to form upper and lower anchor frequencies for Nyquist windows 902. In each of Nyquist windows 902, a number $n_q + 1$ of LO teeth 406 is one greater than a number $n_q$ of SIG teeth 404. The number $n_q$ of teeth in one Nyquist window is defined herein to be inclusive of only one of the two anchor frequencies of the Nyquist window. With this definition, $n_q$ equals the number of comb spacings (i.e., $f_{rep}^{(LO)}$ or $f_{rep}^{(SIG)}$) between the lower and upper anchor frequencies of the Nyquist window. Thus, $n_q = 9$ in the example of FIG. 9, wherein each of Nyquist windows 902 has ten LO teeth 406 corresponding to a frequency span of $10 f_{rep}^{(LO)}$, and nine SIG teeth 404 corresponding to a frequency span of $9 f_{rep}^{(SIG)}$. While FIG. 9 shows $n_q$ as an integer, in general $n_q$ does not need to be an integer. Each of Nyquist windows 902 may have any number of teeth (e.g., hundreds of thousands) without departing from the scope hereof.

Based on the above definition of $n_q$, the frequency span $df_{Ny}$ of each of Nyquist windows 902 is given by $$df_{Ny}=(n_q+1)f_{rep}^{(LO)}=n_q f_{rep}^{(SIG)}=n_q(f_{rep}^{(LO)}+\Delta f_{rep}), \tag{3}$$

where $\Delta f_{rep}=f_{rep}^{(SIG)}-f_{rep}^{(LO)}$ is a difference in repetition rates of LO and SIG frequency combs 120(1), 120(2). From Eqn. 3, $$n_q=\frac{f_{rep}^{(LO)}}{\Delta f_{rep}}=\frac{f_{rep}^{(LO)}}{f_{rep}^{(SIG)}-f_{rep}^{(LO)}}=\frac{1}{f_{rep}^{(SIG)}/f_{rep}^{(LO)}-1}, \tag{4}$$

which expresses $n_q$ in terms of $f_{rep}^{(SIG)}$ and $f_{rep}^{(LO)}$. Combining Eqns. 3 and 4 yields $$df_{Ny}=f_{rep}^{(SIG)}f_{rep}^{(LO)}/\Delta f_{rep}, \tag{5}$$

which expresses the frequency span $df_{Ny}$ of each of Nyquist windows 902 in terms of the repetition rates $f_{rep}^{(SIG)}$ and $f_{rep}^{(LO)}$.

Repetition rate $f_{rep}^{(LO)}$ and/or $f_{rep}^{(SIG)}$ may be further controlled such that the boundary of one of Nyquist windows 902 occurs at frequency $f_A$. For example, in FIG. 9 frequency $f_A$ coincides with the third multiple of $df_{Ny}$, which is the lower anchor frequency of Nyquist window 902(4) and the upper anchor frequency of Nyquist window 902(3). The frequency of LO tooth 406(1), which is indexed by integer $n_A^{(LO)}$ in Eqn. 2, is $3df_{Ny}$. Similarly, the frequency of SIG tooth 404(1), which is indexed by integer $n_A^{(SIG)}$ in Eqn. 2, is also $3df_{Ny}$. Therefore, SIG mode $n_A^{(SIG)}$ can be expressed $$n_A^{(SIG)}=N_{Ny}n_q, \tag{6}$$

where $N_{Ny}$ is a "Nyquist number" that indexes Nyquist windows 902. Eqn. 2 may be expressed in terms of $N_{Ny}$ as $$f_A=N_{Ny}(n_q+1)f_{rep}^{(LO)}=N_{Ny}n_q f_{rep}^{(SIG)}. \tag{7}$$

Eqn. 7 may be used to determine $f_A$ when unknown, such as when DCS system 100 is initially powered on (i.e., a "cold start"), or when $f_A$ changes frequency (e.g., drift). To use Eqn. 7, three pieces of information are needed: (1) a measurement of either $f_{rep}^{(SIG)}$ or $f_{rep}^{(LO)}$, (2) the Nyquist number $N_{Ny}$, and (3) the number $n_q$ of comb teeth in each of Nyquist windows 902.

The first piece of information needed to determine $f_A$ with Eqn. 7 is a measurement of either $f_{rep}^{(LO)}$ or $f_{rep}^{(SIG)}$. As shown below, $N_{Ny}$ and $n_q$ are integers that can each be determined uniquely, and therefore do not contribute to any uncertainty in the resulting value of $f_A$. Rather, the uncertainty in $f_A$ is determined solely by the measurement of $f_{rep}$. For most trace-gas spectroscopy applications, $f_A$ only needs to be known to a relative accuracy of $10^{-7}$ to properly identify spectral lines of the trace gas; $f_{rep}$ can be readily measured to this level of accuracy using a compact, low-resolution frequency counter. It is assumed that $f_A$ is stable at the $10^{-7}$ level, or better, so that fluctuations in $f_A$ do not contribute to the uncertainty of the measurement of $f_{rep}$.

The second piece of information needed to determine $f_A$ with Eqn. 7 is the Nyquist number $N_{Ny}$ of the one of Nyquist windows 902 in which $f_A$ lies. When $f_A$ coincides with anchor frequencies, it is assumed that $f_A$ lies in the Nyquist window 902 with the lower Nyquist number. Thus, in FIG. 9, $f_A$ coincides with the upper anchor frequency of Nyquist window 902(3), and thus $f_A$ lies in Nyquist window 902(3) for which $N_{Ny}=3$. More generally, the Nyquist number can be determined from $$N_{Ny}=\left[\frac{f^{(e)}}{df_{Ny}}\right]=\left[\frac{f^{(e)}\Delta f_{rep}}{f_{rep}^{(SIG)}f_{rep}^{(LO)}}\right], \tag{8}$$

where the brackets [x] indicate the nearest integer to x, and $f^{(e)}$ is a low-resolution estimate for $f_A$. Typical values for $df_{Ny}$ are between 5 and 10 THz, while an infrared or visible laser operates at a frequency between 100-1000 THz. Thus, $N_{Ny}$ is no larger than 200. To identify $N_{Ny}$ uniquely to the nearest integer, each of the variables in Eqn. 8 only needs to be measured to the 0.5% level, or better. The nominal operating wavelength of the laser (e.g., as specified by the manufacturer, or measured with a low-resolution wavemeter) can be used to obtain $f^{(e)}$ to better than this level. Each of $f_{rep}^{(SIG)}$, $f_{rep}^{(LO)}$, and $\Delta f_{rep}$ can be directly measured to better than this level using a low-resolution frequency counter operating with a fast gate time (e.g., less than 1 s).

The third piece of information needed to determine $f_A$ with Eqn. 7 is the number $n_q$ of comb teeth in each of Nyquist windows 902. FIG. 8 shows how temporal sequence 800 can be used to quickly and uniquely determine $n_q$ using the same detectors and signal-processing equipment already needed to spectroscopically measure gas 116 with double pulse train 106. In FIG. 8, the repetition rates $f_{rep}^{(SIG)}$ and $f_{rep}^{(LO)}$ have been selected such that center burst 306 "walks" by an amount $\Delta t$ from one interferogram 306 to the next. More specifically, center burst 306 is shown in FIG. 8 as a first center burst 306(1) that occurs at time t=0 in a first interferogram 302(1), a second center burst 306(2) that is temporally shifted by $\Delta t$ in a subsequent second interferogram 302(2), a third center burst 306(3) that is temporally shifted by $2\Delta t$ in a subsequent third interferogram 302(3), and so on. This walking, or accumulation of temporal shifts $\Delta t$, continues until an integer number u of shifts $\Delta t$ equals the frame time $T_f$, at which point center burst 306 again occurs at time t=0. In the example of FIG. 8, u=5, wherein a fifth center burst 306(5) occurs at the beginning of a sixth interferogram 302(6). Temporal sequence 800 of u interferograms 302 continuously repeats, starting with a (u+1)th interferogram and every $u^{th}$ interferogram thereafter. Thus, in FIG. 8, temporal sequence 800 begins again at an eleventh interferogram, a sixteenth interferogram, a twenty-first interferogram, etc.

Temporal shift $\Delta t$ may be alternatively expressed as $u=n_i/|R|$, where $n_i$ is the known number of equally-spaced data points in each interferogram 302, and R is a "walking" rate equal to the number of data points in temporal shift $\Delta t$. Each data point is acquired in a time $1/f_{rep}^{(LO)}$, and thus the frame time $T_f=n_i/f_{rep}^{(LO)}$ is the total time needed to acquire all $n_i$ points in one interferogram 302. Furthermore, the frame time $T_f$ may be related to a center-burst time $T_{cb}=1/\Delta f_{rep}$ (see FIG. 8) that equals the time between sequential center bursts 306:

$$uT_f=(u\pm1)T_{cb}. \tag{9}$$

where the plus sign corresponds to $T_{cb}>T_f$ (i.e., center burst 306 "walks" to the right) and the negative sign corresponds to $T_{cb}<T_f$ (i.e., center burst 306 "walks" to the left). Combining Eqns. 4 and 9 yields:

$$n_q=\frac{f_{rep}^{(LO)}}{\Delta f_{rep}}=\frac{n_i^2}{n_i\pm|R|}\approx n_i+R, \tag{10}$$

where the approximation assumes $R\ll n_i$. Since $n_i$ is known from a selected digitization rate (i.e., time step 314 in FIG.

3), $n_q$ may be found using one of several ways to measure the walking rate R. For example, when center burst 306 is relatively narrow, a simple center-burst tracker can be implemented to obtain a center position of center burst 306 from one interferogram 302 by identifying the one data point of said one interferogram 302 at which center burst 306 has a maximal value. A change in the center position can be measured between consecutive interferograms 302 to obtain the walking rate R.

The simple center-burst tracker can only detect a shift of the center position that equals an integer number of data points (i.e., an integer multiple of time step 314 in FIG. 3). However, $n_q$ need not be an integer. Specifically, rearranging Eqn. 6 gives $n_q = n_A^{(SIG)}/N_{Ny}$, where $n_A^{(SIG)}$ and $N_{Ny}$ are both integers. Thus, in the most general case, $n_q$ may be a non-integer rational number. In the limit $R \ll n_i$, Eqns. 4 and 8 may be combined to obtain $$R \approx n_q - n_i = \frac{n_A^{(SIG)} + n_i N_{Ny}}{N_{Ny}}. \tag{11}$$

Thus, when $n_q$ is a non-integer rational number, then so is R. In this case, the center position of center burst 306 will shift by an integer number of data points after $N_{Ny}$ consecutive interferograms 302. The simple center-burst tracker described above may be additionally configured to measure a shift of the center position across $N_{Ny}$ consecutive interferograms 302, such that the measured shift corresponds to an integer number of data points. The simple center-burst tracker may then divide the measured shift by $N_{Ny}$ to obtain the non-integer rational value for R, and thus $n_q$.

Phase noise and/or a chirped pulse will broaden center burst 306, reducing the SNR of interferograms 302, thereby increasing the uncertainty of the determined location of center burst 306 (i.e., the location of the maximal data point). In such a situation, several additional interferograms 302 can be used to increase the SNR and thereby measure R with an uncertainty low enough that $n_q$ can be uniquely determined. To increase the SNR, an advanced center-burst tracker may be used to obtain a center position of center burst 306 from one interferogram 302 by monitoring a phase walk of the detected frequency spectrum, or by fitting an envelope function to center burst 306, wherein the center position is a fit parameter of the envelope function. However, the SNR may also be increased by averaging several measurements of R obtained with the simple center-burst tracker described above. This latter solution is usually adequate given how rapidly measurements of R can be acquired (i.e., typically one interferogram 302 every $1/\Delta f_{rep} \approx 1$ ms). In addition, continuous averaging of measurements of R is enabled by the fact that $n_q$ depends only on $n_A$. Thus, once frequency combs 120(1), 120(2) are locked to reference laser 410(1), barring phase slips, both $n_q$ and R will be constant, even if $f_A$ drifts.

An alternative way to measure n uses Eqn. 4 with measurements of $f_{rep}^{(LO)}$ and $\Delta f_{rep}$ (or, alternatively, $f_{rep}^{(SIG)}$ and $\Delta f_{rep}$). For repetition rates of approximately 100 MHz, and a Nyquist frequency span $df_{Ny}$ of 10 THz, $n_q \approx 10^5$. Thus, to obtain a unique value for $n_q$ with this approach, $f_{rep}^{(LO)}$ and $\Delta f_{rep}$ should each be measured at the $10^{-6}$ level, or better. Repetition rate $f_{rep}^{(LO)}$ (or, alternatively, $f_{rep}^{(SIG)}$) can be measured to better than this level using a low-resolution frequency counter operating with fast gate times (e.g., less than 1 s). Repetition rates $f_{rep}^{(LO)}$ and $f_{rep}^{(SIG)}$ may be combined in a mixer to form $\Delta f_{rep}$, which can also be directly measured with a low-resolution frequency counter. The measured value of $\Delta f_{rep}$ may then be divided into the measured value of $f_{rep}^{(LO)}$ to obtain $n_q$. When $f_A$ has a lot of jitter, $f_{rep}^{(LO)}$ and $\Delta f_{rep}$ may be measured simultaneously using two synchronized frequency counters.

It should be understood by those trained in the art that since $\Delta f_{rep} \ll f_{rep}^{(LO)}, f_{rep}^{(SIG)}$, calculating $\Delta f_{rep}$ by subtracting a value of $f_{rep}^{(LO)}$ from a value of $f_{rep}^{(SIG)}$ leads to a significant loss in precision. For example, if the repetition rates are each approximately 100 MHz, and $\Delta f_{rep} \sim 100$ Hz, then the six most significant digits of $f_{rep}^{(LO)}$ and $f_{rep}^{(SIG)}$ cancel upon subtraction, reducing the precision of $\Delta f_{rep}$ by $10^6$. To overcome this loss of precision $f_{rep}^{(LO)}$ and $f_{rep}^{(SIG)}$ would each need to be measured at the $10^{-12}$ level, or better. Measuring the repetition rates at this resolution requires high-performance, high-stability frequency counters whose size and power consumption inhibits portability and field-deployment of DCS system 100. It also requires long gate times (e.g., 100 seconds, or more) during which $f_{rep}^{(LO)}$ and $f_{rep}^{(SIG)}$ can drift. For these reasons, it is preferable to generate $\Delta f_{rep}$ by combining $f_{rep}^{(LO)}$ and $f_{rep}^{(SIG)}$ in a mixer, as described above, and directly counting $\Delta f_{rep}$. with a conventional, low-resolution frequency counter.

Another way to measure $n_q$ uses Eqn. 4 with a measurement of the frequency ratio $f_{rep}^{(SIG)}/f_{rep}^{(LO)}$. This ratio can be measured to better than $10^{-6}$ using a low-resolution frequency counter configured with two inputs, one that receives $f_{rep}^{(SIG)}$ and one that receives $f_{rep}^{(LO)}$. The measured value of the ratio may be used to calculate $n_q$ via Eqn. 5.

In the preceding discussion, it was assumed that $f_0^{(LO)} = f_0^{(SIG)} = \Delta f_A^{(LO)} = \Delta f_A^{(SIG)} = 0$, which simplified FIG. 9 by aligning LO teeth 406 and SIG teeth 404 at the boundaries of Nyquist windows 902 (i.e., at 0 Hz and integer multiples of $df_{Ny}$). However, the preceding arguments remain valid for arbitrary values of $f_0^{(LO)}$, $f_0^{(SIG)}$, $\Delta f_A^{(LO)}$, and $f_A^{(SIG)}$ provided that $f_A$ is near the edge of a Nyquist window; this can be shown by rederiving Eqn. 7 using Eqn. 1 rather than Eqn. 2.

Figure 10:
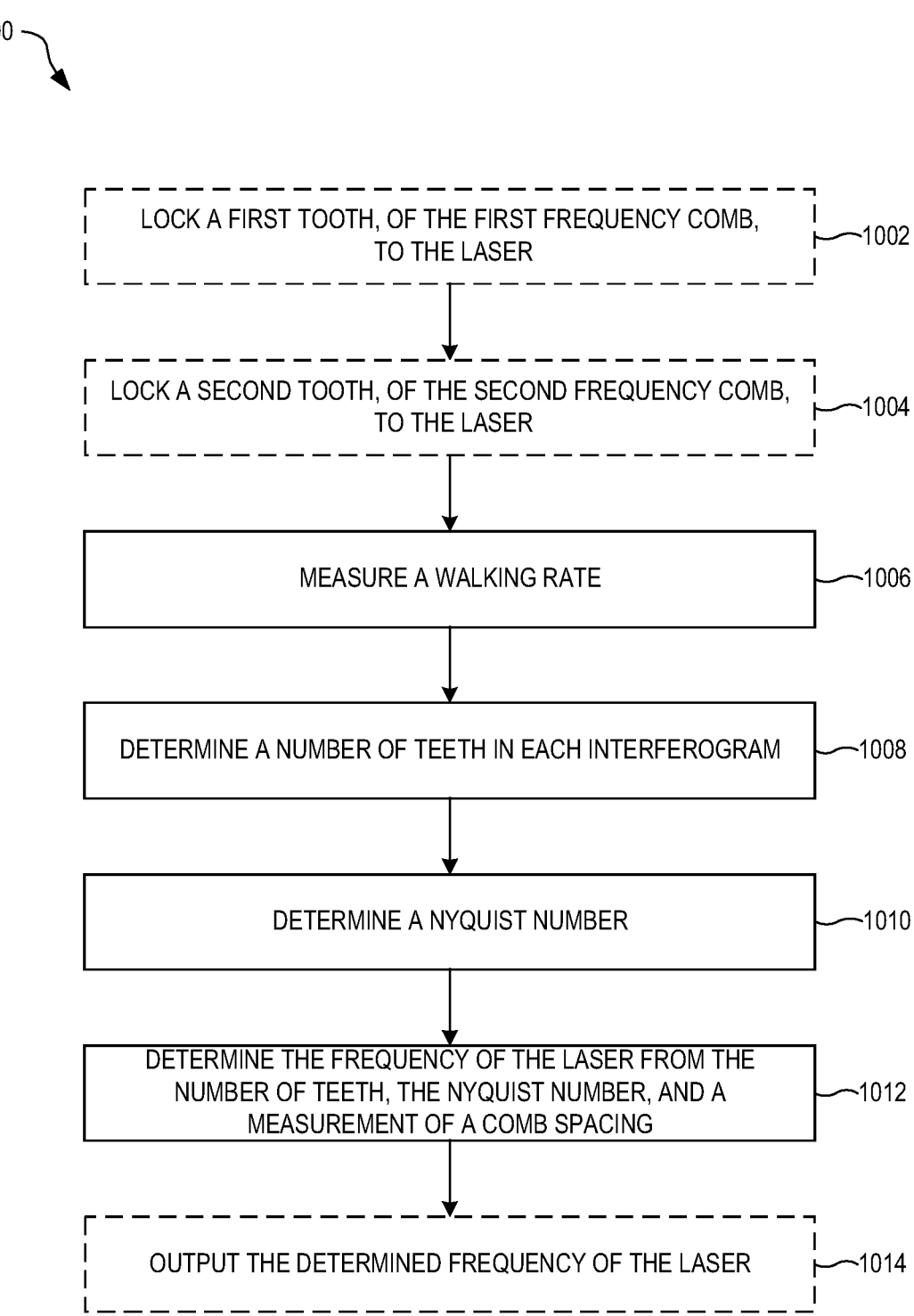
FIG. 10 is a flow chart of a method for measuring the frequency of a laser with a dual frequency-comb spectrometer, in embodiments.

FIG. 10 is a flow chart of a method 1000 for measuring the frequency of a laser with a dual frequency-comb spectrometer. Method 1000 includes a step 1006 to measure a walking rate of a plurality of center bursts in a sequence of consecutive interferograms recorded with the dual frequency-comb spectrometer. In one example of step 1006, a center position of center bursts 306 is tracked over time to determine the walking rate R. In one embodiment, the center position is tracked by fitting each center burst to an envelope function to obtain a fitted center said each center burst, and determining the shift from the fitted centers. This embodiment may be implemented with the advanced center-burst tracker described above.

Method 1000 also includes a step 1008 to determine, from the measured walking rate and a number of data points in each of the interferograms, a number of teeth in each of a plurality of Nyquist windows formed by the dual frequency-comb spectrometer. In one example of step 1008, the number $n_q$ of SIG teeth 406 in each of Nyquist windows 902 is determined using Eqn. 10. Method 1000 also includes a step 1010 to determine a Nyquist number of one of the Nyquist windows that covers the frequency of the laser. In one example of step 1010, the Nyquist number is calculated using Eqn. 8. Method 1000 also includes a step 1012 to determine the frequency of the laser from (i) the number of teeth, (ii) the Nyquist number, and (iii) a measurement of a comb spacing of one of first and second frequency combs of the dual frequency-comb spectrometer. In one example of step 1012, the frequency $f_A$ of first reference laser 410(1) is calculated using Eqn. 7. In one embodiment, method 1000 includes a step 1014 to output the frequency of the laser to calibrate the dual frequency-comb spectrometer for spectroscopically detecting a gas 116 with the dual frequency-comb spectrometer.

In some embodiments, method 1000 includes a step 1002 to lock a first tooth, of a first plurality of teeth of the first frequency comb, to the laser at a first offset frequency, and a step 1004 to lock a second tooth, of a second plurality of teeth of the second frequency comb, to the laser at a second offset frequency. In one example of steps 1002 and 1004, LO tooth 406(1) is phase-locked to reference laser 410(1) at the first frequency offset $\Delta f_A^{(LO)}$ (see FIG. 4), and SIG tooth 404(1) is phase-locked to reference laser 410(1) at the third frequency offset $\Delta f_A^{(SIG)}$. The first tooth, second tooth, first offset frequency, and second offset frequency may be selected so that the first and second frequency combs form the Nyquist windows.

Locking Conditions for Immunity to RF Reference Frequency Drift

To form a Nyquist window for detecting gas 116, first and second frequency combs 120(1), 120(2) must be locked with appropriate choices of the first, second, third, and fourth frequency offsets $\Delta f_A^{(LO)}$, $\Delta f_B^{(LO)}$, $\Delta f_A^{(SIG)}$, and $\Delta f_B^{(SIG)}$. With the selected values of the four frequency offsets, drift of the reference frequencies $f_A$ and/or $f_B$ may cause the center burst to walk from one interferogram to the next. Furthermore, the walking rate of the center burst will change as the frequencies $f_A$ and $f_B$ drift. With a walking center burst, multiple interferograms cannot be averaged together to improve the SNR (see FIG. 14A and the accompanying description below).

One way to prevent walking is to select the frequency offsets to be equal, i.e., $\Delta f_A^{(LO)}=\Delta f_B^{(LO)}=\Delta f_A^{(SIG)}=\Delta f_B^{(SIG)}$. However, this restricts the location of the Nyquist window in frequency space, i.e., the lower and upper anchor frequencies that define the boundaries of the Nyquist window. For example, when $\Delta f_A^{(LO)}=\Delta f_A^{(SIG)}$, LO tooth 406(1) and SIG tooth 404(1) coincide to establish an anchor frequency near reference frequency $f_A$ (i.e., within $\pm f_{rep}/2$). Similarly, when $\Delta f_B^{(LO)}=\Delta f_B^{(SIG)}$, LO tooth 406(2) and SIG tooth 404(2) coincide to establish another anchor frequency near reference frequency $f_B$. In some applications, it is preferable to establish anchor frequencies farther from the reference frequencies (e.g., by several terahertz).

Presented in this section are drift-immune DCS frequency-stabilization techniques that ensure that center bursts do not walk (i.e., are stationary), and thus can be advantageously averaged together to improve the SNR. These "no-walking" embodiments loosen the restrictions on the frequency offsets $\Delta f_A^{(LO)}$, $\Delta f_B^{(LO)}$, $\Delta f_A^{(SIG)}$, $\Delta f_B^{(SIG)}$, as compared to the above example where they are all equal, and thus facilitate the implementation of Nyquist windows having any desired location and width (i.e., the difference between upper and lower anchor frequencies). Advantageously, no-walking embodiments keep the center bursts stationary in the presence of certain types of frequency drift, particularly frequency drift of a common RF frequency reference from which the frequency offsets are synthesized. With this reduced sensitivity to frequency drift, an oven-controlled crystal oscillator (OCXO), for example, may be used as the RF frequency reference in lieu of a larger, higher-power atomic frequency standard.

One aspect of the no-walking embodiments is the realization that center bursts do not walk when $$\Delta f_A^{(SIG)}+\Delta f_B^{(LO)}=\Delta f_A^{(LO)}+\Delta f_B^{(SIG)}. \tag{12}$$

Eqn. 12 is also referred to herein as the "no-walking condition". To derive Eqn. 12, consider first and second frequency combs 120(1), 120(2) locked to reference frequencies $f_A$ and $f_B$, as shown in FIG. 4. The frequency $f_A$ may be expressed in terms of parameters of first frequency comb 120(1), and in terms of parameters of second frequency comb 120(2):

$$f_A = f_0^{(LO)} + n_A^{(LO)} f_{rep}^{(LO)} + f_A^{(LO)} \tag{13}$$

$$= f_0^{(SIG)} + n_A^{(SIG)} f_{rep}^{(SIG)} + f_A^{(SIG)}.$$

The reference laser frequency $f_B$ may be similarly expressed in terms of parameters of frequency combs 120(1), 120(2):

$$f_B = f_0^{(LO)} + n_B^{(LO)} f_{rep}^{(LO)} + f_B^{(LO)} \tag{14}$$

$$= f_0^{(SIG)} + n_B^{(SIG)} f_{rep}^{(SIG)} + f_B^{(SIG)}.$$

Eqns. 13 and 14 may be combined to solve for the repetition rates $f_{rep}^{(SIG)}$ and $f_{rep}^{(LO)}$.

$$f_{rep}^{(LO)} = \frac{f_A - f_B - \Delta f_A^{(LO)} + \Delta f_B^{(LO)}}{n_A^{(LO)} - n_B^{(LO)}}; \tag{15}$$

$$f_{rep}^{(SIG)} = \frac{f_A - f_B - \Delta f_A^{(SIG)} - \Delta f_B^{(SIG)}}{n_A^{(SIG)} - n_B^{(SIG)}}.$$

The number of SIG comb teeth 404 in a Nyquist window is given by $n_q = f_{rep}^{(LO)}/(f_{rep}^{(SIG)} - f_{rep}^{(LO)})$ (see Eqn. 4), wherein the number of LO comb teeth 406 in the Nyquist window is $n_q+1$. Walking of the center burst occurs when $n_q$ does not equal an integer frame length of the interferogram; the frame length is the number of discrete data points in one interferogram (e.g., the number of sampled data points 310 of FIG. 3). As described previously, the number $n_q$ of teeth in one Nyquist window is defined herein to be inclusive of only one of the two anchor frequencies of the Nyquist window so that $n_q$ equals the number of comb spacings (i.e., $f_{rep}^{(LO)}$ or $f_{rep}^{(SIG)}$) between the lower and upper anchor frequencies of the Nyquist window.

The expression for $n_q$ may be simplified by defining $df \equiv f_B - f_A$, $\Delta n^{(LO)} \equiv n_B^{(LO)} - n_A^{(LO)}$ and $\Delta n^{(SIG)} \equiv n_B^{(SIG)} - n_A^{(SIG)}$. In addition, the frequency offsets may be written as a fraction of a common RF reference frequency $f_c$, i.e. $\Delta f_A^{(LO)}=\alpha^{(LO)}f_c$, $\Delta f_B^{(LO)}=\beta^{(LO)}f_c$, $\Delta f_A^{(SIG)}=\alpha^{(SIG)}f_c$, and $\Delta f_B^{(SIG)}=\beta^{(SIG)}f_c$ for constants $\alpha^{(LO)}$, $\beta^{(LO)}$, $\alpha^{(SIG)}$, and $\beta^{(SIG)}$. The result is:

$$n_q = \frac{f_{rep}^{(LO)}}{f_{rep}^{(SIG)} - f_{rep}^{(LO)}} = -\frac{\Delta n^{(LO)}\left(df + \alpha^{(LO)} - \beta^{(LO)}\right)}{K}; \tag{16}$$

where the denominator K is given by $$K = df(\Delta n^{(LO)} - \Delta n^{(SIG)}) + f_c(\Delta n^{(LO)}(\alpha^{(SIG)} + \beta^{(SIG)}) + \Delta n^{(SIG)}(\alpha^{(LO)} + \beta^{(LO)})). \tag{17}$$

Consider changes to $n_q$ arising from changes (i.e., drift) of the RF reference frequency $f_c$ and reference frequency difference $\Delta f$:

$$\frac{\partial n_q}{\partial f_c} = \frac{df \Delta n^{(LO)} \Delta n^{(SIG)} \left( \alpha^{(LO)} - \alpha^{(SIG)} + \beta^{(SIG)} - \beta^{(LO)} \right)}{K}, \tag{18}$$

$$\frac{\partial n_q}{\partial \Delta f} = \frac{f_c \Delta n^{(LO)} \Delta n^{(SIG)} \left( -\alpha^{(LO)} + \alpha^{(SIG)} - \beta^{(SIG)} + \beta^{(LO)} \right)}{K}.$$

In both cases, when the constraint $$-\alpha^{(LO)} + \alpha^{(SIG)} - \beta^{(SIG)} + \beta^{(LO)} = 0 \tag{19}$$

is satisfied, $\partial n_q / \partial f_c = 0$ and $\partial n_q / \partial \Delta f = 0$. Multiplying Eqn. 19 by $f_c$ leads to the no-walking condition of Eqn. 12. Thus, when the four offset frequencies $\Delta f_A^{(SIG)}$, $\Delta f_A^{(LO)}$, $\Delta f_B^{(SIG)}$, $\Delta f_B^{(LO)}$ are selected to both satisfy Eqn. 12 and establish a Nyquist window, changes in $n_q$ due to changes in $f_c$ and $\Delta f$ are suppressed, and thus stationary interferograms remain stationary regardless of drift of $f_c$ and $\Delta f$.

LO comb stabilizer 542 and SIG comb stabilizer 532 of FIG. 5 may be configured to implement the no-walking condition of Eqn. 12 with DFCS 500, thereby creating one embodiment of a drift-immune dual frequency-comb spectrometer. Similarly, LO comb stabilizer 642 of FIG. 6 may cooperate with SIG comb stabilizer 532 to implement the no-walking condition with DFCS 600, thereby creating another embodiment of a drift-immune dual frequency-comb spectrometer. In these embodiments, the frequency $f_c$ is the output of the common RF frequency reference described previously with respect to FIGS. 5 and 6.

FIG. 11 is a flow chart of a drift-immune frequency-stabilization method 1100 for locking a dual frequency-comb spectrometer having first and second frequency combs. Method 1100 frequency-stabilizes teeth of the first and second frequency combs to first and second lasers according to the no-walking condition of Eqn. 12. Method 1100 may be implemented with any dual frequency-comb spectrometer that is locked to two reference lasers, including DFCS 500 of FIG. 5 and DFCS 600 of FIG. 6.

Method 1100 includes steps 1102, 1104, 1106, and 1108, which may occur in any order. In step 1102, a first tooth, of the first frequency comb, is locked to the first laser at a first non-zero offset frequency synthesized from a RF frequency reference. The first tooth may be phase-locked to the first laser by controlling a first CEO frequency of the first frequency comb. In one example of step 1102, LO tooth 406(1) is phase-locked to first reference laser 410(1) at the first frequency offset $\Delta f_A^{(LO)}$ (see FIG. 4) by controlling the CEO frequency $f_0^{(LO)}$. In step 1104, a second tooth, of the first frequency comb, is locked to a second laser at a second non-zero offset frequency synthesized from the RF frequency reference. The second tooth may be phase-locked to the second laser by controlling a first comb spacing of the first frequency comb. In one example of step 1104, LO tooth 406(2) is phase-locked to second reference laser 410(2) at the second frequency offset $\Delta f_B^{(LO)}$ by controlling the repetition rate $f_{rep}^{(LO)}$.

In step 1106, a third tooth, of the second frequency comb, is locked to the first laser at a third non-zero offset frequency synthesized from the RF frequency reference. The third tooth may be phase-locked to the first laser by controlling a second CEO frequency of the second frequency comb. In one example of step 1106, SIG tooth 404(1) is phase-locked to first reference laser 410(1) at the third frequency offset $\Delta f_A^{(SIG)}$ by controlling the CEO frequency $f_0^{(SIG)}$. In step

1108, a fourth tooth, of the second frequency comb, is locked to the second laser at a fourth non-zero offset frequency synthesized from the RF frequency reference. The fourth tooth may be phase-locked to the second laser by controlling a second comb spacing of the second frequency comb. In one example of step 1108, SIG tooth 404(2) is phase-locked to second reference laser 410(2) at the fourth frequency offset $\Delta f_B^{(SIG)}$ by controlling the repetition rate $f_{rep}^{(SIG)}$.

Method 1100 also includes a step 1110 in which the first, second, third, and fourth offset frequencies are selected so that a sum of the second and third offset frequencies equals a sum of the first and fourth offset frequencies. In step 1110, the first, second, third, and fourth offset frequencies are also selected so that the first and second frequency combs form a plurality of Nyquist windows. In each of the Nyquist windows, the first frequency comb has an integer number of teeth equal to a frame length of interferograms recorded by the dual frequency-comb spectrometer. In one example of step 1110, the offset frequencies $\Delta f_A^{(LO)}$, $\Delta f_B^{(LO)}$, $\Delta f_A^{(SIG)}$, and $\Delta f_B^{(SIG)}$ of FIG. 4 are selected to meet the no-walking condition of Eqn. 12, and to form lower and upper anchor frequencies that define Nyquist windows in which the number of LO teeth 406 is one greater than the number of SIG teeth 404.

In one embodiment, method 1100 includes a step 1112 to synthesize the first, second, third, and fourth offset frequencies from the RF frequency reference. Step 1110 and/or step 1112 may occur before or after steps 1102, 1104, 1106, and 1108. In another embodiment, method 1100 includes a step 1114 to spectroscopically detect a gas with the dual frequency comb spectrometer. In one example of step 1114, DCS system 100 uses DCS spectrometer 102, configured to meet the no-walking condition of Eqn. 12, to detect gas 116.

Interferogram Data Analysis

FIGS. 12-17 illustrate method embodiments for analyzing interferograms that facilitate streamlined data acquisition and real-time data filtering and analysis. Advantageously, these method embodiments can be used to track the SNR as it changes over time, as may occur due to varying weather conditions (e.g., wind, temperature, precipitation, etc.). Since changes in the SNR directly affect the sensitivity with which DCS 100 can detect gas 116, knowledge of how the SNR is changing allows parameters of DCS system 100 to be adjusted accordingly to ensure that operation of DCS system 100 remains optimized at all times. For example, when interferograms have a low SNR, measurement time may be increased to collect additional interferograms, as needed to reach a target sensitivity. Alternatively, the target sensitivity may be decreased if the required measurement time is too long. Similarly, when the interferograms have a high SNR, measurement time can be reduced since fewer interferograms are needed to achieve the target sensitivity. Alternatively, the target sensitivity may be increased to, for example, determine a quantity of gas 116 with more sensitivity or to place a more stringent lower limit on the presence of gas 116. Methods illustrated in FIGS. 12-17 may be combined in any way without departing from the scope hereof. In addition, dual frequency-comb spectrometer 102 may be configured to implement any of these methods, either individually or in any combination.

Figure 12:
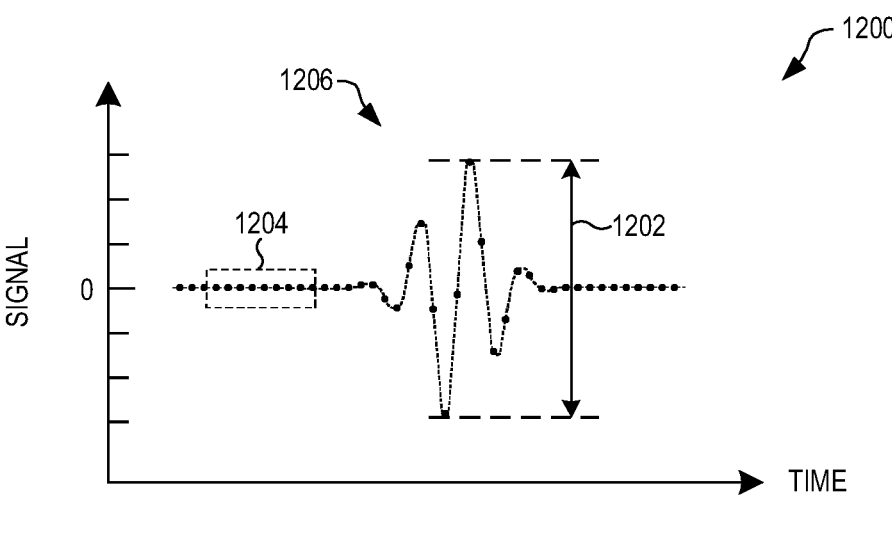
FIG. 12 illustrates a method for analyzing an interferogram to quantify the signal-to-noise ratio (SNR) of the interferogram, in an embodiment.

FIG. 12 illustrates a method for analyzing an interferogram 1200 to quantify the SNR of interferogram 1200. Specifically, a signal amplitude 1202 of interferogram 1200 may be obtained from the difference of maximum and minimum recorded values of a center burst 1206 of interferogram 900. A noise level 1204 may be obtained by calculating or measuring the root-mean-square (rms) variation in data points away from center burst 1206. The SNR may be obtained by dividing noise level 1204 into signal amplitude 1202.

Figure 13:
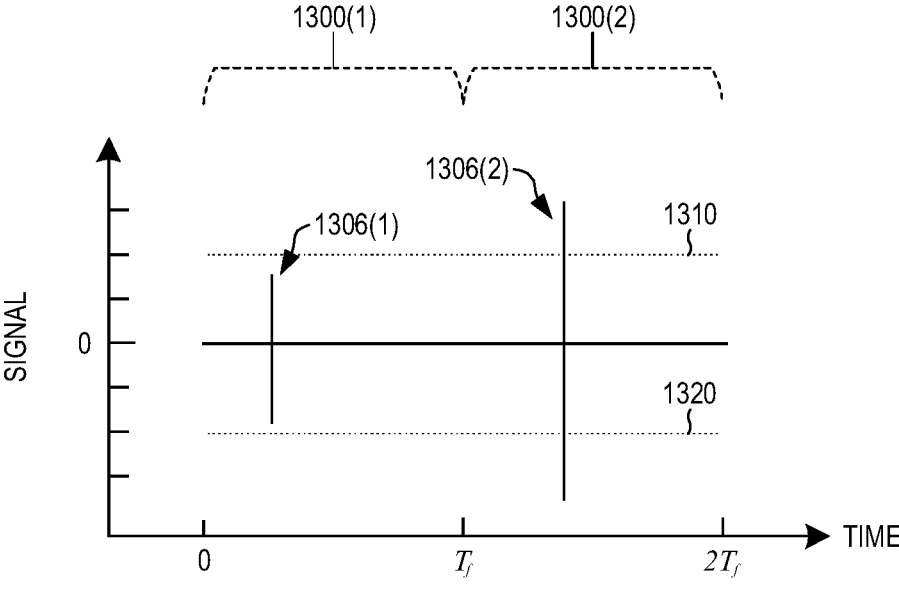
FIG. 13 illustrates a method for using an upper threshold and a lower threshold to identify and reject an interferogram with a signal amplitude too small to provide reliable data, in embodiments.

FIG. 13 illustrates a method for using an upper threshold 1310 and a lower threshold 1320 to identify and reject an interferogram 1300 with a signal amplitude too small to provide reliable data. An interferogram with insufficient SNR may be identified when its center burst does not extend upward past upper threshold 1310 and/or downward below lower threshold 1320. In the example of FIG. 13, a first center burst 1306(1) of a first interferogram 1300(1) extends neither upward past upper threshold 1310 nor downward below lower threshold 1320, and thus first interferogram 1300(1) may be rejected. However, a second center burst 1306(2) of a second interferogram 1300(2) extends both upward past upper threshold 1310 and downward below lower threshold 1320, and thus second interferogram 1300(2) has a sufficient SNR to be retained.

While FIG. 13 shows upper threshold 1310 and lower threshold 1320 as symmetrically spaced about the zero-signal level, upper threshold 1310 and lower threshold 1320 may alternatively be asymmetrically spaced about the zero-signal level (i.e., an average of upper threshold 1310 and lower threshold 1320 is non-zero). In one embodiment, only one of upper threshold 1310 and lower threshold 1320 is used to reject interferograms 1300. In another embodiment, upper threshold 1310 and/or lower threshold 1320 are changed over time to account for changing signal levels and/or SNR (e.g., due to changing environmental conditions).

Figure 14A:
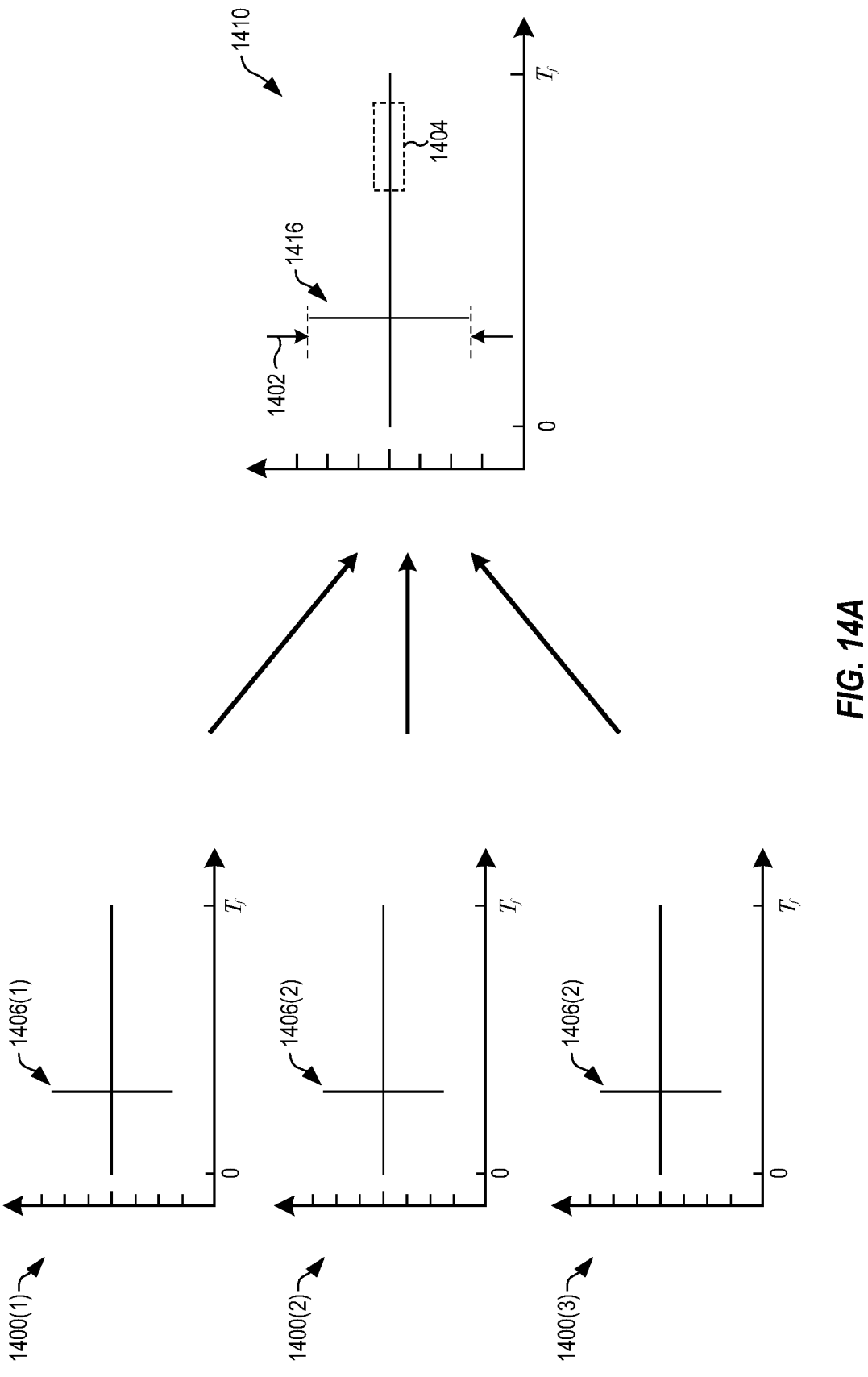
FIG. 14A illustrates a method for averaging a plurality of interferograms together to generate a SNR-enhanced interferogram having a higher SNR than any one of the interferograms, in embodiments.

FIG. 14A illustrates a method for averaging a plurality of interferograms 1400 together to generate a SNR-enhanced interferogram 1410 having a higher SNR than any one of interferograms 1400. Thus, SNR-enhanced interferogram 1410 can be used to determine a quantity of gas 116 with a higher sensitivity than any one of interferograms 1400. Advantageously, SNR-enhanced interferogram 1410 contains less data than all of interferograms 1400, and thus may be subsequently processed faster than all interferograms 1400 without sacrificing SNR. For example, when each of interferograms 1400 contains N data points, all of interferograms 1400 contains N×M data points, where M is the number of interferograms 1400 included in the averaging. By contrast, SNR-enhanced interferogram 1410 only contains N data points, which is less than N×M by a factor of M. By improving processing speed, this data reduction technique enables real-time determination of the SNR.

Averaging interferograms 1400 reduces noise (i.e., noise level 1204 in FIG. 12) while maintaining signal (i.e., signal amplitude 1202). To generate SNR-enhanced interferogram 1410, each center burst 1406 should occur at the same position in the corresponding interferogram 1400, otherwise the averaging will "wash out" center bursts 1406. To ensure that center bursts 1406 always occur at the same position in interferograms 1400, DCS spectrometer 102 can be operated under the "no-walking condition", as described above (see Eqn. 12).

SNR-enhanced interferogram 1410 may be updated in real-time with new interferograms 1400 as they are recorded. After a new interferogram 1400 is averaged into SNR-enhanced interferogram 1410, it may be discarded. Furthermore, the SNR of SNR-enhanced interferogram 1410 may be determined by calculating a signal amplitude 1402 and a noise level 1404 of SNR-enhanced interferogram 1410. In one embodiment, referred to herein as "adaptive SNR data acquisition", averaging of new interferograms

1400 into SNR-enhanced interferogram 1410 stops when the SNR of SNR-enhanced interferogram 1410 is equal to or greater than a SNR threshold.

In an embodiment, DCS system 100 of FIG. 1 uses adaptive SNR data acquisition to automate data collection along a plurality of paths (e.g., through or near gas 116). When the SNR of SNR-enhanced interferogram 1410 equals or surpasses the SNR threshold, DCS system 100 controls gimbal mount 110 to steer double pulse train 106 toward a different retroreflector 118, at which point SNR-enhanced interferogram 1410 is reset and new interferograms 1400 are recorded and averaged to form a new SNR-enhanced interferogram 1410. This process may continue according to a preselected sequence of retroreflectors 118.

The SNR of SNR-enhanced interferogram 1410 increases with a number of interferograms 1106 included in the averaging when the noise of each interferogram 1406 includes a random component with zero mean. Noise level 1404 will continue to decrease with the number of interferograms 1406 until the total acquisition time (equal to the product of the number of interferograms 1406 and the frame time $T_f$) approaches the mutual coherence time of frequency combs 120(1), 120(2). When the mutual coherence of frequency combs 120(1), 120(2) drifts, center bursts 1406 may also drift, and the underlying phase of center bursts 1406 may slip. In either case, signal amplitude 1402 is reduced when averaging interferograms 1410 obtained while the mutual coherence drifts. Similarly, if the short-term mutual coherence is low (i.e., the two combs are relatively "noisy"), center bursts 1416 will "jump" from one interferogram 1400 to the next, and averaging of interferograms 1400 will also reduce signal amplitude 1402.

FIG. 14B is a flow chart of a method 1450 for adaptive dual frequency-comb spectroscopy. Method 1450 includes a step 1456 to record a single interferogram with a dual frequency-comb spectrometer. In one example of step 1456, DCS spectrometer 120 detects retroreflected pulse train 108 to generate an interferogram (e.g., interferogram 302 of FIG. 3 or any of interferograms 1400 of FIG. 14A). Method 1450 includes a step 1458 to average the single interferogram into an averaged interferogram. In one example of step 1458, each of interferograms 1400 is averaged into SNR-enhanced interferogram 1410. Method 1450 includes a step 1460 to determine a SNR of the averaged interferogram. In one example of step 1460, the SNR of the averaged interferogram is determined by (i) determining a signal amplitude of a center burst of the averaged interferogram (e.g., see signal amplitude 1402 of FIG. 14A), and (ii) determining a noise level of the averaged interferogram from data points of the averaged interferogram located away from the center burst (e.g., see noise level 1404 of FIG. 14A). In another example of step 1460, the SNR of the averaged interferogram is determined by (i) Fourier transforming the averaged interferogram into a frequency spectrum, and (ii) numerically integrating the frequency spectrum (see FIG. 15). In some embodiments, method 1450 includes a step to discard the single interferogram after said averaging the single interferogram into the averaged interferogram; this step minimizes memory usage by deleting the single interferogram after it is no longer needed.

After step 1460, method 1450 continues with a decision 1462 that compares the SNR determined in step 1460 to a SNR threshold. The SNR threshold is selected such that a trace gas can be detected with the averaged interferogram to a desired sensitivity. If the SNR is less than the SNR threshold, then the SNR is not high enough to detect the trace gas at the desired sensitivity, and method 750 repeats steps 1456, 1458, and 1460 to record additional interferograms and increase the SNR of the averaged interferogram with the additional interferograms.

In some embodiments, method 1450 includes a step 1454 to reset the averaged interferogram prior to repeatedly recording, averaging, and determining (i.e., prior to a first iteration of steps 1456, 1458, and 1460). The averaged interferogram may be reset by setting all data points of the averaged interferogram to zero. In some embodiments, method 1450 also includes a step 1452 to control a gimbal mount to steer a double pulse train of the dual frequency-comb spectrometer to a retroreflector. In one example of 1452, gimbal mount 110 of DCS system 100 is controlled such that double pulse train 106 retroreflects off of retroreflector 118(1), as shown in FIG. 1. While FIG. 14B shows step 1454 occurring after 1452, step 1454 may alternatively occur after before step 1452.

In some embodiments, decision 1462 determines that the SNR of the averaged interferogram equals or exceeds the SNR threshold, wherein method 1450 continues with step 1452 to control the gimbal mount such that the double pulse train retroreflects off of a different retroreflector (e.g., retroreflector 118(2) or retroreflector 118(3) of FIG. 1). Thus, in these embodiments, operation of DCS system 100 automatically updates to measure a new optical path through gas 116.

In some embodiments, method 1450 includes a step to operate the dual frequency-comb spectrometer under a no-walking condition (see Eqn. 12 above). By operating under this condition, the center bursts are similarly located within the recorded interferograms, and therefore do not cause the center-burst of the averaged interferogram to "wash-out".

FIG. 15 illustrates how a frequency spectrum 1502 of an interferogram 1500 may be alternatively used to determine the SNR of interferogram 1500. A discrete Fourier transform 1510 (e.g., Fast Fourier transform, or FFT) may be applied to data points of interferogram 1500 to obtain Fourier data points 1506 of frequency spectrum 1502. In FIG. 15, frequency spectrum 1502 only shows the amplitude, and not the phase, or Fourier data points 1506, and thus Fourier data points 1206 are non-negative. The SNR of interferogram 1500 may be obtained by integrating frequency spectrum 1502, shown in FIG. 15 as a shaded area 1504 under the curve formed by Fourier data points 1506. The SNR obtained from shaded area 1504 may be used similarly to the SNR obtained by other methods, such as directly averaging interferograms 1400, as described above for FIG. 14A.

FIG. 16 illustrates a method for gating an interferogram 1600 to reduce a number of data points used for data processing and storage. Gated data points lying within a gate 1612 are retained for subsequent data processing and storage, while ungated data points in portions 1604 lying outside of gate 1612 are discarded. Gate 1612 is centered near a center burst 1606 such that the data points forming center burst 1606 are retained (i.e., are gated data points), while points away from center burst 1606 (i.e., noise) are discarded.

Gating advantageously speeds up subsequent data processing by removing data points that contain only, or predominantly, noise. The reduction of data points facilitates real-time data processing with a small, low-power processor (e.g., CPU, FPGA, SoC, etc.) collocated with DCS 100. Thus, gating reduces the need for high-power offline computing resources needed for more intensive processing of larger data sets. Gating also advantageously reduces the amount of data needed to be subsequently stored, thereby reducing offline data storage requirements.

Gate 1612 is characterized by a temporal width and a temporal offset within interferogram 1600. In one embodiment, both the temporal width and the temporal offset are specified. After acquisition of interferogram 1600 is complete and the corresponding data points are stored in memory, gate 1612 may be applied to the stored data points to identify and retain only those stored data points that are gated data points. These gated data points may then be forwarded for subsequent data processing and storage. The ungated data points may be discarded from the memory, at which point the memory is ready to receive the next interferogram.

In one embodiment, only the temporal width of gate 1612 is specified. Data points from sequential interferograms are continuously stored in a circular buffer, and the presence of an interferogram is identified by detecting a data point with a large signal value. For example, a first data point exceeding upper threshold 1310 (see FIG. 13) may signal the beginning or leading edge of a center burst. The temporal offset of gate 1612 may be selected based on the one data point to ensure that gate 1612 captures all data points of the center burst.

FIG. 16 also shows an interferogram 1620 being gated with first and second gates 1632(1), 1632(2), thereby generating three disjoint portions 1624 to be discarded. A second disjoint portion 1624(2) includes a center burst 1626 of interferogram 1620, and therefore first and second gates 1632(1), 1632(2) are used to retain only the two disjoint portions of interferogram 1620 adjacent to, but excluding, center burst 1626. Widths and offsets of gates 1632 may be selected based on the molecular species to be measured and/or desired reduction of data.

Gating with a plurality of gates 1632 may be advantageous when fitting interferogram 1620 to a model in the time domain (as opposed to fitting the Fourier transform of interferogram 1620 to a model in the frequency domain). In this case, the gated data points have small values, and photodetector gain may be increased to improve the SNR of the retained data points. With the higher gain, data points in second disjoint portion 1624(2) may be allowed to saturate the photodetector (i.e., photodetector 220 of FIG. 2) since these data points will be discarded. However, it is preferable that the photodetector recover quickly enough such that data points in second gate 1632(2) are detected with the same linearity as data points in first gate 1632(1).

FIG. 17 is a flow chart of a data-processing method 1700 for an interferogram having a plurality of data points. Method 1700 may be implemented with DCS system 100 of FIG. 1. Method 1700 includes a step 1702 to record the interferogram with a dual frequency comb spectrometer. In one example of step 1702, photodetector 220 detects double pulse train 106 to generate interferogram 302 of FIG. 3. In one embodiment, step 1702 includes a step 1704 to record the interferogram by spectroscopically detecting a gas with the dual frequency comb spectrometer. In one example of step 1704, DCS system 100 of FIG. 1 spectroscopically detects gas 116 by detecting double pulse train 106 after double pulse train 106 has propagated through gas 116.

Method 1700 also includes a step 1706 to gate the interferogram. Step 1706 includes a step 1708 to retain a plurality of gated data points of the data points of the interferogram, and a step 1710 to discard a remaining plurality of ungated data points. In one example of steps 1706, 1708, and 1710, interferogram 1600 of FIG. 16 is gated with a gate 1612, wherein data points of interferogram 1600 within gate 1612 are retained, and data points of interferogram 1600 lying in portions 1604 outside of gate 1612 are discarded.

In one embodiment, method 1700 includes a step to detect a location of a center burst of interferogram, wherein the interferogram is gated based on the location of the center burst. In one example of this embodiment, a temporal width and a temporal offset of gate 1612 are chosen such that center burst 1606 of interferogram 1600 lies within gate 1612, and thus data points forming center burst 1606 are retained.

In other embodiments of method 1700, the interferogram is gated by retaining two disjoint sets of gated data points of the interferogram. In one example of these embodiments, interferogram 1620 of FIG. 16 is gated with disjoint first and second gates 1632(1), 1632(2). The two disjoint sets are located on opposite sides of the center burst to exclude as least part of the center burst, such as shown with interferogram 1620 of FIG. 16. In one of these embodiments, the two disjoint sets of gated data points are fitted to a time-domain model. In another of these embodiments, the method 1700 further includes selecting a gain of a photodetector such that the center burst saturates the photodetector. These embodiments may be extended to retain three of more disjoint sets of gated data points.

Improving Digitizer Nonlinearity by Shifting Interferograms

DCS system 100 operates over a wide range of weather conditions (e.g., temperature, wind, precipitation, etc.) that create spatially- and temporally-varying refractive indices that affect how pulse trains 106, 108 propagate through free space. These variations focus, defocus, scatter, and/or distort pulse trains 106, 108, thereby causing some of retroreflected pulse 108 train to miss optical transceiver 104 (and photodetector 220). Thus, the SNR varies with weather conditions. It has been observed by the inventors that repeatability of DCS system 100 is affected by variations in the SNR. More specifically, two DCS systems 100 measuring the same gas 116 under identical operating conditions generate results (e.g., measured absorption levels) that do not agree within their statistical uncertainties, thereby signaling the presence of a systematic source of error.

The inventors have recognized that to the above-mentioned systematic error is caused by nonlinearity of an analog-to-digital converter (ADC) that digitizes the electrical signal outputted by photodetector 220 in response to detecting retroreflected double pulse 108. Accordingly, presented in this section are embodiments that improve the ADC nonlinearity, thereby advantageously reducing the observed systematic error. This benefit has been confirmed experimentally by the inventors. Specifically, when the two DCS systems 100 are operated under identical conditions and with the below embodiments implemented, agreement between the results is significantly improved, thereby enhancing the repeatability of DCS system 100.

Figure 18:
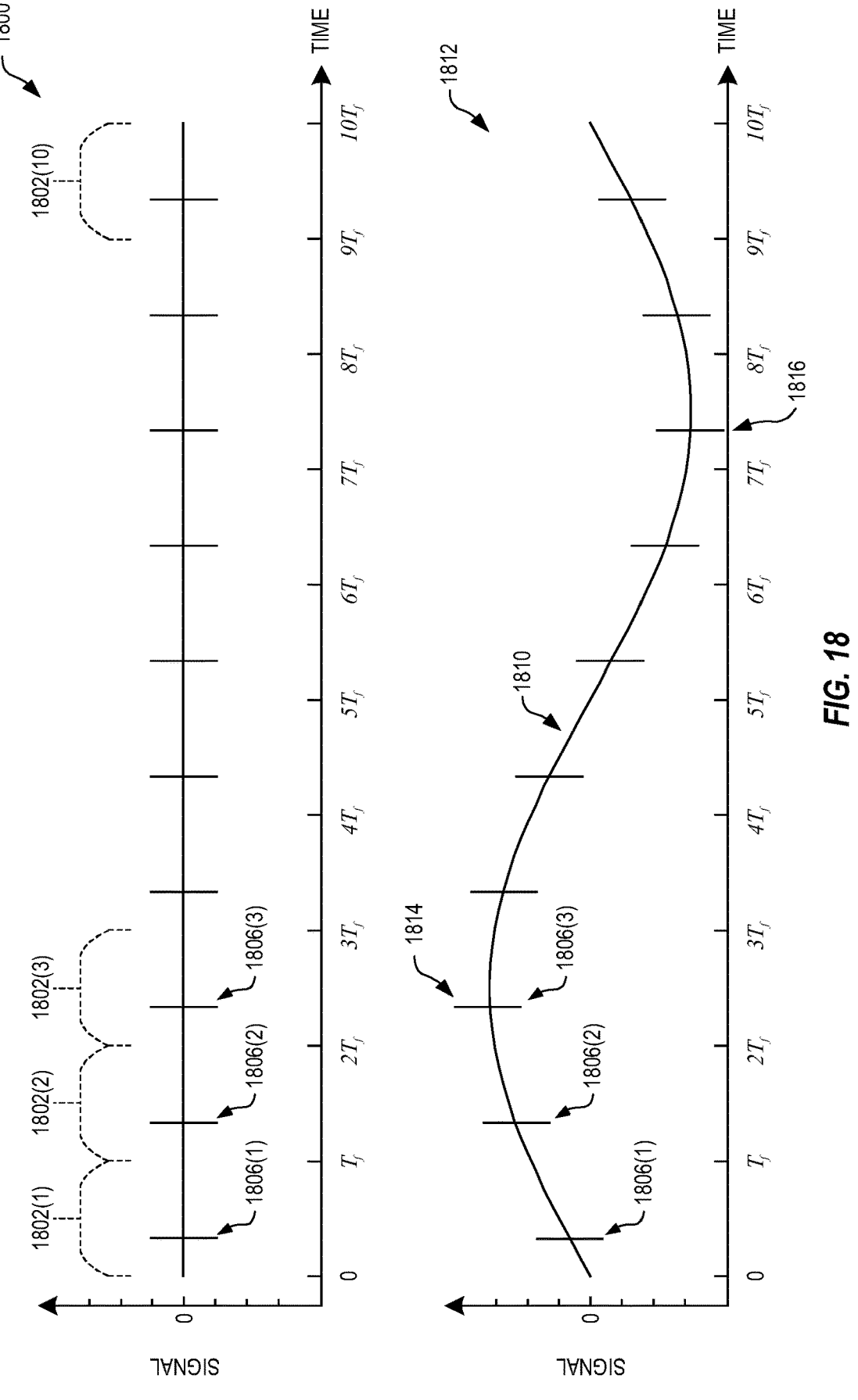
FIG. 18 shows a sine wave being added to a temporal sequence to advantageously reduce integral nonlinearity of an analog-to-digital converter (ADC) that digitizes the temporal sequence, in embodiments.

FIG. 18 shows a sine wave 1810 being added to a temporal sequence 1800 to advantageously reduce integral nonlinearity of an ADC that digitizes temporal sequence 1800. Temporal sequence 1800 is a continuous analog signal that corresponds, in the example of FIG. 18, to ten interferograms 1802, each with a duration of $T_f$. That is, interferograms 1802 are generated when temporal sequence 1800 is digitized by the ADC. A sum of sine wave 1810 and temporal sequence 1800 is shown in FIG. 18 as a shifted sequence 1812. A frequency of sine wave 1810 is chosen such that an integer number of periods of sine wave 1810 equals a duration of temporal sequence 1800. In the example of FIG. 18, where the duration of temporal sequence 1800 is $10T_f$, the frequency of sine wave 1810 is $1/(10T_f)$.

In shifted sequence 1812, center bursts 1806 are shifted up and down, and therefore will be given different digital codes when digitized, as compared to temporal sequence 1800. When interferograms 1802 are summed (e.g., when averaged, as described above in reference to FIG. 14A), the signal shifts introduced by sine wave 1810 sum to zero. Thus, in the example of FIG. 18, the sum of interferograms 1802 of temporal sequence 1800 nominally equals the sum of interferograms 1802 of shifted sequence 1812.

However, in shifted sequence 1812, center bursts 1806 are digitized across a wider range of code values, as compared to temporal sequence 1800, and thus more fully sample a transfer function of the ADC, including any nonlinear component of the transfer function. In some ADC architectures, the nonlinear component has odd symmetry about the mid-scale code (corresponding to 0 signal in FIG. 18). In this case, when interferograms 1802 are summed, the nonlinear component of the transfer function is reduced. Thus, the use of shifted sequence 1812 advantageously improves linearity, as compared to temporal sequence 1800.

Figures 19, 20:
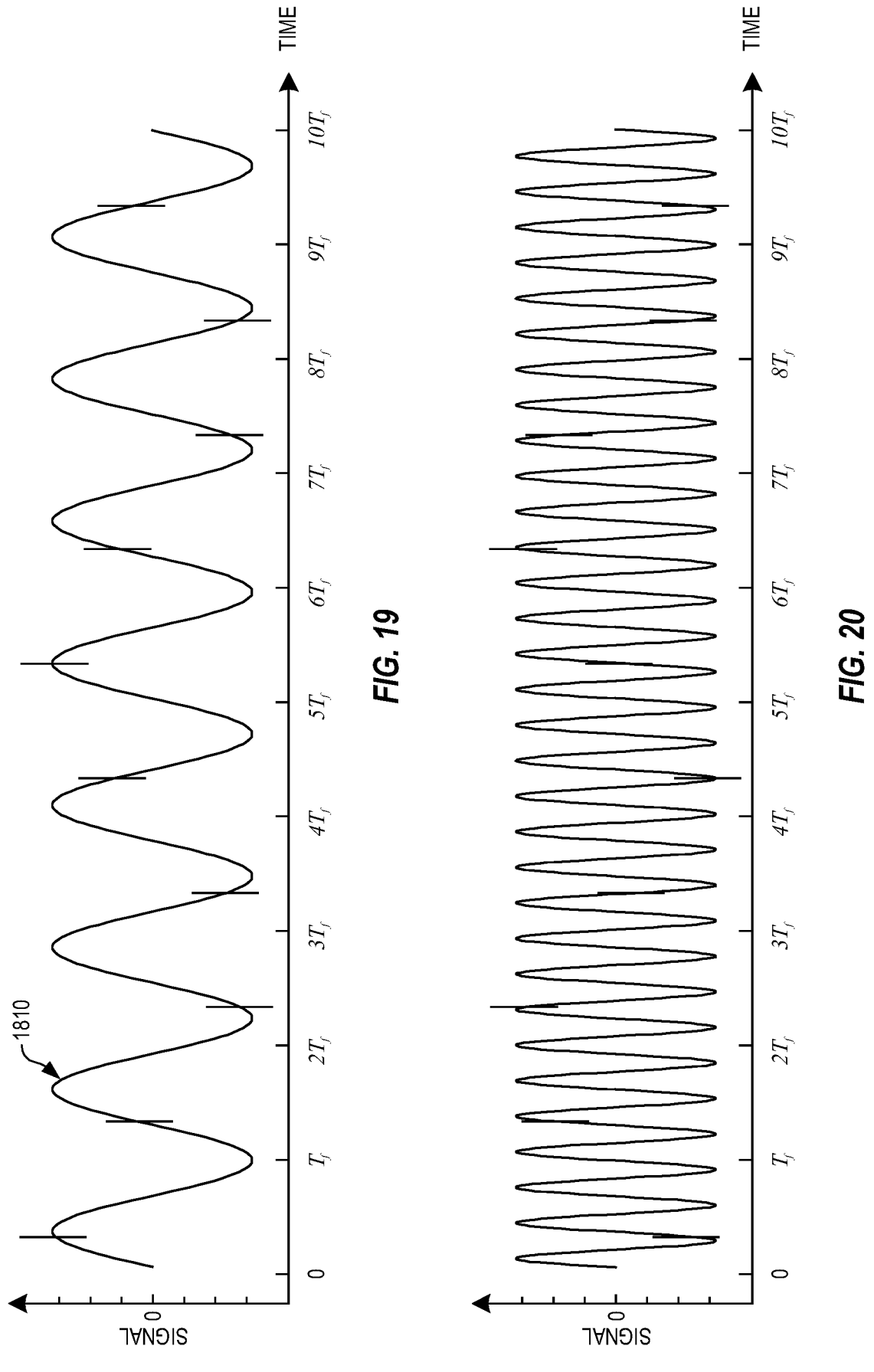
FIGS. 19 and 20 show shifted sequences that are similar to a shifted sequence of FIG. 18, except that the sine wave of FIG. 18 has a higher frequency, in embodiments.

FIGS. 19 and 20 show shifted sequences that are similar to shifted sequence 1812 of FIG. 18, except that sine wave 1810 has a higher frequency. For the signal shifts introduced by sine wave 1810 to sum to zero, an integer number of periods of sine wave 1810 must equal a duration of temporal sequence 1800, as described above. While the example of FIG. 18 shows the lowest frequency that meets this condition, the frequency may be alternatively set to a harmonic of the lowest frequency. In the example of FIG. 19, the frequency of sine wave 1810 is $8/(10T_f)$, or the eighth harmonic of the lowest frequency. In the example of FIG. 20, the frequency of sine wave 1810 is $32/(10T_f)$, or the thirty-second harmonic of the lowest frequency.

The examples of FIGS. 18-20 may be extended to an arbitrary number N of consecutive interferograms 1802 forming a shifted sequence. Specifically, the lowest frequency of sine wave 1810 is $1/(NT_f)$, and the frequency of sine wave 1810 may be set to any integer harmonic $k/(NT_f)$ of the lowest frequency (i.e., k=1, 2, 3, ... ). However, the frequency of sine wave 1810 may not equal the $N^{th}$ harmonic, for which the frequency is $N/(NT_f)=11T_f$. In this case, where one cycle of sine wave 1810 corresponds to one of interferograms 1802, the different cycles of sine wave 1810 will constructively interfere when all interferograms 1802 are summed together, as opposed to summing to zero.

Figure 21:
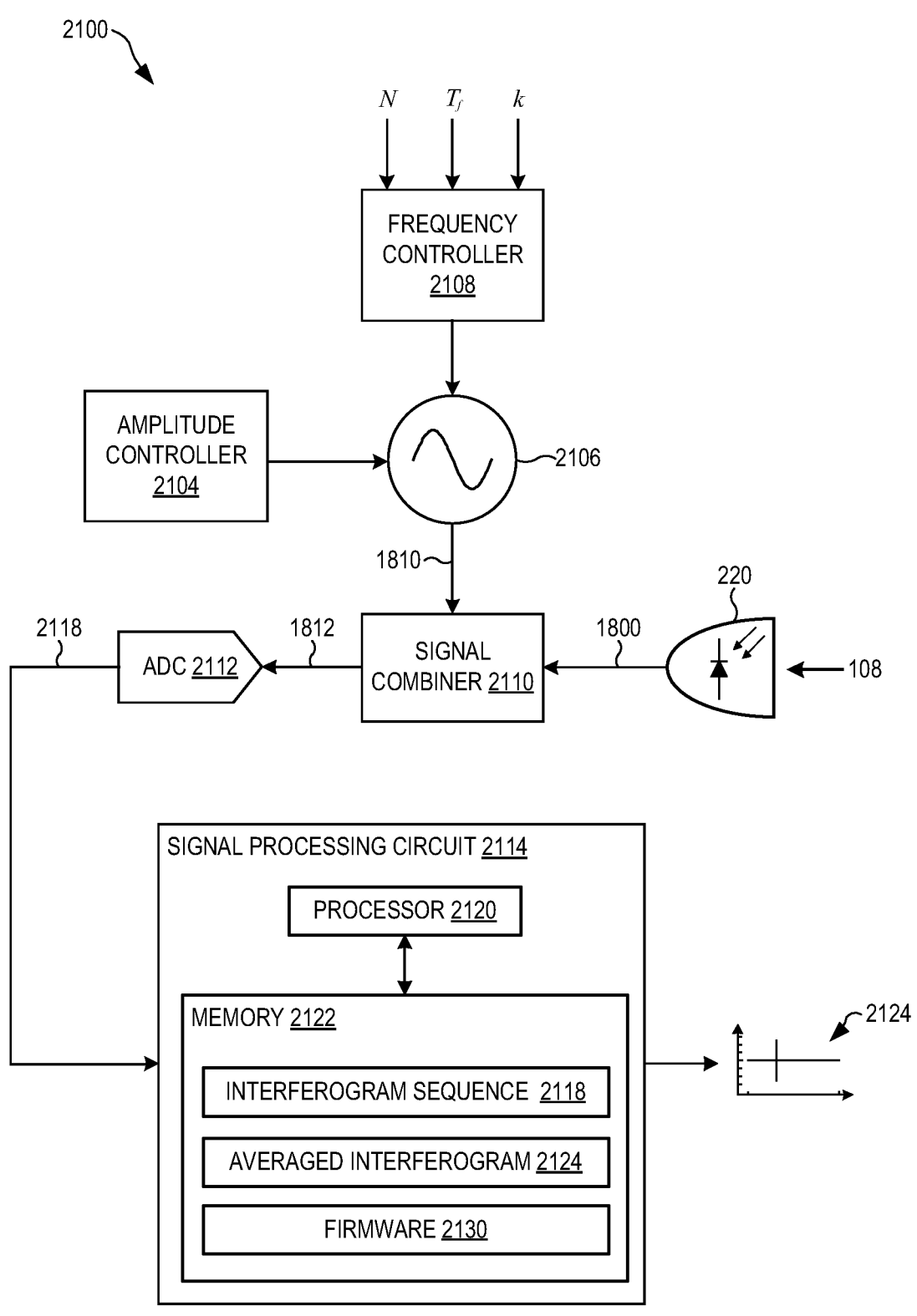
FIG. 21 is a functional diagram of an ADC nonlinearity canceler that adds the sine wave of FIG. 18 to the temporal sequence of FIG. 18 to generate the shifted sequence of FIG. 18, digitizes the shifted sequence into an interferogram sequence, and averages interferograms of the interferogram sequence to cancel signal shifts from the sine wave, in embodiments.

FIG. 21 is a functional diagram of an ADC nonlinearity canceler 2100 that adds sine wave 1810 to temporal sequence 1802 to generate shifted sequence 1812, digitizes shifted sequence 1812 into an interferogram sequence 2118, and averages interferograms 1802 of interferogram sequence 2118 to cancel signal shifts from sine wave 1810. Photodetector 220 (see FIG. 2) outputs temporal sequence 1800 as an electrical signal when detecting retroreflected pulse train 108. Nonlinearity canceler 2100 includes a frequency synthesizer 2106 that generates sine wave 1810, and a signal combiner 2110 that combines temporal sequence 1800 and sine wave 1810 to generate shifted sequence 1812. An ADC 2112 then digitizes shifted sequence 1812, generating interferogram sequence 2118 as digital data. Signal combiner 2110 may be a diplexer, a bias tee, a summing amplifier, or another type of circuit that sums two analog signals.

ADC nonlinearity canceler 2100 also includes a signal processing circuit 2114 that receives and processes digitized interferogram sequence 2118. Signal processing circuit 2114 includes a processor 2120 communicatively coupled with a memory 2122 storing firmware 2130, interferogram sequence 2118, and an averaged interferogram 2124. Firmware 2130 is implemented as machine-readable instructions that control processor 2120 to average interferograms 1802 stored in memory 2122 as interferogram sequence 2118, and store the resulting average in memory 2122 as averaged interferogram 2124. Firmware 2130 may also include instructions to output averaged interferogram 21, as shown in FIG. 21, for subsequent processing (e.g., gating, phase correction, fitting, storage, etc.).

Processor 2120 may include a microprocessor chip, digital signal processor (DSP), field-programmable gate array (FPGA), or another type of integrated circuit capable of performing logic, control, and input/output operations. Memory 2122 may include both volatile memory (e.g., RAM, SRAM, etc.) and nonvolatile memory (e.g., ROM, FLASH, etc.). In some embodiments, signal processing circuit 2114 is implemented as a mixed-signal integrated circuit, such as a system-on-chip (SoC) or microcontroller unit (MCU), that combines a processor, memory, and input/output interfaces on a single chip. In some of these embodiments, the mixed-signal integrated circuit may include an ADC, wherein ADC 2112 and signal processing circuit 2114 are implemented with the one mixed-signal integrated circuit.

ADC nonlinearity canceler 2100 includes a frequency controller 2108 that calculates the frequency of sine wave 2110 based on the frame time $T_f$ and the number N of consecutive interferograms 1802 forming interferogram sequence 2118. Frequency controller 2108 receives values for N and $T_f$ as parameters, and calculates therefrom the lowest frequency of sine wave 1810. Alternatively, frequency controller 2108 may receive values for $f_{rep}^{(LO)}$, $f_{rep}^{(SIG)}$, and/or $\Delta f_{rep}=f_{rep}^{(LO)}-f_{rep}^{(SIG)}$, and determine therefrom frame time $T_f$ via $T_f=1/\Delta f_{rep}$. Frequency controller 2108 also determines if the frequency of sine wave 1810 should be set to the calculated lowest frequency or a harmonic k thereof (except the $N^{th}$ harmonic, as described above). As shown in FIG. 21, frequency controller 2108 receives k as an input parameter. Alternatively, frequency controller 2108 may determine k based on the output frequency range of frequency synthesizer 2106 and/or any input bandwidth requirements of signal combiner 2110. In one embodiment, frequency controller 2108 always selects the first harmonic k=1.

Frequency controller 2108 controls frequency synthesizer 2106 to output sine wave 1810 according to the determined frequency. Frequency controller 2108 may control frequency synthesizer 2106 to continuously output sine wave 1810 until a new value for N, $T_f$, and/or k is received, after which frequency controller 2108 may calculate an updated frequency of sine wave 1810, and control frequency synthesizer 2106 to output the updated frequency. In one embodiment, frequency controller 2108 and signal processing circuit 2114 are implemented as one device.

ADC nonlinearity canceler 2100 may also include an amplitude controller 2104 that interfaces with frequency synthesizer 2106 to set an amplitude of sine wave 1810. As shown in FIG. 18, shifted sequence 1812 should never exceed an analog input range of ADC 2112. More specifically, a maximum signal 1814 of shifted sequence 1812 should not exceed a maximum analog input of ADC 2112 (corresponding to a maximum code value outputted by ADC 2112). Similarly, a minimum signal 1816 of shifted sequence 1812 should not fall below a minimum analog input of ADC 2112 (corresponding to a minimum code value outputted by ADC 2112. In one embodiment, amplitude controller 2104 sets the amplitude of sine wave 1810 by driving a variable attenuator (not shown in FIG. 21) located between frequency synthesizer 2106 and signal combiner 2110. In another embodiment, amplitude controller 2104 and frequency controller 2108 are implemented as one device. In another embodiment, amplitude controller 2104, frequency controller 2108, and signal processing circuit 2114 are implemented as one device.

FIG. 22 is a flow chart of a method 2200 for improving nonlinearity of ADC in a dual frequency-comb spectrometer. Method 2200 may be implemented with ADC nonlinearity canceler 2100 of FIG. 21. Method 2200 includes a step 2208 to generate a shifted sequence by adding a sine wave to an analog temporal sequence recorded by a dual frequency-comb spectrometer. In one example of step 2208, signal combiner 2110 of ADC nonlinearity canceler 2100 adds sine wave 1810 to temporal sequence 1800 to generate shifted sequence 1812. Method 2200 also includes a step 2210 to digitize the shifted sequence with an ADC to form a corresponding interferogram sequence. In one example of step 2210, ADC 2112 digitizes shifted sequence 1812 to generate interferogram sequence 2218. Method 2200 also includes a step 2212 to average the interferogram sequence to form an averaged interferogram free from shifts from the sine wave. In one example of step 2212, signal processing circuit 2114 of ADC nonlinearity canceler 2100 averaged interferogram sequence 2118 to form averaged interferogram 2124. In one embodiment, method 2200 includes a step 2214 to output the averaged interferogram. In one example of step 2214, signal processing circuit 2114 outputs averaged interferogram 2124, as shown in FIG. 21.

In some embodiments, method 2200 includes a step 2204 to control a frequency of the sine wave such that an integer multiple of a period of the sine wave equals a duration of the interferogram sequence. In one example of step 2204, frequency controller 2108 of ADC nonlinearity canceler 2100 interfaces with frequency synthesizer 2106 to control the frequency of sine wave 1810. In one of these embodiments, the duration of the interferogram sequence is calculated from a number of interferograms forming the interferogram sequence and a frame time for each of the interferograms.

In another embodiment, method 2200 includes a step 2206 to control an amplitude of the sine wave such that the shifted sequence does not exceed the analog input range of the ADC. In one example of step 2206, amplitude controller 2104 of ADC nonlinearity canceler 2100 interfaces with frequency synthesizer 2106 to control the amplitude of sine wave 1810.

In one embodiment, method 2200 includes a step 2202 to generate the analog temporal sequence by spectroscopically detecting a gas with the dual frequency comb spectrometer. In one example of step 2202, photodetector 220 outputs temporal sequence 1800 as an electrical signal when detecting retroreflected pulse train 108.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for adaptive dual frequency-comb spectroscopy, comprising:

while operating a dual frequency-comb spectrometer under a no-walking condition, repeatedly:

recording a single interferogram with the dual frequency-comb spectrometer, updating, with the single interferogram, a cumulatively averaged interferogram of a sequence of previously recorded interferograms, and determining a signal-to-noise ratio (SNR) of the cumulatively averaged interferogram, until the SNR of the cumulatively averaged interferogram exceeds a SNR threshold.

2. The method of claim 1, wherein said determining the SNR of the cumulatively averaged interferogram includes:

determining a signal amplitude of a center burst of the cumulatively averaged interferogram; and determining a noise level of the cumulatively averaged interferogram from data points of the cumulatively averaged interferogram located away from the center burst.

3. The method of claim 1, wherein said determining the SNR of the cumulatively averaged interferogram includes:

Fourier transforming the cumulatively averaged interferogram into a frequency spectrum; and numerically integrating the frequency spectrum.

4. The method of claim 1, further comprising discarding the single interferogram after said updating.

5. The method of claim 1, further comprising controlling a gimbal mount to steer a double pulse train of the dual frequency-comb spectrometer to a retroreflector.

6. The method of claim 5, wherein said controlling occurs prior to said repeatedly recording, updating, and determining.

7. The method of claim 6, further comprising resetting the cumulatively averaged interferogram prior to said repeatedly recording, updating, and determining.

8. A system for adaptive dual frequency-comb spectroscopy, comprising:

a processor; and a memory in communication with the processor, the memory storing a cumulatively averaged interferogram of a sequence of previously recorded interferograms;

the memory further storing machine-readable instructions that, when executed by the processor, control the system to, control a dual frequency-comb spectrometer to operate under a no-walking condition; and repeatedly:

(i) control the dual frequency-comb spectrometer to record a single interferogram, (ii) receive the single interferogram from the dual frequency-comb spectrometer, (iii) update the cumulatively averaged interferogram with the single interferogram, and (iv) determine a signal-to-noise ratio (SNR) of the cumulatively averaged interferogram, until the SNR of the cumulatively averaged interferogram exceeds a SNR threshold.

9. The system of claim 8, further comprising the dual frequency-comb spectrometer.

10. The system of claim 8, wherein the machine-readable instructions that, when executed by the processor, control the system to determine the SNR of the cumulatively averaged interferogram comprise machine-readable instructions that, when executed by the processor, control the system to:

determine a signal amplitude of a center burst of the cumulatively averaged interferogram, and determine a noise level of the cumulatively averaged interferogram from data points of the cumulatively averaged interferogram located away from the center burst.

11. The system of claim 8, wherein the machine-readable instructions that, when executed by the processor, control the system to determine the SNR of the cumulatively averaged interferogram comprise machine-readable instructions that, when executed by the processor, control the system to:

Fourier transform the cumulatively averaged interferogram into a frequency spectrum, and numerically integrate the frequency spectrum.

12. The system of claim 8, the memory storing additional machine-readable instructions that, when executed by the processor, control the system to discard the single interferogram after the cumulatively averaged interferogram is updated.

13. The system of claim 8, the memory storing additional machine-readable instructions that, when executed by the processor, control the system to adjust a gimbal mount such that the gimbal mount steers a double pulse train of the dual frequency-comb spectrometer to a retroreflector.

14. The system of claim 13, further comprising the gimbal mount.

15. The system of claim 13, wherein the machine-readable instructions that, when executed by the processor, control the system to adjust the gimbal mount are executed prior to the machine-readable instructions that, when executed by the processor, control the system to repeatedly record, update, and determine.

16. The system of claim 15, the memory storing additional machine-readable instructions that, when executed by the processor, control to system to reset the cumulatively averaged interferogram prior to the machine-readable instructions that, when executed by the processor, control the system to repeatedly record, update, and determine.

* * * * *